(12) United States Patent
Kemp

(10) Patent No.: US 8,311,863 B1
(45) Date of Patent: Nov. 13, 2012

(54) UTILITY HIGH PERFORMANCE CAPABILITY ASSESSMENT

(75) Inventor: Stacy M. Kemp, London (GB)

(73) Assignee: Accenture Global Services Limited, Dublin (IE)

( * ) Notice: Subject to any disclaimer, the term of this patent is extended or adjusted under 35 U.S.C. 154(b) by 321 days.

(21) Appl. No.: 12/710,900

(22) Filed: Feb. 23, 2010

Related U.S. Application Data

(60) Provisional application No. 61/154,832, filed on Feb. 24, 2009.

(51) Int. Cl.
*G06Q 99/00* (2006.01)
(52) U.S. Cl. .................. 705/7.11; 705/7.29; 705/7.31
(58) Field of Classification Search .................. 705/1–14
See application file for complete search history.

(56) References Cited

U.S. PATENT DOCUMENTS

| | | | |
|---|---|---|---|
| 6,256,773 | B1 | 7/2001 | Bowman-Amuah |
| 6,324,647 | B1 | 11/2001 | Bowman-Amuah |
| 6,370,573 | B1 | 4/2002 | Bowman-Amuah |
| 6,601,233 | B1 | 7/2003 | Underwood |
| 6,957,186 | B1 | 10/2005 | Guheen et al. |
| 2002/0035495 | A1 | 3/2002 | Spira et al. |
| 2003/0083912 | A1* | 5/2003 | Covington et al. ............ 705/7 |
| 2003/0110067 | A1 | 6/2003 | Miller et al. |
| 2004/0098299 | A1* | 5/2004 | Ligon et al. .................... 705/10 |

OTHER PUBLICATIONS

U.S. Appl. No. 11/823,112, filed Jun. 25, 2007.
U.S. Appl. No. 12/124,010, filed May 20, 2008.
U.S. Appl. No. 12/129,080, filed May 29, 2008.
U.S. Appl. No. 61/086,927, filed Aug. 7, 2008.
U.S. Appl. No. 12/194,793, filed Aug. 20, 2008.
U.S. Appl. No. 61/092,225, filed Aug. 27, 2008.
U.S. Appl. No. 12/324,150, filed Nov. 26, 2008.
U.S. Appl. No. 61/154,832, filed Feb. 24, 2009.
U.S. Appl. No. 61/154,945, filed Feb. 24, 2009.
U.S. Appl. No. 61/164,640, filed Mar. 30, 2009.
U.S. Appl. No. 61/164,618, filed Mar. 30, 2009.
U.S. Appl. No. 12/427,201, filed Apr. 21, 2009.
U.S. Appl. No. 12/471,767, filed May 26, 2009.
U.S. Appl. No. 12/479,310, filed Jun. 5, 2009.
U.S. Appl. No. 12/548,673, filed Aug. 27, 2009.
U.S. Appl. No. 12/701,914, filed Feb. 8, 2010.
U.S. Appl. No. 12/710,662, filed Feb. 23, 2010.
U.S. Appl. No. 12/713,647, filed Feb. 26, 2010.
U.S. Appl. No. 12/713,597, filed Feb. 26, 2010.
Brochure, "High Performance Acceleration: Global Retail Process Model," Accenture, High Performance Delivered, 2007.
Handbook, Software Engineering Institute, "A Description of the Systems Engineering Capability Maturity Model Appraisal Method Version 1.1," Mar. 1996.

(Continued)

*Primary Examiner* — Jason Dunham
*Assistant Examiner* — Zahra Elkassabgi
(74) *Attorney, Agent, or Firm* — Brinks Hofer Gilson & Lione

(57) ABSTRACT

A high performance capability assessment model helps a utility industry business meet the challenges of the global marketplace. As a result, the utility industry business can achieve the clarity, consistency, and well-defined execution of core processes that reduce inefficiencies and waste that result from unnecessary process complexity and exceptions. In addition, the high performance capability assessment model helps the utility industry business to identify specific areas in which improvements may be made and understand how to make the improvements, and establishes levels of capability along the way to reaching an ultimate capability goal.

15 Claims, 14 Drawing Sheets

OTHER PUBLICATIONS

Keith A. Heston, "Achieving Delivery Excellence Using the Capability Maturity Model Integration," *Accenture, High Performance Delivered*, 2006.

Report, Software Engineering Institute, "A Systems Engineering Capability Maturity Model, Version 1.1.," Nov. 1995.

Walker Royce, "CMM vs. CMMI: From Conventional to Modern Software Management," *The Rational Edge*, 2002.

Non-Final Office Action dated Apr. 28, 2011, issued in related U.S. Appl. No. 12/129,080.

* cited by examiner

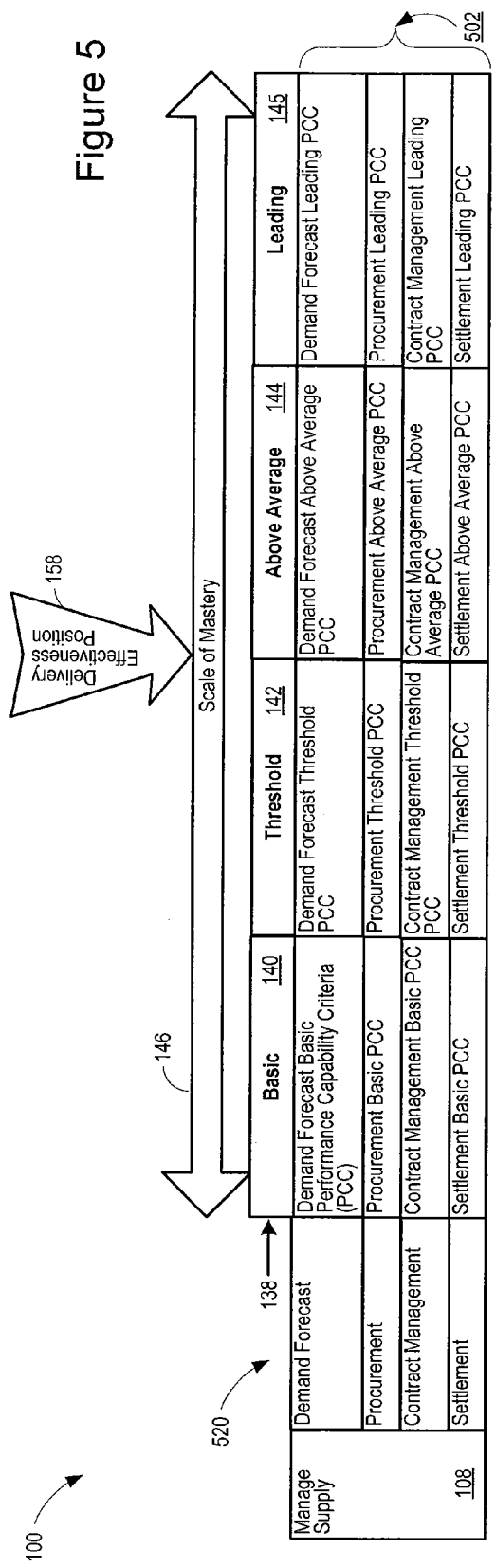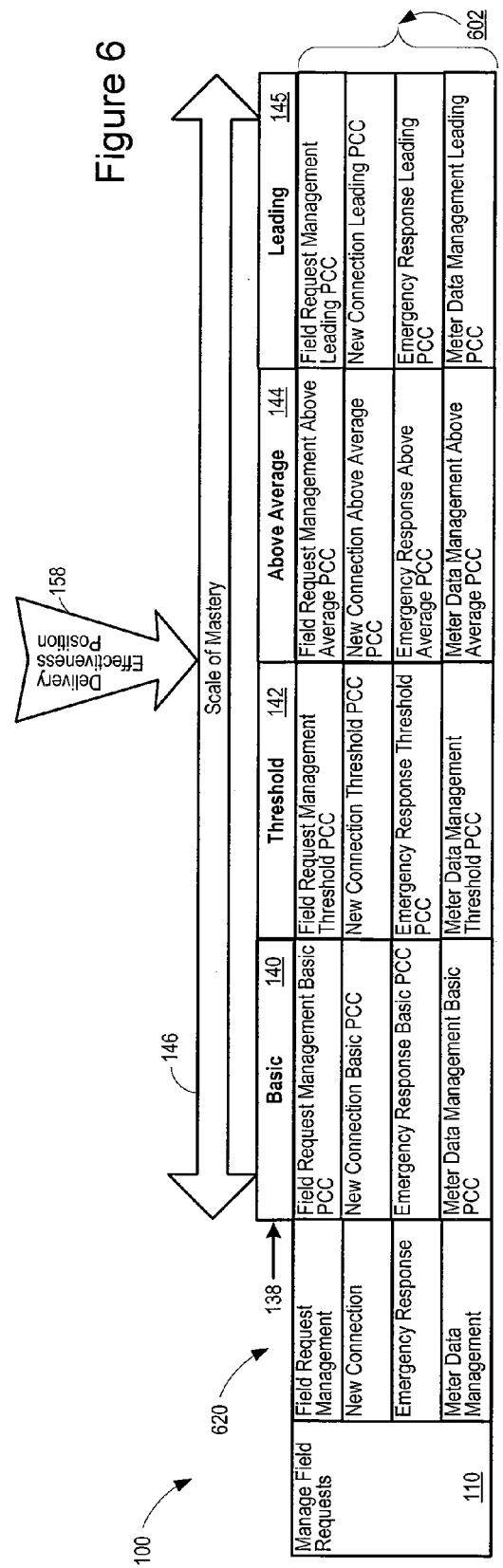

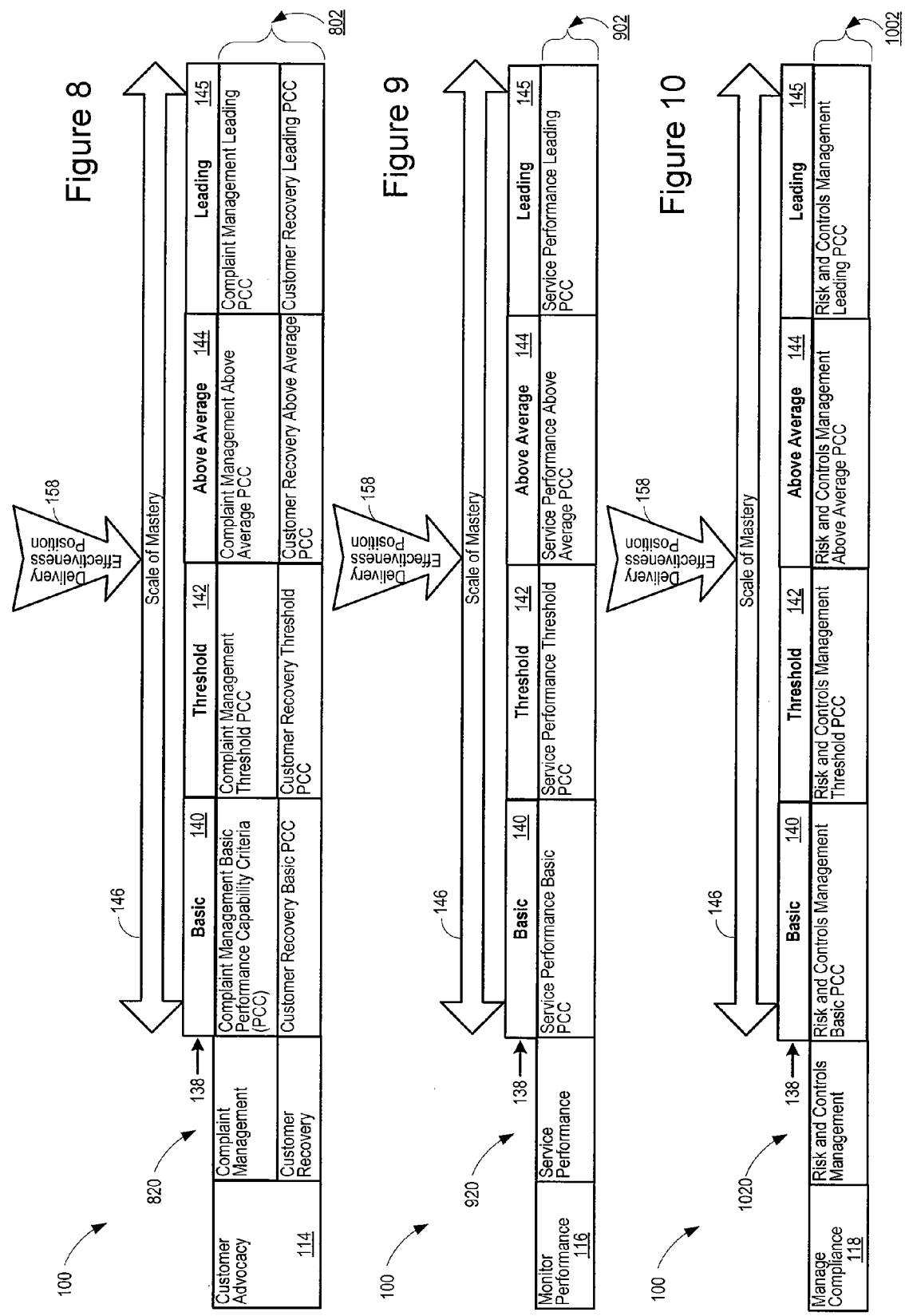

UTILITY HIGH PERFORMANCE CAPABILITY ASSESSMENT

CROSS-REFERENCE TO RELATED APPLICATIONS

This application claims the benefit of priority from Provisional Application Ser. No. 61/154,832, entitled Utility High Performance Capability Assessment, filed Feb. 24, 2009, and which is hereby incorporated by reference in its entirety.

BACKGROUND OF THE INVENTION

1. Technical Field

This disclosure concerns a system and method to identify the performance of an organization on a scale of mastery across representative capabilities of the organization's industry. In particular, this disclosure relates to an efficient and cost effective way to assess the performance capability level of key assessment areas within the processes of a utility organization

2. Background Information

Modern utility organizations operate in an increasingly challenging environment. To survive, utility organizations must adapt to this environment and execute in a clear, consistent, and efficient manner. Furthermore, the regularity requirements and resource management challenges of utility businesses greatly increase the complexity and difficulty of surviving on a day-to-day basis.

Despite the need for a utility organization to meet the challenges of the global marketplace, it is still often the case that the business lacks clarity, consistency, and well-defined execution of its core processes. These shortcomings severely constrain the business, and lead directly to inefficiencies and waste due to unnecessary complexity, process exceptions, and customer dissatisfaction. At the same time, it can be very difficult to identify specific processes to which improvements may be made, either because the business itself does not have the expertise to identify the processes or because the complexities of the business frustrate attempts to clearly delineate the processes to be improved.

Even if the utility business, on its own, could identify one of the many processes that it needs to improve, the business would not necessarily know how to improve the process or be able to identify a concrete and measurable improvement goal. Another difficulty exists in determining whether there are any intermediate goals that should be reached along the way. As utility businesses struggle to meet the demands of the modern economic landscape, they fail to identify opportunities for maximizing compliance and margin improvement, category expansion, multi-channel execution, selling performance, customer satisfaction improvement, and to reach other important goals.

Therefore, a need exists for an efficient and effective system and method to assess the performance level of key assessment areas within the processes of an organization.

SUMMARY

A high performance capability assessment (HPCA) model helps utility businesses meet the challenges of the global marketplace by defining a scale of performance mastery along which the current practices of the business may be located. The HPCA model accelerates the discovery of process and performance gaps within business operations. In addition, the HPCA model also helps the business to identify specific areas in which improvements may be made, how to make the improvements, and how to establish performance measures during the course of attempting to achieve an ultimate goal. As a result, the business can achieve the clarity, consistency, and well-defined execution of core processes that maximize the operating budget for optimum outcomes.

The HPCA model includes a key factor dimension and a performance mastery scale dimension. The performance mastery scale dimension defines multiple mastery levels. The performance mastery levels form a scale of increasing organizational performance. The scale includes a 'Basic' mastery level, a 'Threshold' mastery level, an 'Above Average' mastery level, and a 'Leading' mastery level. Each performance mastery level includes criteria specific to a corresponding key assessment area. Each key assessment area identifies some aspect of a capability of a business.

A business capability can be defined as a bundle of closely integrated skills, knowledge, technologies, and cumulative learning that is exercised through a set of processes and that collectively represents an organization's ability to create value by producing outcomes and results. Capability area does not represent a delineation of organizational responsibilities as the business outcomes of a capability may be the result of a number of cross-functional teams. Capabilities of a business may be grouped into platforms. For example, the HPCA model groups the capabilities of the utility industry into eleven high-level platforms, including a manage retail strategy platform, a manage interaction platform, a manage core operations platform, a manage supply platform, a manage field requests platform, a manage retail insight platform, a customer advocacy platform, a monitor performance platform, a manage compliance platform, a manage quality and performance platform, and a manage third party interaction platform. Platforms may include sub-platforms, as well as capabilities. For example, the manage retail strategy platform may include sub-platforms for manage investments, manage regulatory affairs, manage customer strategy, and manage product/service strategy, where each sub-platform may contain the capabilities.

The key factor dimension establishes a set of key assessment areas in which to analyze the capabilities of a business. Key assessment areas include performance capability criteria. Performance capability criteria populate the performance capability assessment model. The performance capability criteria may be specific to any one of many different business capabilities. For example, the manage investments sub-platform (corresponding to the manage retail strategy platform) includes performance capability criteria for long and medium term planning, investment and analysis, capital and OM budgeting, and investment review key assessment areas, at each of the capability levels along the performance capability scale dimension. Any number of performance capability assessment models and performance capability criteria may be defined and stored in a capability detail pool for subsequent retrieval and application to a business under examination. Accordingly, the HPCA model provides a flexible and adaptive scale of performance capability against which business practices may be compared to ascertain where the capabilities of a business under examination fall along the scale.

Other systems, methods, features, and advantages will be, or will become, apparent to one with skill in the art upon examination of the following figures and detailed description. All such additional systems, methods, features, and advantages are included within this description, are within the scope of the invention, and are protected by the following claims.

BRIEF DESCRIPTION OF THE DRAWINGS

The utility industry high performance capability assessment model and system may be better understood with reference to the following drawings and description. The elements in the figures are not necessarily to scale, emphasis instead being placed upon illustrating the principles of the capability assessment techniques. In the figures, like-referenced numerals designate corresponding parts throughout the different views.

FIG. 5 shows a high performance capability assessment model with manage supply capabilities shown.

FIG. 6 shows a high performance capability assessment model with manage field requests capabilities shown.

FIG. 8 shows a high performance capability assessment model with customer advocacy capabilities shown.

FIG. 9 shows a high performance capability assessment model with monitor performance capabilities shown.

FIG. 10 shows a high performance capability assessment model with manage compliance platform capabilities shown.

DETAILED DESCRIPTION OF THE PREFERRED EMBODIMENTS

Figure 1:
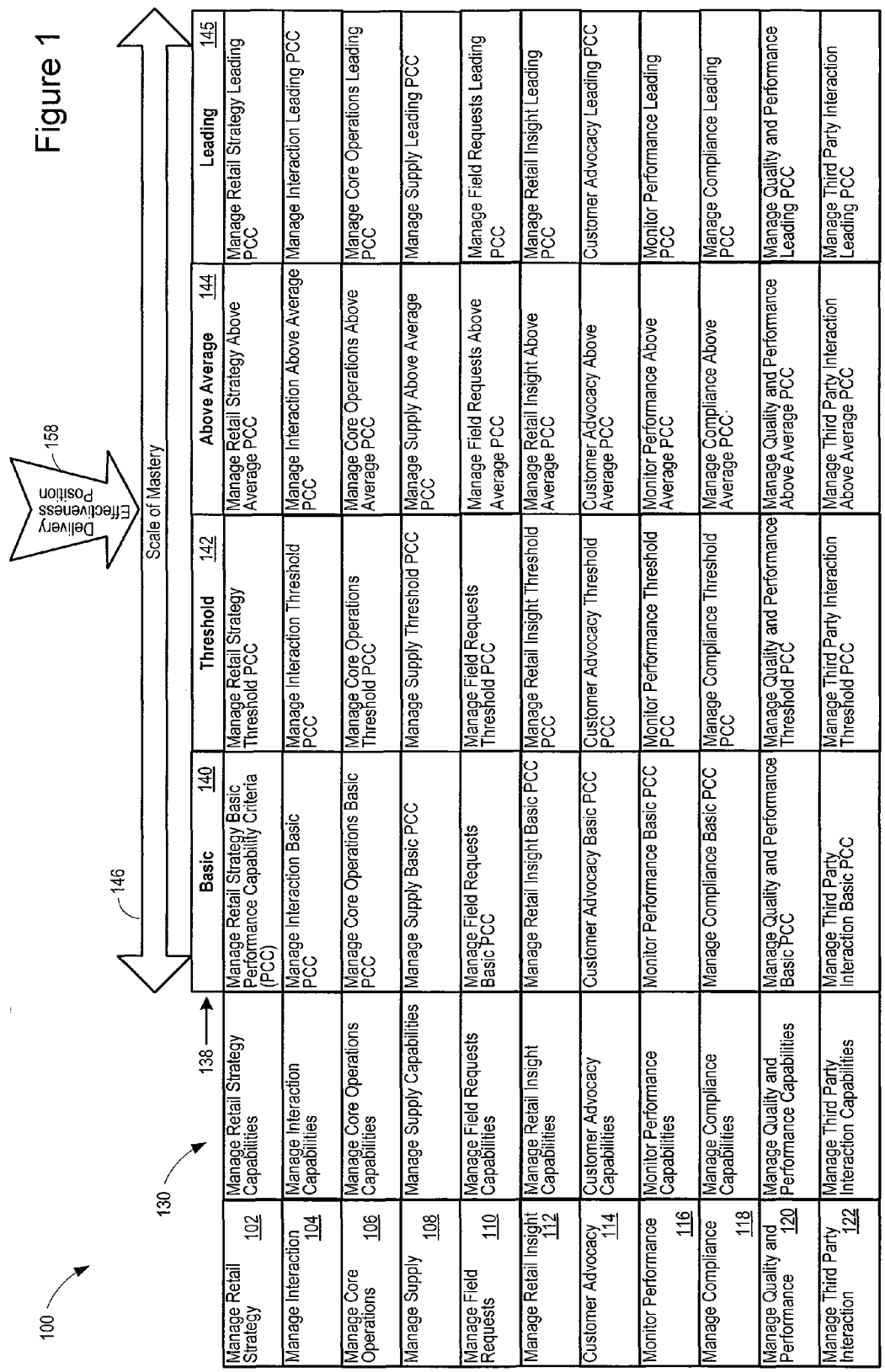
FIG. 1 shows a high performance capability assessment model with a performance scale of mastery and performance criteria shown for different capabilities.

FIG. 1 shows a utility high performance capability assessment (HPCA) model 100. The HPCA model 100 specifies eleven high-level platforms, including a manage strategy platform 102, a manage interaction platform 104, a manage core operations platform 106, a manage supply platform 108, a manage field requests platform 110, a manage retail insight platform 112, a customer advocacy platform 114, a monitor performance platform 116, a manage compliance platform 118, a manage quality and performance platform 120, and a manage third party interaction platform 122.

The manage strategy platform 102 includes all the capabilities required to strategically assess, formulate, and plan retail operations. The manage interaction platform 104 encompasses the capabilities that manage and operationalize customer contact through multiple touch points. The manage core operations platform 106 encompasses the management of all customer facing activity from attracting, sales activities, and ongoing support throughout the customer lifecycle. The manage supply platform 108 covers forecasting commodity demand and related procurement processes through to settlement. The manage field requests platform 110 covers the ability to manage requests for field services transactions. The manage retail insight platform 112 covers the ability to analyze transactional data to draw insight on customer behavior and corresponding operational implications. The customer advocacy platform 114 covers the treatment of escalated customer issues and recovery efforts. The monitor performance platform 116 provides a balanced and holistic view of retail operation performance. The manage compliance platform 118 provides a system of processes and controls to manage the security of customer information, financial information, compliance with laws and regulations, public relations and the delivery of effective internal operational controls. The manage quality and performance platform 120 encompasses capabilities to support and empower customer care employees at all stages of the employee lifecycle. The manage third party interaction platform 122 encompasses all interactions between a retail utility, vendors, and industry players.

The HPCA model 100 is not limited to the form shown in FIG. 1. Instead, the HPCA model 100 may be adapted and modified to fill a wide variety of analysis roles. Additional, different, or fewer platforms may be used in other implementations, with each platform defining additional, different, or fewer capabilities. Each platform includes one or more multiple capabilities 130 for the various platforms or sub-platforms.

The HPCA model 100 establishes a multidimensional utility industry performance reference set that includes multiple key assessment performance levels 138, further described below in reference Tables 1-3. The performance levels 138 establish a scale of increasing effectiveness in delivery of each capability. The key assessment performance reference tables include a 'Basic' 140 delivery level, a 'Threshold' 142 delivery level, an 'Above Average' 144 delivery level, and a 'Leading' 145 delivery level. The performance levels establish a scale of mastery 146 along which current business practices may be located and identified with respect to any platform and capability within a platform according to an analysis of performance capability criteria (PCC). The capability under evaluation may be assigned the performance level 138 based on a delivery effectiveness position 158 along the scale of mastery 146.

The 'Basic' delivery level 140 specifies 'Basic' performance assessment criteria, the 'Threshold' delivery level 142 specifies 'Threshold' performance assessment criteria, the 'Above Average' delivery level 144 specifies an 'Above Average' performance assessment criteria, and the 'Leading' delivery level 145 specifies 'Leading' performance assessment criteria. The HPCA model 100 receives input data that specifies a utility business platform (e.g., a retail utility industry area) and a utility industry key assessment area for analysis. The HPCA model 100 searches the multidimensional utility industry performance reference set for a matching key assessment performance reference table that matches the utility business industry platform and corresponding industry capability within the platform and the utility industry key assessment area, and retrieves the matching key assessment performance reference table. The HPCA model 100 initiates analysis of the matching key assessment performance reference table to obtain a resultant performance assessment level for the utility industry key assessment area.

Tables 1-3 below provide an explanation of each of the capability delivery levels 140, 142, 144, and 145.

TABLE 1

'Basic' Delivery Level

| | |
|---|---|
| Description: | Capability mastery at a basic level provides minimal evidence of proficiency or demonstration of this capability, the minimum to operate, likely increasing costs or a negative influence on revenue. |

TABLE 2

'Threshold' Delivery Level

| | |
|---|---|
| Description: | Capability mastery at a threshold level is indicative of average proficiency or demonstration of this capability, neutral effect on cost or revenue. |

TABLE 3

'Above Average' Delivery Level

| | |
|---|---|
| Description: | Capability mastery at a above average level is more advanced than average demonstration of the capability, evidence of investment or priority treatment, industrialization or standardization leading to some cost reductions, capability is a competitive strength. |

TABLE 4

'Leading' Delivery Level

| | |
|---|---|
| Description: | Capability mastery at a leading level is more advanced than most Utilities, an industry leader. Likely industrialized or standardized to a high degree, competitive strength for the Utility, strong influence on reducing costs or increasing revenue. |

For FIGS. 2-12, the capability under evaluation may be assigned a level of mastery 138 based on the business's position along the scale of mastery 146 (e.g., the 'basic,' threshold; 'above average,' or 'leading' delivery level). Performance criteria corresponding to the basic 140, threshold 142, above average 144, and leading 145 performance levels populate the HPCA model 100. The performance criteria capture characteristics, and/or other features of the delivery of a capability at a particular performance level. Examples below illustrate performance criteria that provide analysis and benchmarking for utility organizations. The HPCA model 100 performance criteria provide a tool for determining where a platform and capability under examination falls along the scale of mastery 146.

For example, business consultants and business process engineers may interview a business or receive data about the business to determine, measure, or otherwise ascertain the characteristics, criteria, and other features of a particular capability implemented within the business. The consultants and engineers may compare the characteristics of the business to the performance criteria in the HPCA model 100 and arrive at an assessment level 138 for the capability under examination. In doing so, for example, the consultants and engineers may identify where the capability under examination falls in terms of the performance level for each key assessment area of a capability and determine an overall position on the scale of mastery 146 for the capability under examination. Performance criteria may populate the HPCA model 100 in whole or in part. Multiple high performance capability assessments may be collected and stored with the performance criteria for future retrieval and possible modification in a capability detail pool, discussed below.

Figure 2:
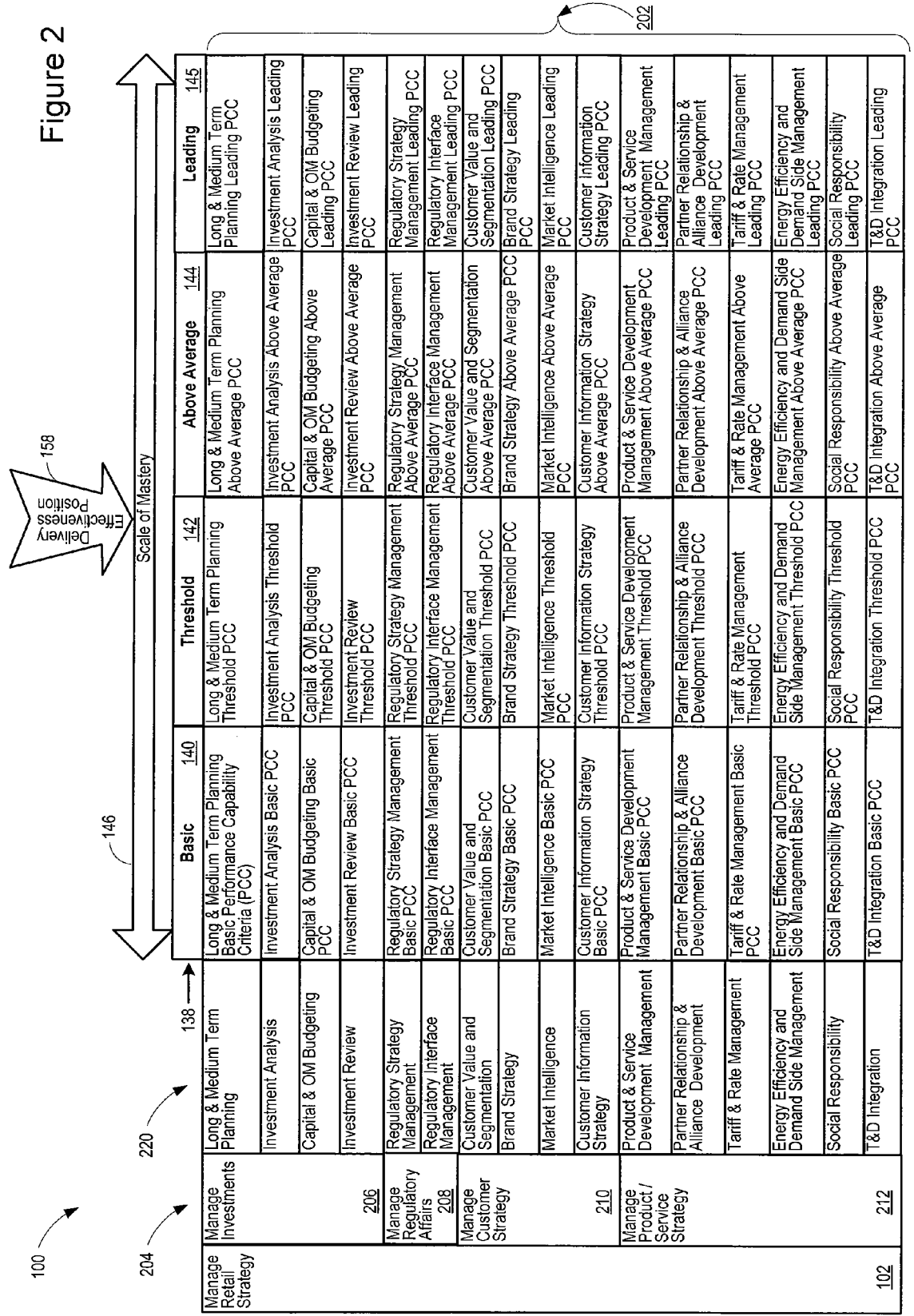
FIG. 2 shows a high performance capability assessment model with manage retail strategy capabilities shown.

FIG. 2 shows the manage retail strategy platform 102 divided into respective capability areas 202. The manage retail strategy platform 102 includes sub-platforms 204 for manage investments 206, manage regulatory affairs 208, manage customer strategy 210, and manage product/service strategy 212. Multiple capability descriptions 220 may be shown for each platform or sub-platform.

Figure 3:
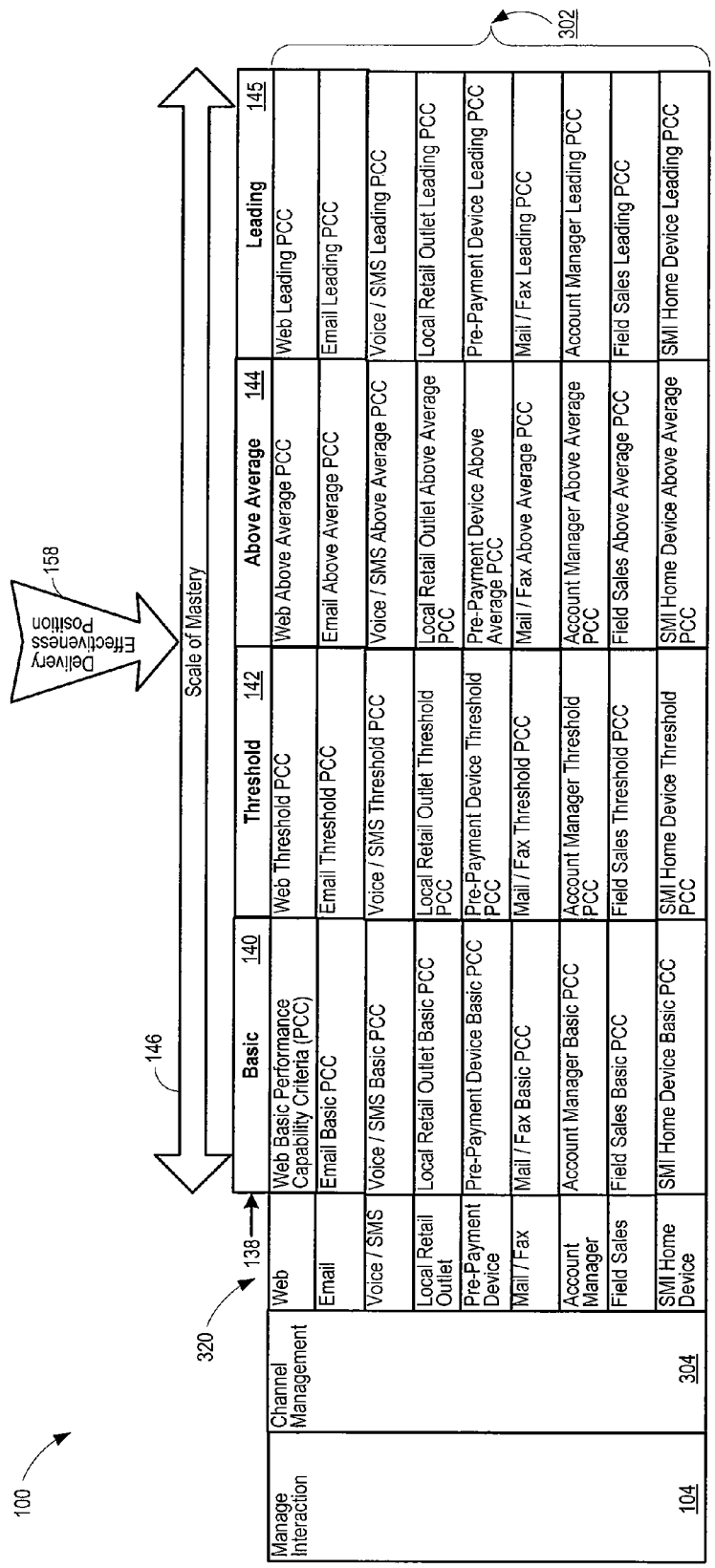
FIG. 3 shows a high performance capability assessment model with manage interaction capabilities shown.

FIG. 3 shows the manage interaction platform 104 divided into respective capability areas 302. The manage interaction platform 104 includes a sub-platform for channel management 304. Multiple capability descriptions 320 may be shown for each platform or sub-platform.

Figure 4:
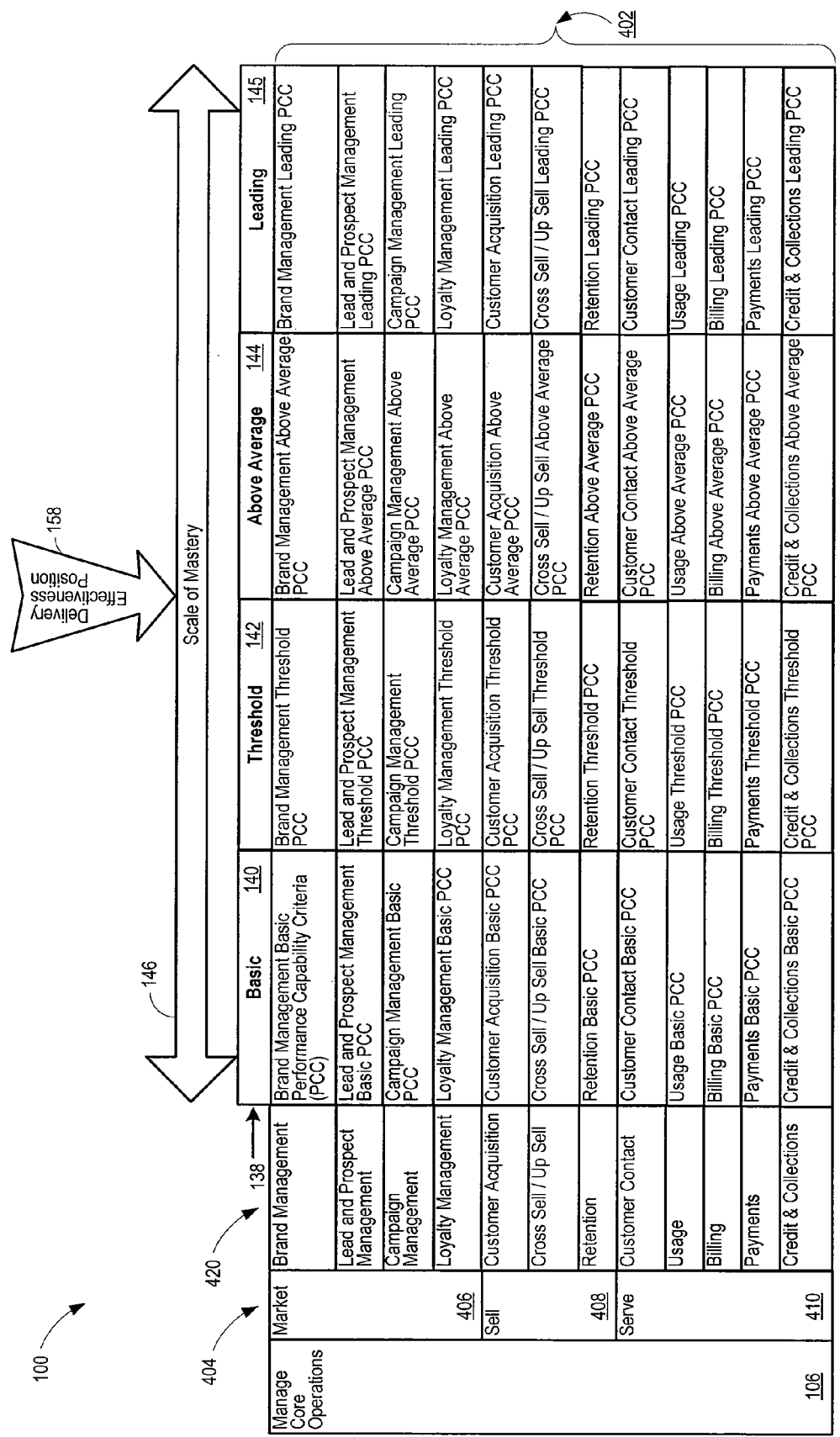
FIG. 4 shows a high performance capability assessment model with manage core operations capabilities shown.

FIG. 4 shows the manage core operations platform 106 divided into respective capability areas 402. The manage core operations platform 106 includes sub-platforms 404 for market 406, sell 408, and serve 410. Multiple capability descriptions 420 may be shown for each platform or sub-platform.

FIG. 5 shows the manage supply platform 108 divided into respective capability areas 502. Multiple capability descriptions 520 may be shown for each platform or sub-platform.

FIG. 6 shows the manage field requests platform 110 divided into respective capability areas 602. Multiple capability descriptions 620 may be shown for each platform or sub-platform.

Figure 7:
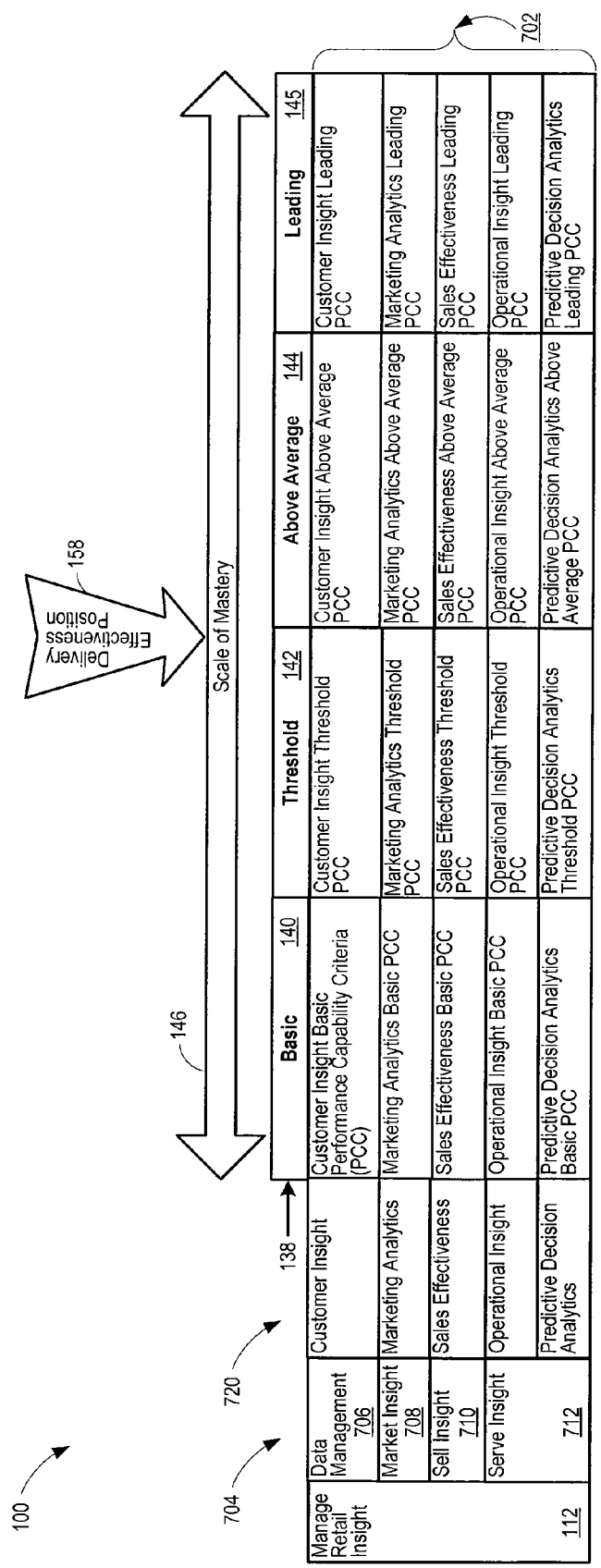
FIG. 7 shows a high performance capability assessment model with manage retail insight capabilities shown.

FIG. 7 shows the manage retail insight platform 112 divided into respective capability areas 702. The manage retail insight platform 112 includes sub-platforms 704 for data management 706, market insight 708, sell insight 710, and serve insight 712. Multiple capability descriptions 720 may be shown for each platform or sub-platform.

FIG. 8 shows the customer advocacy platform 114 divided into respective capability areas 802. Multiple capability descriptions 820 may be shown for each platform or sub-platform.

FIG. 9 shows the monitor performance platform 116 divided into respective capability areas 902. Multiple capability descriptions 920 may be shown for each platform or sub-platform.

FIG. 10 shows the manage compliance platform 118 divided into respective capability areas 1002. Multiple capability descriptions 1020 may be shown for each platform or sub-platform.

Figure 11:
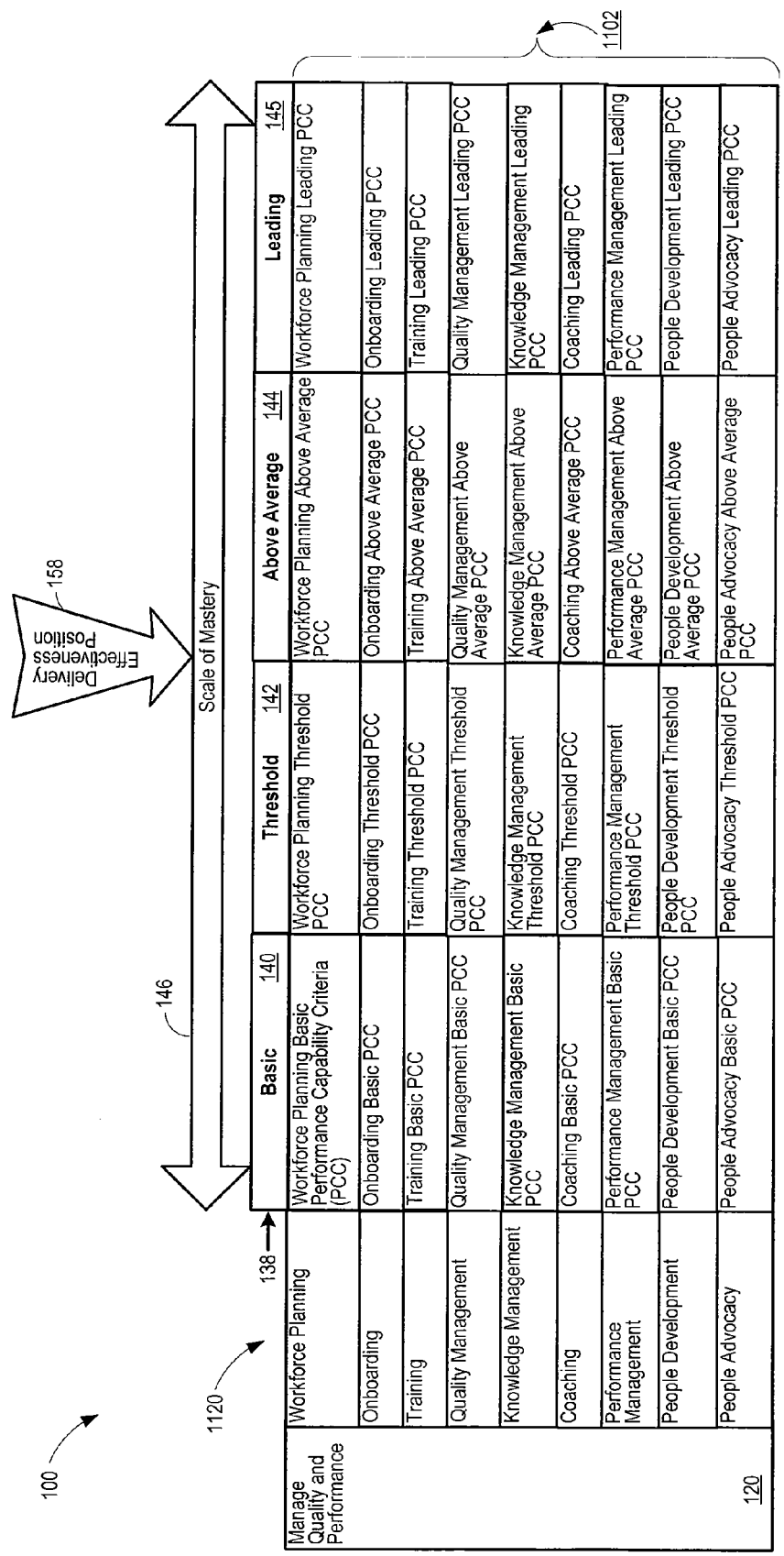
FIG. 11 shows a high performance capability assessment model with manage quality and performance capabilities shown.

FIG. 11 shows the manage quality and performance platform 120 divided into respective capability areas 1102. Multiple capability descriptions 1120 may be shown for each platform or sub-platform.

Figure 12:
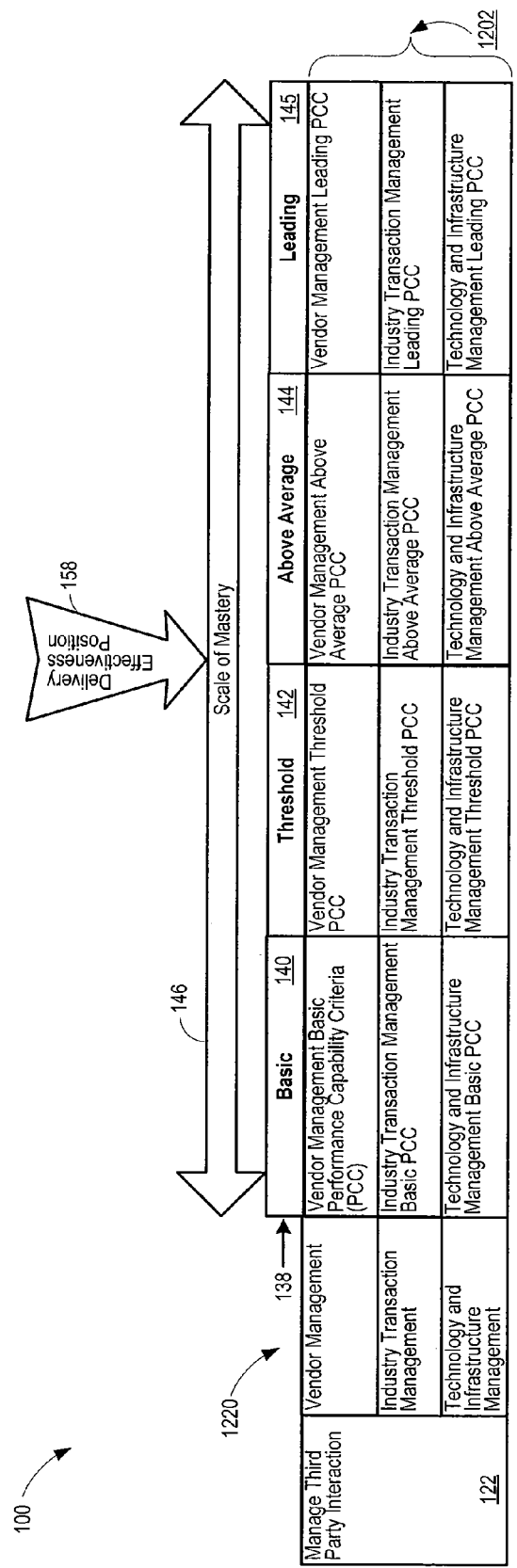
FIG. 12 shows a high performance capability assessment model with manage third party interaction capabilities shown.

FIG. 12 shows the manage third party interaction platform 122 divided into respective capability areas 1202. Multiple capability descriptions 1220 may be shown for each platform or sub-platform.

The following Tables 5-71 provide an explanation of the capabilities and corresponding key assessment areas and performance criteria for each capability within the respective platform. Each capability may include one or more key assessment areas. Each key assessment area may include one or more additional key assessment areas. In other words, a business capability may include sub-capabilities, and therefore, key assessment areas corresponding to the multiple sub-capabilities. The tables below show specific criteria used to analyze each capability.

The following Tables 5-20 provide an explanation of the capabilities and corresponding key assessment areas and performance capability criteria for each capability within the manage retail strategy platform 102.

TABLE 5

Manage Retail Strategy
Manage Investments
Long & Medium Term Planning

| | |
|---|---|
| Description: | Long & Medium Term Planning integrates business strategies into plans to achieve the retail utility's vision of the future. The long and medium-term business plans developed during strategic planning are used to develop approaches for future investments and capital allocation. |
| Basic Criteria: | Planning carried out with little guidance in the form of planning policies and guidelines supported by limited planning and forecasting capabilities<br>Limited planning beyond year ahead<br>Examination of current state based on last year's activity<br>No tools beyond spreadsheets used for performance trends<br>No market data or trends are used to aid in the planning cycle<br>Some longer term plans (2-5 years) for specific programs<br>Differing unit plans are held in different formats or systems making integration difficult<br>No single aggregated view of investment plan, except for specific programs |
| Threshold Criteria: | Planning carried out by individual units using central guidelines and is supported by select individuals from various departments with strong planning and forecasting skills<br>No standard process to determine retail capability vulnerabilities<br>Historical activity adjusted for known unusual events and forward looking targets used to examine current capabilities<br>Aggregated past market data used to aid planning cycle<br>Mainly spreadsheet based tools used to review performance trends<br>Comprehensive investment plan for 3-5 year high-level forecasts<br>Integrated view of plan built up for business plan, but limited to financial information |
| Above Average Criteria | Central function manages longer term planning, guided by a comprehensive set of planning guidelines and is supported by a highly skilled team in planning and forecasting<br>Examination of current capabilities based on adjustments to historical baseline, derived from statistical trend analysis and forward looking targets<br>Quantitative and qualitative understanding of markets incorporated into planning<br>Non-formalized process in place to assess deficient areas on a case by case basis<br>Some use of sensitivity and scenario analysis carried out to test plans<br>Limited use of more advanced decision support tools to review performance trends<br>Rolling 5 year integrated plan, supplemented by longer term forecasts for specific programs<br>Aggregated and aligned plan generated, but involves manual processes |
| Leading Criteria: | Central function manages longer term planning, guided by a comprehensive set of planning guidelines and is supported by a highly skilled team in planning and forecasting<br>Examination of current capabilities based on adjustments to historical baseline, derived from statistical trend analysis and forward looking targets<br>Quantitative and qualitative understanding of markets incorporated into planning<br>Non-formalized process in place to assess deficient areas on a case by case basis<br>Some use of sensitivity and scenario analysis carried out to test plans<br>Limited use of more advanced decision support tools to review performance trends<br>Rolling 5 year integrated plan, supplemented by longer term forecasts for specific programs<br>Aggregated and aligned plan generated, but involves manual processes |

TABLE 6

Manage Retail Strategy
Manage Investments
Investment Analysis

| | |
|---|---|
| Description: | Investment Analysis develops the comprehensive business cases required to enable strategic business decisions, related to policy and planning direction, in a manner that optimizes risk and reward. |

TABLE 6-continued

Manage Retail Strategy
Manage Investments
Investment Analysis

| | |
|---|---|
| Basic Criteria: | Ad hoc process for analyzing projects |
| | No coordinated methodology for segmentation of projects |
| | No clear understanding of intentions for business modeling and analysis framework |
| | Appraisal methods vary by project type and location |
| | No clearly defined allocation criteria for investments or marketing initiatives |
| | Lack of consistent methods for allocation |
| | Limited amount of data available for use |
| | Ad hoc authorization procedures |
| Threshold Criteria: | Projects prioritized as part of planning and budgeting cycle process, but no framework or audit trail for decisions made |
| | Projects only segmented by project size, budget category |
| | Ad hoc cost-benefit analysis on certain projects with results being inconsistently applied |
| | Consistent allocation criteria defined, but inconsistent application with no ability to roll up results into master reports |
| | Data is available but is not fully leveraged |
| | Defined procedure for approving investments and authorization level for projects based on size of project |
| Above Average Criteria | Phasing of projects driven by a well-defined framework based on business drivers and cost-benefit analysis |
| | Investments segmented by drivers, project size and other factors, e.g. risk |
| | Financial appraisal (payback period, NPV) in addition to technical evaluation utilized |
| | Allocation criteria defined and understood and applied consistently by the business |
| | Wide range of data available which is accurate and consistent |
| | Authorization level and appraisal requirements based on size of project and other factors - e.g. risk, level of discretion, investment driver |
| Leading Criteria: | Consistent use of decision support tools, sensitivity analysis and scenario analysis for project analysis and the formulation of business cases |
| | Regular process to review drivers of prioritization |
| | Polices and processes to ensure projects segmented using a multi-dimensional approach - size, driver, risk, level of discretion, etc. |
| | Clear processes in place to distribute results for informed decision making |
| | Easy collation of results into master plans for entire business units |
| | Projects assessed on the basis of technical, financial, and risk considerations using a standard ROI framework |
| | Allocation criteria for each investment type are defined, clearly communicated and implemented (financial, technical and operational characteristics) |
| | Authorization and appraisal based on sophisticated segmentation of investment types allows greater focus on high risk projects, less bureaucracy for small/low risk projects |

TABLE 7

Manage Retail Strategy
Manage Investments
Capital & OM Budgeting

| | |
|---|---|
| Description: | Capital & Operations Management Budgeting develops forecasts and budgets for capital allocation, expenditures, and income from assets as well as initiatives based on internal performance requirements and stakeholder mandates. |
| Basic Criteria: | Central finance function set top down budget |
| | Budget is seen as more of a reconciliation tool and is checked infrequently |
| | Ad hoc usage of data tools to support budget planning |
| | Cost of marketing initiatives not tracked |
| | No standard measures used for budgeting |
| | Bottom up plans to meet budget made 'ad hoc' with limited coordination |
| | Budget based on previous years' budgets with central adjustment |
| | No ability to re-allocate, adjust budgets across business units |
| | Little to no linkage between overall planning and budgeting |
| Threshold Criteria: | Budgets are checked frequently |
| | Data tools restricted to basic financial measures |
| | Cost of marketing initiative execution monitored and managed |
| | Traditional measures used for cost planning |
| | Budget based on previous years' budgets with defined process for accommodating local or exceptional events |
| | Budget reports generated manually on a periodic (i.e. quarterly) basis |

TABLE 7-continued

Manage Retail Strategy
Manage Investments
Capital & OM Budgeting

| | |
|---|---|
| Above Average Criteria | Some ability to adjust budgets, but no formal process - requires time-consuming negotiation |
| | Static links between overall planning and budgeting |
| | Plans driven mainly at local level, with limited visibility of higher level issues |
| | Budgets are checked frequently and leveraged as strategic assets for decision making |
| | Limited use of scenario based planning tools |
| | Costs of marketing initiative execution are monitored and managed individually |
| | A top down plan made and communicated as a template for the business units. Bottom up plans are then made within constraints set by the top down plan |
| | 'Zero-based' plans utilized |
| | Automated budget reports generated quarterly but standardized format not utilized |
| | Formal governance and appeal process for re-allocating budgets and for adjusting operating and capital expenditures |
| | Formalized linkages established between budgeting and planning process |
| Leading Criteria: | Central planning function empowered to adjust budgets in order to compensate for unplanned events or changing priorities |
| | Data is used as predictive tool as much as for reporting purposes |
| | Data and scenario planning tools are used in the budget preparation |
| | Costs of marketing initiative execution are monitored and managed individually and by channel |
| | Iterative planning process, combining and reconciling top-down and bottom up plans |
| | 'Zero-based' and 'driver-based' plans |
| | Standardized automated process for continuous monitoring and reporting |
| | Central planning assumptions for high level factors and coordination to align overall plan |
| | Two-way continuous closed loop between budgeting and planning process |

TABLE 8

Manage Retail Strategy
Manage Investments
Investment Review

| | |
|---|---|
| Description: | Investment Review provides continuous reporting, review and assessment of capital expenditures and initiatives in order to monitor investment performance, assess benefits realization and develop lessons learned for use on future programs and initiatives. |
| Basic Criteria: | No systematic review of individual projects or programs |
| | No review of processes or policies for investment review |
| | Control information rarely available in time to provide any corrective response to issues |
| | Data on individual projects not readily available |
| | No consistent framework for measuring and monitoring unit costs |
| | No ability to view aggregated investments except in terms of total spend vs. budget |
| | Data at too high a level for managers to target problems |
| | No mechanism to capture and communicate best practices |
| | Investment reviews are only conducted reactively |
| Threshold Criteria: | Review of major programs with large identified cost variances |
| | Operational data is aggregated up to provide consolidated views, but requires cumbersome manual processes |
| | Timely data available for financial and budget metrics only |
| | Performance against investment plan is evaluated, but no formal, consistent process for measurement |
| | Monitoring reports on individual projects can be obtained, with significant manual effort |
| | Investment spending monitored in total, and by major driver |
| | Feedback on processes and policies captured ad hoc |
| | No formal process for knowledge sharing - communication on major events ad hoc |
| | Investment reviews are conducted on an ad hoc basis creating a reactive solution |
| Above Average Criteria | Review of major programs and projects for cost variances by business unit |
| | Previous year's activities are reviewed, but no formal mechanism for incorporating changes into next year's business and planning decisions |

TABLE 8-continued

Manage Retail Strategy
Manage Investments
Investment Review

| | |
|---|---|
| Leading Criteria: | Timely reporting available for financial and operational performance measures for specific initiatives
Monitoring of spend vs. plan at key intervals
Full variance analysis covering unit costs, timing, key outputs
Program spend assessed regularly for variances
Regular process to capture and communicate best practices, lessons learned and methods for incorporating knowledge into updated processes
Proactive approach and processes in place
Analysis of the effectiveness of all projects and programs in delivering outcomes
Systematic review of processes and procedures, root cause analysis and changes incorporated into planning guidelines
Performance against investment plans part of a balanced scorecard
Ongoing monitoring of actual spend, volumes, timing, outputs vs. business plan and regulatory targets
Automated information solutions that enable timely reporting of variances at level of detail appropriate for management and presented in a user friendly format
Program and major projects monitored and controlled throughout the year, using tools to assess variances
Process for correcting performance
IT solutions to support knowledge sharing
Proactive approach and processes in place to actively monitor and utilize investment reviews for forecasting |

TABLE 9

Manage Retail Strategy
Manage Regulatory Affairs
Regulatory Strategy Management

| | |
|---|---|
| Description: | Regulatory Strategy Management defines the process to develop a strategy for meeting regulatory requirements and business needs and ensuring that all operations are aligned to meet the goals of that strategy. The capability includes defining the requirements of a risks and controls program and communication plan for regulators. |
| Basic Criteria: | Regulatory strategy is inconsistent with attempts to follow and change the regulators' agenda
No communication plan in place
Strategy is driven by a focus on in-depth understanding of the industry rules rather than on commercial appropriateness
Management reacts to regulatory requirements or issues only once they break a particular compliance threshold
Internal reporting is based on mandatory regulatory requirements |
| Threshold Criteria: | Regulatory strategy is consistent but focuses on following the regulators' agenda rather than working collaboratively with other industry parties to instigate change
Ad hoc communication plan is in place but there is no formal process for updates
Ad hoc response processes are in place but are not consistent
Regulatory strategy considers commercial appropriateness - the retailer's position in industry/regulatory league tables are taken into account to ensure strategic programs improve ranking
Management might react to regulatory requirements too soon which adds far more costs than benefit
Internal reporting is based on mandatory regulatory requirements and a need to understand industry needs/performance |
| Above Average Criteria | Regulatory strategy considers that regulations should be considered in context of commercial decisions, i.e. sometimes it is appropriate to challenge/negotiate terms for new mandatory changes
Retailer develops an annual communication plan for regulatory management
Management proactively seeks to influence regulatory requirements
Internal reporting integrates regulatory compliance with commercial/operational performance
Standard processes are in place to respond to regulator requests
Retailer effectively self-regulates operations and processes and supports an independent dispute resolution body which is established and financed with the principal function of addressing account and billing disputes where the customer has been unable to resolve the dispute with their retailer. |

TABLE 9-continued

Manage Retail Strategy
Manage Regulatory Affairs
Regulatory Strategy Management

| | |
|---|---|
| Leading Criteria: | A holistic approach to regulatory strategy that aligns commercial decisions and industry stakeholders is supported by a multi-channel communication plan that is reviewed on an ongoing basis<br>Retailer employs a wide range of techniques to shape the political and regulatory agenda in order to transform the industry and derive commercial advantage - for example the retailer might initiate and chair critical industry initiatives that bring together peers within the industry<br>Internal reporting integrates regulatory performance with commercial/operational performance is proactively managed/responded to<br>Retailer is able to react to new policies - for example, if the regulator states that retailers should not seek payment from customers where the retailer is at fault for not billing the customer for a certain amount of years, the retailer is able to quickly calculate the effect of this and implement the change to billing as required |

TABLE 10

Manage Retail Strategy
Manage Regulatory Affairs
Regulatory Interface Management

| | |
|---|---|
| Description: | Regulatory Interface Management includes the management of all communication with external regulatory bodies including negotiations and policy recommendations. This capability supports the Retail utility's ability to be consistently compliant with appropriate regulation. |
| Basic Criteria: | Response to data requests extremely manual/labor intensive and the need to produce evidence of compliance drives poor/flawed behavior within the organization<br>Difficulty in managing to one version of the data as communications are mostly uncoordinated<br>Regulatory interfaces are average - the retailer is not usually prepared for negotiations with the proper data and supporting documents<br>Manual monitoring of compliance is often flawed and creates inconsistencies<br>Ineffective, reactionary communication with regulator |
| Threshold Criteria: | Response to data requests are labor intensive but mostly accurate and therefore the high cost is tolerated and there is no inclination to make changes to the system in place<br>Difficulty in managing to one version of the data and therefore coordinated communication is labor intensive<br>Regulatory interfaces are managed to maintain status-quo relations with no clear process for negotiations<br>Monitoring of compliance is labor intensive but usually accurate. There is a lack of a cohesive system to monitor compliance cost effectively<br>Neutral relationship with the regulator via one-way communication (retailer to regulator)<br>Ad hoc execution of communication plan |
| Above Average Criteria | Response to data requests is automated in part, usually requires manual checks before response is sent<br>Data is generally consistent and coordinated communication is managed in line with a high-level document plan<br>Monitoring of compliance is tied to the automated response system resulting in greater accuracy and less FTE's required to oversee the process<br>Regulatory interfaces and negotiations are managed well and are aimed at building trust<br>Good relationship with the regulator via one-way communication (retailer to regulator)<br>Communication plan is executed well, however there is no process in place to measure it effectiveness |
| Leading Criteria: | Response to data requests is automated and of high-quality<br>Data is collated from a single source and is reliable<br>Monitoring of compliance is fully automated and standardized regular reports are produced by the system<br>Regulatory interfaces and<br>negotiations are proactively managed with a robust business case for investment support |

TABLE 10-continued

Manage Retail Strategy
Manage Regulatory Affairs
Regulatory Interface Management Excellent relationship with the regulator via two-way proactive communication approach
Comprehensive communications plan outlining all key interfaces and objectives are executed effectively and efficiently

TABLE 11

Manage Retail Strategy
Manage Customer Strategy
Customer Value and Segmentation

| | |
|---|---|
| Description: | Customer Value and Segmentation includes determining the approach and executing customer valuation, profiling and the definition of customer segments for the purposes of differentiated treatment. This capability encompasses all aspects of defining the differentiated customer experience (offerings, communications, pricing, etc) which enables a utility to apply its customer strategy at the individual level. |
| Basic Criteria: | Customer base not defined in terms of segments or clusters<br>Customer Lifetime Value (CLV) not known<br>Customer value strategy is focused on the acquisition of new customers, rather than acquisition and retention due to lack of understanding of relative values within current customer base<br>Customer offer is defined according to product/service availability rather than customer demand modeling |
| Threshold Criteria: | Customer segments are loosely defined according to logical attributes<br>Average Customer Lifetime Value (CLV) assessed periodically<br>Strategy is not informed by CLV - for example customer growth targets are focused on the acquisition of new customers, rather than acquisition and retention of high-value customers<br>Simple technology in place for customer profiling provided by an application that is not dedicated to this function and therefore has limited use<br>Profit potential of each segment is not formally evaluated in quantitative terms<br>Customer offers are defined by a balance of product/service availability as well as basic customer segmentation but customer treatments may be similar<br>No standard review of effectiveness of customer value and segmentation approach |
| Above Average Criteria | Target customer base is segmented according to demographic profiles<br>Customer segments are defined according to logical attributes and are sponsored by a segment owner who represents the customers in strategy discussions across the organization<br>Customer Lifetime Value (CLV) assessed periodically for defined customer segments<br>CLV per segment is reported to other areas of the organization periodically but data is often difficult to evaluate and does not consistently impact strategy of other retail functions<br>Sophisticated technology in place for customer profiling but this is not used on a regular basis<br>Profit potential of each segment and cluster is determined by reviewing revenue against cost to serve<br>Customer offers are driven by segmentation analysis and some differentiated treatment may be available<br>Ad hoc review of effectiveness of customer value and segmentation approach |
| Leading Criteria: | Target customer base segmented according to customers' needs, behaviors and demographic profiles<br>Customer segments and clusters defined according to tangible and logical attributes, sponsored by segment owners and tracked according to movement and behavior<br>Customer Lifetime Value (CLV) is known and maintained for individual customers as well as all defined customer segments and clusters<br>Segment and cluster values are reported to other areas of the organization on a frequent basis to inform strategy for customer acquisition, retention and growth plans, marketing concepts and product development<br>Sophisticated predictive tools and models used for customer profiling on a regular basis<br>Formal evaluation of ROI per customer segment<br>Customer offers and treatments are defined based on predictive |

TABLE 11-continued

Manage Retail Strategy
Manage Customer Strategy
Customer Value and Segmentation

| | |
|---|---|
| | segmentation and unique treatments are available tailored to customer need |
| | Regular review of effectiveness of customer value and segmentation approach |

TABLE 12

Manage Retail Strategy
Manage Customer Strategy
Brand Strategy

| | |
|---|---|
| Description: | Brand Strategy includes the definition of the brand promise, the role of the brand in a retail utility context, brand stretch opportunities and the overall customer value proposition. Brand strategy includes defining how to measure brand value and customer loyalty. |
| Basic Criteria: | Poorly defined brand promise with no tangible value proposition |
| | No proactive research into or consideration for brand stretch opportunities |
| | Brand measurement is not defined |
| | Brand strategy effectiveness not measured |
| Threshold Criteria: | Inconsistent brand promise with a qualitative value proposition described in subjective terms |
| | Brand stretch opportunities are considered and sometimes implemented but without thorough cost/benefit analysis and therefore is perceived as being ineffective |
| | Brand measurement is defined in qualitative rather than quantitative terms |
| | Brand strategy effectiveness measured at inconsistent intervals |
| Above Average Criteria | Defined brand promise with a tangible value proposition for the customer |
| | Brand is sufficiently strong to attract brand stretch opportunities that are taken up when deemed to bring about tangible benefits - these include extending the brand into new markets |
| | Brand measurement is defined in quantitative terms and there are distinctions made between brand value and brand loyalty |
| | Brand strategy effectiveness measured regularly and ad hoc action taken to adjust brand strategy |
| Leading Criteria: | Clearly defined brand promise with tangible value proposition for each market or customer segment - this is frequently reviewed according to customer and market intelligence |
| | Brand is sufficiently strong to attract and drive brand stretch opportunities. Benefits are realized in terms of increasing customer loyalty, market share and brand value - even compared with brands in other industries |
| | Role of Brand is clearly defined within the organization - in line with the brand promise and strategy supports 'living the brand' |
| | Brand measurement is defined in quantitative terms and benchmarked against other players in the utilities and other consumer industries |
| | Brand strategy effectiveness measured regularly and actions taken to adjust brand strategy when appropriate |

TABLE 13

Manage Retail Strategy
Manage Customer Strategy
Market Intelligence

| | |
|---|---|
| Description: | Market Intelligence is the ability to acquire detailed information and research into the competitive landscape, regulatory environment and customer base demographics. The timely acquisition and dissemination of this information to key internal stakeholders and partners is critical to effective market responsiveness. |
| Basic Criteria: | No proactive market research or analysis |
| | Market research is reactive, typically infrequent and unstructured |
| | Limited analysis of demographic data in the public domain - e.g. GDP or population trends |

TABLE 13-continued

Manage Retail Strategy
Manage Customer Strategy
Market Intelligence

| | |
|---|---|
| Threshold Criteria: | No proactive market research and analysis<br>Any market research or analysis is reactive and typically developed in silo capability groups (e.g. pricing) with some coordination<br>Simple evaluation of macro economic trends and their impact on country specific markets<br>Analysis of demographic data in the public domain - e.g. GDP, population and demographic trends |
| Above Average Criteria | Structured and regular market analysis activity, but no dedicated resources within the company<br>Market intelligence data is centralized and used primarily in marketing or consumer affairs - it is not leveraged throughout the rest of the company<br>Evaluation of macro economic trends and their impact on a country level on target and current markets<br>Quantitative analysis of acquired demographic data at a geographic, market and regional level resulting in predicted trends<br>General insights gained about the market or major competitive activity |
| Leading Criteria: | Dedicated Market Intelligence/Research function managing structured and regular market analysis activity<br>Market intelligence is centralized and analysis is integrated across functional teams<br>Market and consumer intelligence is gathered and analyzed using primary research techniques such as customer/prospect surveys<br>Evaluation of macro economic trends and their impact on a global level on target and current markets<br>Qualitative and quantitative analysis of demographic data at a geographic, market and regional level resulting in predicted trends, customer behavior and support for customer insight applications<br>Specific insights gained about individual competitors' movements or actions |

TABLE 14

Manage Retail Strategy
Manage Customer Strategy
Customer Information Strategy

| | |
|---|---|
| Description: | Customer Information Strategy includes identifying what information is to be captured for each customer and how this data is gathered, stored, protected, used, shared, transferred and disposed of. |
| Basic Criteria: | Customer data is not integrated into operational effectiveness capabilities, customer insight or planning sessions<br>Required, collected and stored customer information is stored in multiple applications with various access restrictions - data entities are ambiguous (e.g. all free-text fields)<br>Definition of data requirements are not centrally formulated and controlled<br>Customer data is accessible on request, as per regulatory requirements<br>Data collection strategy does not include collection of touch-point and channel integration data<br>Data is not integrated across channels<br>Agent/team hand-offs require some manual data transfer<br>No coordination across different systems and applications<br>No meta-data definitions<br>Strategy for security solution is not updated on a regular basis and presents a recognizable threat to the storage of customer data and high value information flows |
| Threshold Criteria: | Customer data is treated as a business requirement<br>Required, collected and stored customer information is stored and is available across multiple views - definition of data entities are inconsistent<br>Ownership of data definitions are clearly understood<br>Customer data is accessible to customer via customer service and upon request on an as needed basis for compliance<br>Data collection strategy includes intention to collect touch-point data and channel integration data<br>Data collection strategy includes external data gathering (e.g. credit ratings)<br>Agent/Team hand-offs require some manual transfer<br>Data quality processes are not standardized across all platforms<br>Ad hoc tasks to create/maintain meta-data definitions but task is rarely completed and effectively reviewed/used |

TABLE 14-continued

Manage Retail Strategy
Manage Customer Strategy
Customer Information Strategy

|  |  |
|---|---|
| | Strategy for security solution is up-to-date with current technology and provides the minimally required level of protection against data threats |
| Above Average Criteria | Customer data is treated as basic operational tool |
| | All required, collected and stored customer information is available to view such that there is an integrated view of customer data and data entities are defined |
| | Ownership of data definitions are clearly understood and centrally controlled and updated |
| | Customer data is accessible to customer via web and available in writing upon request for compliance purposes |
| | Data collection strategy includes collection and validation of touch point data and channel integration data as well as external data gathering such that data is validated/enhanced (e.g. credit ratings and addresses) |
| | Integrated data strategy and data hub such that agent/team hand-offs do not require manual data transfer |
| | Dedicated data quality assurance team who maintain meta-data is not used by all other areas of the organization |
| | Security solution strategy is up-to-date with current technology offerings and required security levels and reviewed annually |
| Leading Criteria: | Customer data is treated and leveraged as a strategic asset |
| | All required, collected and stored customer information is available to view such that there is a single view of a customer - each data entity is clearly defined and validated at point of entry |
| | Data definitions are proactively managed to ensure the right data is being collected and is appropriately protected |
| | Data collection strategy includes formal collection and validation of touch-point data and channel integration which is fully integrated into CRM systems and forwarded to retail insights |
| | Dedicated data quality assurance team who maintain meta-data, and this is used as a reference by all other areas of the organization to enable intelligent analytics |
| | Strategy addresses end-to-end standardized risk mitigation processes for managing the security of customer information from collection to disposal |

TABLE 15

Manage Retail Strategy
Manage Product/Service Strategy
Product & Service Development Management

|  |  |
|---|---|
| Description: | Product & Service Development Management covers a retailer's ability to bring a product to market. Included in this capability is the development of a product itself, i.e. tariff rate structure, various fixed term contracts, sustainable energy offerings, and the delivery of the product via the appropriate channels. |
| Basic Criteria: | New products/services are investigated and developed in silos on an ad hoc basis |
| | Processes for product/service development (concept to pilot) do not include consideration for regulatory requirements so that products are released that are not compliant - e.g. not all products are suitable for vulnerable customers |
| | Product or service approval is inefficient leaving other areas of the operation scrambling to accommodate approved products or services at the last minute |
| | No capacity for consideration of product/service diversification |
| | Products are priced by the associated tariff - there is no formal consideration for discounting or other incentive rules |
| | Products rarely contain a corporate social responsibility or sustainability component |
| | Products do not promote energy efficiency |
| Threshold Criteria: | New products/services are investigated and developed systematically, but in silos |
| | Product/service development procedures include a regulatory compliance check but compliance is not always enforced |
| | Limited capacity for consideration of product/service diversification |
| | Products are priced based on a limited set of data and price is only defined in terms of a tariff. Tariff changes are time-consuming and costly and new products frequently require new tariffs |
| | Products occasionally contain a corporate social responsibility or sustainability component |

TABLE 15-continued

Manage Retail Strategy
Manage Product/Service Strategy
Product & Service Development Management

| | |
|---|---|
| Above Average Criteria | New products/services are investigated, developed and released according to strategy. Regulatory compliance is ensured at the first stage of development and is a mandatory requirement for development work to start
Product development function includes ad hoc searches for product/service diversification opportunities but these are not always carried through to thorough evaluation and therefore seen as a redundant investment
Fact-based pricing recommendations and decisions are coordinated between some business units and are primarily driven by competition
Products usually contain a corporate social responsibility or sustainability component |
| Leading Criteria: | Product/services are investigated, developed and released according to strategy and evaluated throughout the development lifecycle through customer analytics
Regulatory compliance is ensured at the first stage of development and is a mandatory requirement for development work to start
Information on customer values, predicted needs and actual uptake, channel requirements and internal company needs is input for a dedicated product development team
Product development is focused on product portfolio optimization and retailer is good at product/service lifecycle management
Retailer deploys a center of excellence approach to manage ideation through to commercialization of new products/services across the enterprise
Customer centric methodologies (e.g. customer feedback data is fed back into process methodologies)
Products align with retailer's stated core values (e.g. always contain a corporate social responsibility or sustainability component)
Organization has an integrated, transparent view of products/service lifecycle and plan proactively for product/service introduction |

TABLE 16

Manage Retail Strategy
Manage Product/Service Strategy
Partner Relationship & Alliance Development

| | |
|---|---|
| Description: | Partner Relationship & Alliance Development is the ability to leverage current alliances and identify and develop new alliance opportunities to produce enhanced service offerings. |
| Basic Criteria: | No process in place to understand the current alliance footprint
Prospective partners are not fully investigated and impact of the alliance not fully realized prior to contractual commitment
Perceived lack of opportunity to benefit from an alliance due to a somewhat introverted product/service strategy
Retailer has limited integration partnerships
Rationale and business case for the formation of alliances is not clear
Alliance is fundamentally not profitable for one or all parties
No periodic review of partnerships is conducted
Different parts of organization have entered into agreements with vendor/partner at different points in time |
| Threshold Criteria: | Ad hoc understanding of current alliance footprint
Alliance opportunities are created as a reaction to offers rather than through proactive search/investigation initiatives
Alliance is designed to benefit driving party and therefore biased in terms of realized benefits
Specific partner information available for manual exchange
Alliances and partnerships are strategic but effort is not sufficient to capitalize on the full value potential
Alliance is successful in the short-term only and therefore does not promote growth
The customer can recognize differences in services based on differing partnership relationships
Ad hoc review of partnerships with no real process to measure realized value |

TABLE 16-continued

Manage Retail Strategy
Manage Product/Service Strategy
Partner Relationship & Alliance Development

| | |
|---|---|
| Above Average Criteria | Standardized process in place to understand current alliance footprint
Alliance opportunities are sought/investigated in response to a sudden change in customer base/value rather than as part of a long term strategy
Specific partner information available for exchange
Alliance is designed to deliver mutual benefits but benefits are not consistently realized/measured
Alliances are viewed and managed as medium-term relationships and serve to increase customer base but not customer value
The customer experience is delivered uniformly through partnerships, however customers are aware of outsourced services
Partnerships and alliances are regularly appraised |
| Leading Criteria: | Standardized process in place to understand current alliance footprint and assess partnerships on an ongoing basis
Alliance opportunities are proactively sought/investigated as part of a long term strategy to meet customer requirements and promote growth in terms of brand value, customer value and market share
Partner integration with data and application interface
Alliance is designed to deliver mutual specific value-adding capabilities and skills both of which are tangible and proactively evaluated
Alliances are viewed and managed as long-term relationships
The customer does not recognize the involvement or different brand of partnerships
Partnerships and alliances are regularly appraised and measured against a standard set of performance metrics |

TABLE 17

Manage Retail Strategy
Manage Product/Service Strategy
Tariff & Rate Management

| | |
|---|---|
| Description: | Tariff & Rate Management includes the creation and maintenance of a rate or tariff structure including rate proposals, maintaining rate components, rate or tariff changes, regulatory compliance and evaluation of performance. This capability typically encompasses regulated or 'default' rate development and maintenance. |
| Basic Criteria: | Simple rate/tariff structure is developed and released inconsistently
Little/no consideration for demographic of customer base and therefore no segment specific programs, instead generic offerings are discounted/manually manipulated on an ad hoc basis
Inconsistent use of modeling and analysis tools
Ad hoc benchmarking against competition
Rate descriptions on customer bills tend to be compliant with regulatory requirements
Changes to rate/tariffs require system outage due to being hard coded into the CIS/billing system |
| Threshold Criteria: | Simple rate/tariff structure is developed and released periodically, as opposed to being a continuous activity
Segment specific programs are poorly delivered, i.e. uptake is low, schemes are not profitable, customers are still dissatisfied/incurring significant debt
Rate/tariff designed and maintained using relevant modeling and analysis tools
Rate descriptions are compliant with regulatory requirements although this is still a major source of customer complaints
Changes require system outages or significant change requests
Periodic benchmarking against other competitors and/or markets |
| Above Average Criteria | Simple rate/tariff structure is designed in line with product strategies
Segment specific programs are proactively managed and reviewed (i.e. uptake is controlled, impact on customer base and behavior is monitored)
Rate/tariff design and maintenance function is integrated with supply/energy trading systems
All rate/tariff development and change is designed to account for external factors
Rate descriptions and tariff structures compliant with regulatory requirements
Simple rate/tariff changes can be done as a system configuration change
Regular benchmarking against other competitors and/or markets |

TABLE 17-continued

Manage Retail Strategy
Manage Product/Service Strategy
Tariff & Rate Management

| | |
|---|---|
| Leading Criteria: | Sophisticated rate/tariff structure is designed in line with current pricing and product strategies |
| | Rate/tariff structure promotes conservation demand side management |
| | Creative special payment programs developed which can be tailored to customer segments and clusters |
| | Rate/tariff designed and maintained using relevant modeling and complex analysis tools, which are integrated with supply/energy trading systems |
| | Dedicated business function responsible for benchmarking offerings against competition |
| | Both simple and complex changes to rate/tariffs are enabled as system configuration changes as opposed to system codes changes requiring system outage |
| | Ongoing benchmarking against other competitors and/or markets |

TABLE 18

Manage Retail Strategy
Manage Product/Service Strategy
Energy Efficiency and Demand Side Management

| | |
|---|---|
| Description: | Energy Efficiency and Demand Side Management (DSM) covers the development, operation and review of demand side management and energy efficiency programs. The capability includes advanced metering utilization, energy audits, conservation and "green" customer care campaigns to promote efficient energy use. |
| Basic Criteria: | Energy conservation initiatives have inconsistent management backing and are not aligned with customer care strategies |
| | Basic energy services offered as required by regulatory body |
| | No communication plan for DSM initiatives in place |
| | Some 'Green' customer incentives exist that are designed for existing products but do not promote a long-term commitment |
| | No individual proactive audits available |
| | Automated meter reading in place that is not tied to DSM programs |
| Threshold Criteria: | Energy conservation initiatives are loosely tied to customer care objectives |
| | Energy conservation initiatives have management backing but are inhibited by lack of consistent levels of investment and sponsorship |
| | Offerings meet regulatory requirements and are predominantly focused on limited conservation programs (e.g. residential insulation, commercial building management) |
| | Communication plan attempts to promote energy conservation to customers within the confines of the available product offerings |
| | Targeted energy efficiency information provided through bills and marketing |
| | DSM and energy conservation consulting available to some customers - energy audits available on request (not online) |
| | Some investment in intelligent grid and advanced metering technology but benefits not fully recognized |
| Above Average Criteria | Energy conservation initiatives supported by a recognized business case and management function based on customer care objectives |
| | Significant marketing of energy efficiency as a concept, as well as how efficiencies can be achieved using available product offerings |
| | Energy conservation products offered without price or discount incentive to the customer |
| | Energy services products offering incentives to customers for driving predictability of demand |
| | DSM and energy conservation consulting available to all customers (e.g. energy audits provided via basic web/e-tools), program participation enabled for some customers (e.g. offered for a premium price and therefore excludes low-income homes) |
| | Advanced metering used to enable lower service costs, value-added services, alternate power rates for customer retention and lower bills and greater usage transparency for all types of customers |
| Leading Criteria: | Dedicated strategic energy conservation team and operational business function supported by a tangible business case |
| | DSM strategies far exceed regulatory requirements |
| | Energy conservation marketing campaigns designed to sell the concept, implement changes in customer behavior and promote appropriate product offerings |
| | Energy conservation and 'Green' products are offered to customers with a tangible and economical incentive (e.g. may be subsidized or result in significant discounts/credits) |

TABLE 18-continued

Manage Retail Strategy
Manage Product/Service Strategy
Energy Efficiency and Demand Side Management DSM and energy conservation consulting available to all customers (e.g. sophisticated web/e-tools available to manage demand and obtain energy audits). Program participation is enabled for all customers at no extra cost
Smart Metering used to enable real-time, two-way communication with customers to provide: time of use billing, integration with home devices to adjust usage, incentives for energy curtailment and optimized web services-retailer has complete predictability of peak demand

TABLE 19

Manage Retail Strategy
Manage Product/Service Strategy
Social Responsibility

| | |
|---|---|
| Description: | Social Responsibility includes the development of offerings and communications focused on social responsibility and community support initiatives. The capability aligns community and charitable involvement with retailer's core values, brand strategy and customer values. It sets out the framework to build a socially responsible retail organization that its employees want to be part of. |
| Basic Criteria: | Little/no consideration for social responsibility programs<br>No focused communication of social responsibility initiatives<br>No requirement for reporting on successful uptake/impact of programs<br>No support for employees to participate in community programs<br>Limited community investment programs |
| Threshold Criteria: | Social responsibility programs are poorly delivered i.e. uptake is low<br>Ad hoc communication of programs is provided on an as needed basis<br>Reporting on successful uptake/impact of programs is biased/subjective<br>Community lacks an understanding of what offerings are available and the details of those initiatives<br>Retailer acts as a participant in one to two events per year<br>Employees are give little support to attend and volunteer for community events<br>Some structure in place to administer and manage corporate social responsibility programs |
| Above Average Criteria | Social responsibility programs are proactively managed and reviewed (i.e. uptake is controlled, impact on customer base and behavior is monitored)<br>Communication plan for community and social programs is integrated into wider annual plans<br>Emphasis on program marketing and promotion via all channels<br>Retailer takes part in community initiatives and is seen as a positive influence on the community<br>Employees are encouraged to partake in functions - no work accommodations made<br>Centralized structure in place to administer and manage corporate social responsibility programs |
| Leading Criteria: | Creative social responsibility programs developed<br>Dedicated multi-channel communication plan is developed for programs on an annual basis<br>High uptake of programs for target customer segment/cluster<br>Retailer creates, leads, sponsors and hosts major community events<br>Community view of retailer is positive and based on frequent community support-retailer good at choosing the right initiate to support (i.e. has good social awareness)<br>Employees are highly encouraged to partake in community initiatives through the People Advocacy function. Employees are provided support for time off and flexible work options<br>Centralized structure in place to administer and manage corporate social responsibility programs to brand and strategy |

TABLE 20

Manage Retail Strategy
Manage Product/Service Strategy
T&D Integration

| | |
|---|---|
| Description: | T&D Integration covers the strategy for communicating, interacting, and transferring knowledge with Transmission and Distribution entities. The communication plan includes supply point updates, field management, meter management and emergency procedures. |
| Basic Criteria: | Standardized communication format is agreed for some communications, as per industry-wide standard (e.g. electronic data exchange format, but messages which are not within specification/not supported in industry-wide format cause significant manual process) |
| | Service level agreements adhered to for most emergency work requests/reports |
| | Emergency procedures are clearly defined and documented but areas of accountability can be inconsistent, utility has breaches of contract on record |
| | Standard manual administration plan and process in place to administer charge, payments, pricing and tariffs |
| | Metering and inventory management processes are standardized |
| Threshold Criteria: | Standardized communication format is agreed for all communications, as per industry-wide standard (e.g. electronic data exchange format but messages which are not within specification cause some manual exception processing) |
| | Emergency procedures are clearly defined and documented with areas of accountability established, no emergency calls are handled outside of an SLA and the utility has no breaches of contract |
| | Metering and inventory management processes are run through a separate electronic data exchange |
| Above Average Criteria | Standardized communication format is agreed for all communications, as per industry-wide standard (e.g. electronic data exchange format, and all messages are validated according to clearly defined industry-wide criteria) |
| | Quality assurance checkpoint implemented for every interface with other entities |
| | Standardized administration plan and process in place which is administered through a two-way electronic data exchange that provides reporting capabilities |
| | Metering and inventory management processes are integrated into the electronic data exchange |
| Leading Criteria: | Real-time communication format through smart or advanced metering system and a web services function for customers, as per industry-wide standards |
| | Continuous quality assurance for every interface with other entities via real-time data flows and proactive maintenance schedules |
| | Operating or service level agreements adhered to for most emergency work requests/reports through optimized communication channels and predictive measures |
| | Emergency procedures are clearly defined and service orders and dispatches are optimized in real time. Emergency calls are handled within agreed SLA |
| | Set-up and response calls for appointments are automated and reported on in real time |
| | Standardized administration plan and process in place which is administered through a two-way, real-time system with automated reporting capabilities |
| | Metering and inventory management is completely held up-to-date with what is in the field versus operational records via the smart or advanced metering system and network |

The following Tables 21-30 provide an explanation of the capabilities and corresponding key assessment areas and performance capability criteria for each capability within the manage interaction platform 104.

TABLE 21

Manage Interaction
Channel Management

| | |
|---|---|
| Description: | Channel Management covers the management and integration of all channels in which customers contact the utility. It ensures channel efficiency and effectiveness by ensuring that there are various and correctly oriented methods in place for the customer to contact the utility. |
| Basic Criteria: | Predominant customer channels include walk-in, field sales, field service, paper mail and fax. |

TABLE 21-continued

Manage Interaction
Channel Management

| | |
|---|---|
| Threshold Criteria: | No channel integration, channels keep multiple records of customer data - heavily administration<br>Service offerings are focused on single channels<br>No definitions exist to specify which services are available through which channels<br>Most or all customer interactions occur within a single channel (e.g., direct mail, call center, internet, branch, etc.)<br>Key assumption is that all required transactions can be completed in one channel per customer<br>No channel demand management discipline in place<br>Staffing forecasts are based primarily on historical interaction volumes<br>Standard channel technologies (e.g. telephone, e-mail, fax, and correspondence routing/queuing capabilities)<br>Routing of customers can only take place within a single channel<br>Predominant customer contact is via the telephone/agent with measurable channel shift towards IVR/WEB. |
| Above Average Criteria | Customer experience is inconsistent across all channels - access similar customer information<br>Channel definitions exist which specify which service will be distributed over which channels<br>All customers are encouraged equally to utilize all available channels without consideration of customer segmentation - limited channel integration<br>Customer agents are trained and proficient for their specific channel, but are not proficient with other channels<br>Business processes for existing channels are imposed on new channels w/ some modification<br>Introduction of new channels is done reactively without evaluating applicability to industry, brand, and customer segments<br>Channel costs are measured<br>Systems are not designed to support seamless routing of customers between channels - routing is based on static business/decision logic<br>CTI technology enables some calls to be routed to an agent off-site (e.g. home working) but the customer experience is inconsistent and the agent is unable to complete all transactions from home. It is likely that home workers are given very specific calls to handle such as credit queries and complaints where their home environment is better suited to the call<br>Increasing automation within the IVR/WEB channels with the IVR and agent still the predominate choice. |
| Leading Criteria: | Full channel integration enables a consistent customer experience across channels - all channels access the same record of customer information<br>Ability to track, monitor and report on forecasted vs. actual interaction volumes<br>Customer agents are trained and proficient at supporting customers on multiple channels<br>Individual business processes are designed to ensure effective execution of each channel<br>Proactive introduction of new channels based on industry trending<br>Staffing forecasts match agent type with anticipated demand from corresponding customer types<br>Channel costs are well defined and optimal operating levels are understood<br>Dynamic routing business/decision logic is user maintainable and takes into account customer and agent information and availability of resources<br>All channels access the same record of customer information. The web service, call center, and third party all have access to a central data hub that is updated and accessed online<br>CTI technology enables some calls to be routed to an agent off-site (e.g. home working) and returned to a call center and customer experience is consistent across on and off-site locations<br>Traditional reader boards and/or closed circuit TV broadcasts are used to communicate alerts (e.g. news of outages, news headlines, TSL, etc.) to customer-facing agents. Some level of investigation and utilization of integrated desktop applications to provide "ticker" information for notifications<br>Increasing utilization of automated channels by the customer (e.g., 40%+) due to well-defined integrated channel strategies, customer segmentation, channel analytics, and customer adoption practices.<br>Channel integration enables a consistent customer experience across all channels and can be tailored for each customer segment/preferences for all channels |

TABLE 21-continued

Manage Interaction
Channel Management

Extensive cross-channel integration - all channels access the same record of customer information
Ability to conference and transfer contacts to remote telecommuting agents - still offering a consistent customer experience
Customers are encouraged to utilize appropriate channels based on customer segmentation (value, preferences, etc.)
Network-based onscreen agent prompting used for alerts, e.g. news of outages or news headlines
Customer interactions are consistent and properly aligned across multiple channels
Company proactively assesses and adds new customer channels (e.g. "chat")
An integrated multi channel strategy is established offering multiple delivery channels with seamless routing
All channels access the same record of customer information i.e. the web service, call center, m-Commerce devices (Palm Pilots, cell phones, WAP), and third party all have access to a central data hub that is updated and accessed online. Operations achieving true Single View of the Customer
CTI technology enables agents to work from home and offers a consistent customer experience, work via a secure network, and immediate data updates in the central hub with the appropriate levels of security.
Enhanced communication and notifications via integrated desktop applications via "ticker" information or integration with CTI information window. Early investigation and utilization of Instant Messaging solutions amongst supervisors and deployed to select agent groups

TABLE 22

Manage Interaction
Channel Management
Web

| | |
|---|---|
| Description: | Channel Management covers the management and integration of all channels in which customers contact the utility. It ensures channel efficiency and effectiveness by ensuring that there are various and correctly oriented methods in place for the customer to contact the utility. |
| Basic Criteria: | Website is rarely updated and no minor improvement assessment has been conducted post launch |
| | Basic web functionality (simple menu structures with informational, account specific, and simple functionality such as balance enquiries, obtaining information on payment methods or obtaining credit agreement details) |
| | Website is not robust and rarely used by customers such that it does not serve as a high-value channel |
| | No metrics identified to drive value] from the site or to gain customer insight |
| Threshold Criteria: | Website is given minor updates on an infrequent basis. Customer opinion has not been taken into consideration when building the site |
| | Web functionality includes transactions that are often requested by customers and do not require personal interaction (for example, changes to payment method, name changes and address changes) - however, these transactions are problematic if not executed correctly/with the right data and therefore the website often cannot process the transaction successfully |
| | Basic self-service options are entirely automated and require no Agent/Back-office intervention. Some advanced functions such as payment arrangements and turn on/off are offered but not automated on the back-end. Basic FAQ deployment and can be difficult to utilize |
| | Updated data resulting from web transaction is not passed to data base immediately |
| | Most customer initiated web transactions require manual processing on the backend due to lack of backend system integration |
| | Website does not serve as a high-value channel, it is costly to provide, maintain and support |
| | Metrics are identified but are rarely tracked |
| Above Average Criteria | Website is on a regular update schedule with major revisions on an annual basis. Customer input is used for the design, updates and revisions |
| | Web functionality includes transactions which are best suited to the web (e.g. balance enquiries, meter read submission and statement requests). While the scope of transactions is somewhat limited, they are unlikely to be problematic (i.e. they can be simply and effectively validated, they can be easily reversed out of the data base with little/no impact on the customer account) |
| | Web personalization with natural language engine |
| | Customer enabled web customization |
| | Integration to non-billing legacy applications and knowledge management |
| | FAQ and natural language query capabilities |
| | Updates to customer data replicated to central hub in real time |
| | Direct web marketing is enabled according to customer segment, current campaign and customer value |
| | Website does serve as a good-value channel as it is relatively inexpensive to provide, maintain and support but it does not significantly reduce the workload for front and back office agents |
| | Some metrics are identified and tracked to drive value from the site |
| Leading Criteria: | Website design includes graphic user interfaces and regular additions and updates. Customer input and mass collaboration techniques are used for website updates |
| | Web-based portal provides a coherent set of |

TABLE 22-continued

Manage Interaction
Channel Management
Web account management transactions which involve complex logic in terms of data validation and proactive cross-sell attempts. Customers are given a holistic view of their account and opportunities for product holding expansion
Interactions tailored to individual customer intelligence & characteristics
Interaction with customer insight by behavior information, value based intelligence, customer segment
Cross-sell & up-sell products (e.g., payment plans, EE/DR, etc.)
3rd party integration such as high-bill analyzers, etc.
Web interaction is used to obtain customer insight and to tailor the customer experience accordingly, e.g. customers are not asked the same question more than once, touch point data is stored and re-used, a 'call me' and/or chat facility is available
Website is core component of channel strategy
Specific set of metrics identified and tracked for continuous improvement and customer insight

TABLE 23

Manage Interaction
Channel Management
Email

| | |
|---|---|
| Description: | Channel Management covers the management and integration of all channels in which customers contact the utility. It ensures channel efficiency and effectiveness by ensuring that there are various and correctly oriented methods in place for the customer to contact the utility. |
| Basic Criteria: | All inbound emails are processed manually with no auto response acknowledgement of receipt<br>Outbound emails can be generated manually and on an individual basis only - no capability for mass-communication by email - emails are not personalized<br>Customers cannot choose to receive communications via email |
| Threshold Criteria: | All inbound emails are processed manually<br>Outbound emails can be generated for mass-communication but customers cannot choose to receive communication via email<br>Email are not generally personalized and if they are, the personalization is based on standard data only such as demographics<br>Some early planning to implement Email Response Management System (ERMS) with consideration of existing CTI systems<br>Outbound emails can be generated for mass-communication but customers cannot choose to receive communication via email<br>Simple, text-only functionality<br>No self-managed subscription functionality<br>Frequently asked questions have standard templated responses which are manually copied and pasted back to customer inquires |
| Above Average Criteria | All inbound emails are routed automatically and processed manually - auto response added with very basic functionality<br>Outbound emails can be generated for mass-communication and customers can choose to receive communication via email, however this is not always applied to outbound campaigns<br>Email Response Management System (ERMS) utilized to provide automated email management, provide auto acknowledgements, automated suggestions, and robust web forms. Email requests blended into the agent wok queue with robust metrics and measures<br>Early planning and investigation of Web Telephony Integration (WTI) including key functionality: click |

TABLE 23-continued

Manage Interaction
Channel Management
Email

| | |
|---|---|
| | to chat, click to call, click to callback, and web collaboration.<br>Personalization is limited to differing customer segments and reinforcement with linkages to customer data is not fully utilized<br>Simple functionality but includes text and graphics<br>Self-managed subscription and referral functionality<br>Limited tracking or reporting available |
| Leading Criteria: | Inbound emails are routed and allocated to individual agents automatically and according to required customer experience, e.g. customer is sent an auto-response to confirm their message has been received and to advise when the response should be expected<br>Once a customer email has been routed to an agent, their emails will always be routed to the same agent, pending availability<br>Outbound emails can be generated for mass-communication and customers can choose to receive communication via email<br>ERMS integration to Billing systems and ancillary applications to pre-automate certain transactions and quality of customer data via forms. Utilize screen pop integration with CTI to bring up Billing main account screen, and supporting knowledge<br>Limited trails and pilots of basic WTI capabilities to measure customer utilization and acceptance<br>Personalization is extensive and based on both customer data and segmentation characteristics<br>Complex functionality including link backs to websites, Java, and two-way transactional functionality<br>Self-managed subscription and referral functionality<br>Tracking abilities allows for campaign effectiveness tracking |

TABLE 24

Manage Interaction
Channel Management
Voice/SMS

| | |
|---|---|
| Description: | Channel Management covers the management and integration of all channels in which customers contact the utility. It ensures channel efficiency and effectiveness by ensuring that there are various and correctly oriented methods in place for the customer to contact the utility. |
| Basic Criteria: | No dedicated telephone number for customer service - available for limited time frames which does not match customer demands<br>Basic local number access and some 800 services<br>Local number provided for emergency calls<br>No dedicated SMS capability<br>Touch-Tone/Dual Tone Multi Frequency (DTMF) Integrated Voice Response (IVR) solution provides basic prompting/navigation, menus and for the most part serves as an auto attendant<br>Simplistic use of Automatic Call Distributor (ACD) functionality (routing logic), basic queuing, etc.<br>Computer Telephony Integration (CTI) solution is not in place to link customer calls to customer data<br>Staff levels do not support call volumes<br>Unstable system as overload can occur during high call volume periods<br>Staff trained to handle general inquires-complex call types require call backs<br>Outbound calls are assigned to reps using printed lists on an ad-hoc basis. Calls are dialed manually. |
| Threshold Criteria: | Dedicated telephone number for customer service<br>Migration to 800 services with enhanced 800 features (e.g., routing plans), utilization of Automatic Number Identification (ANI)/Caller ID, take-back & transfer, etc. |

TABLE 24-continued

Manage Interaction
Channel Management
Voice/SMS

| | |
|---|---|
| | One way communication available for SMS for retailer to communicate emergency services and marketing messages |
| | Basic utilization of CTI functionality (e.g. screen pops, desktop soft phone, etc.). |
| | Enhanced ACD utilization including inter-queue, call type routing, configuration supports enhanced reporting, and additional groups are enabled (e.g., Billing Reps, Credit & Collection reps, etc.) |
| | Touch-Tone IVR utilization with complete automation of key transactions (e.g., account inquiry, duplicate bill, pay arrangement, etc.) |
| | Staffing levels are aligned with call volumes |
| | System integrity - system rarely experiences issues |
| | Staff trained to handle a variety of call types- most customer inquiries handled without follow up required |
| | Outbound calls are assigned to agents and generated using a outbound dialer solution. Outbound campaigns also utilized for service, outage, and credit notifications |
| Above Average Criteria | Advanced ACD utilization including Voice Over IP (VoIP) transport, targeted announcements and prompts, skills based routing, reporting accountability between ACD and IVR/VRU, and customer messages are queued and managed as an inbound call |
| | Two-way communication available for SMS to communicate emergency services, marketing messages and payment programs |
| | Implementation of advanced CTI functionality including initial shifting of some routing logic to CTI routing tables for both pre & post-routes, enhanced CTI reporting with visibility to interaction across Voice Network, ACD, IVR, and soft phone integration within CIS/CRM application |
| | Utilization of Discrete Speech/Directed Speech Recognition. Directed speech using simple - "Say 1", "Yes/No/Billing" with default Touch-Tone available upon unsuccessful attempts and customer preference. |
| | Initial testing and migration planning to basic free speech with natural language query |
| | Continued utilization of predictive dialing solutions for more than just agent connection with early migration towards CTI enabled dialing |
| | Utilization of Virtual Hold technology as separate application or integrated within CTI solution |
| Leading Criteria: | Utilization of voice network-based prompting and load leveling, interface to carrier ICP functionality, and VoIP |
| | Two-way communication available for SMS for customer inquiries, emergency services, marketing messages and payment programs |
| | ACD routing functionality shifted to CTI middleware with default routing (contingency), and announcements/prompting remaining |
| | Full deployment of advanced CTI capabilities such as screen popping multiple windows (e.g., High-Bill, Budget Bill, etc.), customer profile/skills based routing, utilization where appropriate of intelligent network routing (carrier integration), and delivery of differentiated treatments with integration of key customer segmentation analytics |
| | Full implementation of IVR free/conversational speech with natural language query and evolution towards insight driven interactions |
| | Utilization of CTI solution for "soft" predictive dialing capabilities with seamless inbound/outbound blending |
| | Offer call-back function on website and respond within promised time frame on requests |
| | Virtual hold technology providing more than just customer satisfaction lift but actually changing the weekly call arrival patterns by pushing Monday/Tuesday volumes to mid-week |

TABLE 25

Manage Interaction
Channel Management
Local Retail Outlet

| | |
|---|---|
| Description: | Channel Management covers the management and integration of all channels in which customers contact the utility. It ensures channel efficiency and effectiveness by ensuring that there are various and correctly oriented methods in place for the customer to contact the utility. |
| Basic Criteria: | A local retail outlet/office is offered in major centers as it is a mandatory requirement by the regulator but is used by very few customers as a primary channel |
| | Local retail outlet has minimum capabilities on offer due to a lack of skilled staff and facilities - no ability to make a payment |
| | Local retail outlet makes little to no investment in the Customer Experience |
| | A receptionist to direct customers to a telephone that directs customers to a call centre or somewhere else to get their questions answered - informational pamphlets available |
| | Local retail outlet/office is a relatively ineffective channel due to limited opening hours, lack of skilled resources and high operating costs |
| | Local retail outlet does not have the ability to handle other customer service transactions in off-peak times |
| Threshold Criteria: | Retail outlet remains but is no longer a commonly-used customer channel and is costly to keep in operation |
| | Retail outlets are not located at convenient locations for customers |
| | Retail outlet has limited capabilities on offer due to a lack of skilled customer service staff |
| | Able to handle basic inquiries (e.g. basic billing questions) |
| | receptionist directs customers to specialized teams via telephone (e.g. conservation) |
| | Customers are restricted by payment methods, e.g. no cash can be taken or other services, e.g. notification of home move can be recorded but not replicated in customer database |
| | Limited opening hours and counter staffed by office workers who are often unavailable |
| Above Average Criteria | Retail outlet is a popular customer channel for those in the locality, e.g. elderly customers who appreciate a face-to-face service, low-income customers who prefer not to use the telephone |
| | Retail outlet is located in convenient locations |
| | Limited payment channels available (e.g. credit card and cheque, no debit) |
| | Most, if not all, customer service capabilities on offer although the customer experience is not consistent with other channels |
| | Conservation materials available in office but no local knowledgeable staff |
| | Ability to answer most customer care questions |
| | Trained customer service staff available on-site to answer questions |
| | Customer experience is consistent with other channels, e.g. branding, marketing messages, etc. |
| | Local retail outlet becomes an extension of the customer service center via VoIP and thin client technologies. Agents can handle back-office transactions to increase utilization during off-peak times |
| Leading Criteria: | Retail outlet is a strategic channel and provides a high-value solution for customer contact |
| | Retailer support hotline for second level of support |
| | Retail outlet is located in complementary business locations such as an appliance store to provide bundled products and energy efficient product options |
| | Retail outlet capabilities are in line with back office and therefore there is a seamless integration to the customer |
| | Retail outlet is open outside of office hours customized to meet customer needs |
| | Customer experience is consistent with other channels |

TABLE 25-continued

Manage Interaction
Channel Management
Local Retail Outlet

Customer has the ability to make a secure payment
All trained employees are customer care oriented
A staffed Conservation Centre at each office staffed with knowledgeable resources
Customer experience is consistent with other channels and enhanced by community support such as charity support, tailored customer service for high value customers
Self-Service kiosks across service territory to accept payments, bill inquires, setup payment arrangements and service requests

TABLE 26

Manage Interaction
Channel Management
Pre-Payment Device

| | |
|---|---|
| Description: | Channel Management covers the management and integration of all channels in which customers contact the utility. It ensures channel efficiency and effectiveness by ensuring that there are various and correctly oriented methods in place for the customer to contact the utility. |
| Basic Criteria: | Pre-payment is an inappropriate method of customer interaction for certain segments, it negatively impacts customer perception of the retailer and overall customer experience<br>Pre-payment tokens can only be purchased at a local office<br>Token or coin removal is manually conducted by field services<br>No emergency tokens are provided for customers should a customer not re-credit their meter<br>No remote reconnect/disconnect capabilities in place other than through the pre-payment function<br>Improved data storage capabilities have not been implemented to support channel<br>No security solution in place to prevent meter tampering or to detect fraudulent tokens |
| Threshold Criteria: | Pre-payment is an inappropriate method because it provides the service at a very high cost<br>Pre-payment data sticks and swipe cards can be re-credited through self service channels<br>Pre-payment data sticks and swipe cards can be re-credited at local offices and via customer service agents<br>Emergency tokens or swipe cards can be purchased by the customer<br>Reconnect and disconnect via a remote controlled relay<br>Data system in place to handle increased data flows. However, system is not aligned effectively to the other customer information platforms and channels<br>Simple detection capabilities for fraudulent data sticks and swipe cards is not always effective at preventing meter tampering |
| Above Average Criteria | Pre-payment is an appropriate choice, as it increases the retailer's exposure to certain customer segments. Pre-payment system is deployed at the appropriate sites and is managed at a low cost<br>Somewhat effective in reducing credit risk<br>Smart cards are available and contain customer credit and emergency credit. Smart cards can be credited via multiple channels including financial institutions<br>Robust data system in place to handle influx of incoming customer data that is aligned with other customer information systems<br>Smart cards have built in standard encryption capabilities to prevent basic theft attempts |

TABLE 26-continued

Manage Interaction
Channel Management
Pre-Payment Device

| | |
|---|---|
| Leading Criteria: | Pre-payment is an appropriate choice, as it increases the retailer's exposure to certain customer segments. Pre-payment system is deployed at the appropriate sites, managed at a low cost and is aligned with other service channels as well as the brand strategy<br>Effectively reduces credit risk for targeted customer segments<br>Two-way communication with real-time access to the meter. Customers can credit their meter online via an E-payment system which is automatically sent to the meter. SMS channel also available for customers to credit accounts<br>Software controlled real-time disconnection to remotely turn power on or off to a customer<br>Pre-payment device is integrated into a smart metering home device<br>Custom data solution in place to handle incoming customer data that is fully integrated with customer information systems and channel management systems<br>Advanced multi-layered encryption system in place to prevent meter tampering and smart card forgery that is updated frequently which prevents most fraudulent activities |

TABLE 27

Manage Interaction
Channel Management
Mail/Fax

| | |
|---|---|
| Description: | Channel Management covers the management and integration of all channels in which customers contact the utility. It ensures channel efficiency and effectiveness by ensuring that there are various and correctly oriented methods in place for the customer to contact the utility. |
| Basic Criteria: | Mail the only available channel for customer correspondence as customer email addresses are not stored and therefore the email channel is not available<br>Mass mailings of newsletters, coupons, promotions are conducted<br>Customer address data quality is poor (i.e. there are no address quality checks before printing and sending) and therefore outbound correspondence generates significant volumes of returned mail which is costly to process<br>Fax used for one way communication from retailer to deliver basic marketing messages<br>Customer experience is not delivered consistently across all correspondence<br>Some templates exist for standard letters but the set is not exhaustive and so some letters are created by individuals duplicating work and not going through the appropriate level of quality checks |
| Threshold Criteria: | Mail is the main channel for customer correspondence as some customer email addresses are stored but these are of poor quality and therefore email channel is not available except on an exception basis<br>Targeted mass mailings based on customer sign-ups cause increasing skepticism about direct marketing by post making mail/fax an unpopular channel<br>Fax used for one way communication from retailer to deliver marketing messages and information on conservation and energy efficiency programs<br>Customer address data quality is good (basic address quality check before printing and sending) and therefore outbound correspondence generates manageable volume of returned mail that |

TABLE 27-continued

Manage Interaction
Channel Management
Mail/Fax

| | |
|---|---|
| | is costly to process due to ad hoc system in place |
| | The use of letter templates attempts to deliver a consistent customer experience across all correspondence but this is not generally consistent with other channels |
| Above Average Criteria | Mail is still the main and most popular channel for billing as most customer email addresses are stored when available but due to the fact that many customers do not provide an email address or require email correspondence, email channel is not yet cost-effective |
| | Targeted and selective mailings are conducted for newsletters, coupons, and promotions and are well received by customers |
| | Fax used for two-way communication between retailers and customers for inquiries, marketing messages, bill processing, and special programs |
| | Customer address data quality is very good (advanced address quality check before printing and sending using an external address management system) and therefore outbound correspondence generates only a low volume of returned mail that is mostly processed on an exception basis |
| | The use of dynamic letter templates and bill inserts delivers a consistent customer experience across all correspondence and this is generally consistent with other channels |
| Leading Criteria: | Mail is no longer a major customer channel for billing as customer email addresses are stored when customer requests email correspondence and electronic correspondence is consistent with the paper versions. Email channel is cost-effective |
| | Customers have the ability to print their own copies of bills |
| | Auto-mailing for targeted and selective newsletters, coupons, and special promotions that are specifically tailored to individual customer segments. Includes customized bill messaging for individual segments |
| | Fax used for inbound/outbound communication between retailers and customers for inquiries, targeted and segmented marketing messages, bill processing and target special program promotion |
| | Customer address data quality is excellent (advanced address quality check and auto-corrections before printing and sending using an external address management system) and therefore outbound correspondence generates a low volume of returned mail that is processed efficiently |
| | The use of dynamic letter templates and bill inserts delivers a consistent customer experience across all correspondence and this is consistent with other channels |

TABLE 28

Manage Interaction
Channel Management
Account Manager

| | |
|---|---|
| Description: | Channel Management covers the management and integration of all channels in which customers contact the utility. It ensures channel efficiency and effectiveness by ensuring that there are various and correctly oriented methods in place for the customer to contact the utility. |
| Basic Criteria: | Industrial, commercial and government customers are not provided tailored and customized support services as there is no dedicated account management team is in place |

TABLE 28-continued

Manage Interaction
Channel Management
Account Manager

| | |
|---|---|
| | Account managers have a limited scope of control and customers are asked to call head office if account managers are unable to complete transactions |
| | Account managers only provide basic support for billing inquiries |
| | Account managers are not focused on building customer relationships due to a lack of incentives, training and support systems |
| | Account managers are unable to effectively cross-sell or settle disputes due to lack of a single customer view |
| | Account manager techniques are not aligned to the corporate plan and often result in a wide array of customer experiences |
| | Quarterly sales metrics drive account manager activities and compensation |
| | Account touch points are not adequately tracked |
| Threshold Criteria: | Industrial, commercial and government customers are provided tailored services that are not necessarily aligned to customer expectations for services and products through the deployment of an account management team that is not integrated |
| | Account managers are not able to carry out transactions while with customers. Transaction are completed in their place of work (this might be their home or a central office) |
| | Account managers offer tailored billing inquires and limited support for power efficiency and improvement programs |
| | Account managers are focused on building customer relationships but the customer experience is often clouded by aggressive and overly keen sales tactics |
| | Account managers have accurate view of customer product holding and therefore can respond to cross-sell opportunities but are not informed of other activities such as disputes and after-sales services |
| | Annually based metrics are used to drive account planning activities and compensation |
| | Account touch points are completed and tracked centrally |
| Above Average Criteria | Industrial, commercial and government customers are provided tailored services that is aligned to customer expectations for services and products by a dedicated and fully trained team of account managers |
| | Account managers are able to carry out some transactions using hand-held devices but this are costly to maintain and many account managers do not use them effectively |
| | Account managers offer tailored billing inquires and full support for power efficiency and improvement programs |
| | Account managers are focused on building customer relationships in line with desired customer experience and are able to offer customers a direct dial number |
| | Account managers have accurate view of customer product holdings and are empowered to offer tangible incentives to customers in order to cross-sell or up-sell |
| | Account managers work collaboratively with other customer-facing teams to obtain a holistic view of the customer and their contact history with the retailer |
| | Annually based metrics that are aligned to corporate plans are used to drive account planning activities and compensation |
| Leading Criteria: | Industrial, commercial and government customers are offered varying degrees of service and contact frequency/format is tailored for them by a dedicated account team who is available 24 hours a day, 7 days a week |
| | Account managers are able to carry out most transactions using hand-held devices while with customers face to face. This is supported by an online portal that is accessed by both the customer and account manager |
| | Account managers have the ability to offer fully customized support for individual customers. Account |

TABLE 28-continued

Manage Interaction
Channel Management
Account Manager managers are well equipped to recommend customer power efficiency programs
Account managers build strong customer relationships and therefore customer churn is exceptionally low
Account managers offer customers free training for self-service channels
Account managers are integrated with sales forecasting, sales and marketing teams such that they not only offer a customer contact channel but they also effectively support the pipeline of leads/opportunities
Customer lifetime value drives account manager activities and compensation plans
Touch points are tracked centrally and data collected is used to gain further insight into customer behavior

TABLE 29

Manage Interaction
Channel Management - Email
Field Sales

| | |
|---|---|
| Description: | Channel Management covers the management and integration of all channels in which customers contact the utility. It ensures channel efficiency and effectiveness by ensuring that there are various and correctly oriented methods in place for the customer to contact the utility. |
| Basic Criteria: | Field Sales agents are seen as being 'pushy' and intrusive and therefore negatively impact the customer experience<br>Field sales agents work with paper forms and therefore have no online access to customer/prospect records<br>High turnover of agents who are motivated by short-term targets based on the number of contracts signed and therefore increasing instances of void contracts<br>Channel is effective in terms of reaching prospects than would not otherwise have been found/contacted, low-cost due to cheap labor and hours/location of work<br>Field sales agents collect basic account sign-up but do not collect data to be fed back into market/customer analysis, campaign management or after-sales support |
| Threshold Criteria: | Field sales agents are motivated by individual and uninterrupted targets and are not encouraged to work collaboratively with other teams.<br>Fields sales agents experience channel is subject to high staff turnover and poor employee satisfaction, both of which impact the customer experience<br>Agents work with paper forms or hand-held devices, both of which are independent from the central hub of customer/prospect records and therefore data cannot be collected/verified or used to identify opportunities<br>Agents tend to sign-up low-value customers and are given incentives to acquire rather than retain customers-there is a significant volume of void contracts<br>Channel is effective at reaching prospects but is not effective at targeting high-value customers |
| Above Average Criteria | Field sales agents are given realistic targets and there is a good level of employee satisfaction within the teams<br>Agents work with hand-held devices which have remote access to a central hub of customer/prospect records and therefore data can be collected/verified or used to identify opportunities<br>Agents tend to attain low-value customers and are given incentives to acquire rather than retain (for |

TABLE 29-continued

Manage Interaction
Channel Management - Email
Field Sales

| | |
|---|---|
| | deletion or revision to indicate some incentive for customer retention)<br>The number of void contracts is managed via auto-validation at data input and a requirement for authentic customer consent |
| Leading Criteria: | Field sales agents are given realistic targets which can be attained by working collaboratively with other teams<br>Training, performance management and rewards promote high employee satisfaction and a very positive customer experience<br>Agents use sophisticated selling techniques to target high-value customers<br>Agents are rewarded for customer retention as well as acquisition and void contracts and/or dissatisfied customers are within target<br>Agents are recognized and rewarded for attracting, up selling, and returning high-value customers |

TABLE 30

Manage Interaction
Channel Management
SMI Home Device

| | |
|---|---|
| Description: | Channel Management covers the management and integration of all channels in which customers contact the utility. It ensures channel efficiency and effectiveness by ensuring that there are various and correctly oriented methods in place for the customer to contact the utility. |
| Basic Criteria: | Automated meters are in place with walk by/drive by collection capability however device does not have a telemetering capability for transferring remote data<br>Collection of usage patterns on a monthly basis<br>Customer does not have a view of their usage patterns - traditional billing practices are applied<br>Traditional manual disconnect and reconnection process still in place<br>Improved data storage capabilities have not been implemented<br>Outage reporting, power restoration and unusual activity is not integrated into the automated meter |
| Threshold Criteria: | Advanced metering infrastructure in place that allows for remote data collection. Device has one way communication enabled between retailer and customer for billing and consumption data<br>Collection of usage patterns on an monthly or weekly basis<br>Detailed customer usage patterns are provided on bill<br>Remote power disconnection in place<br>Data system in place to handle increased data flows. However, system is not aligned effectively to the other customer information platforms<br>Power outage, restoration information and unusual usage reports can be generated manually based on data collection rates. Procedures are handled using traditional scheduling and dispatch processes |
| Above Average Criteria | Advanced metering device has two-way communication enabled between retailer and customer for billing and consumption data<br>Collection of usage patterns in real time with ability to manually cap household usage and apply timers during peak timers<br>Robust data system in place to handle influx of incoming customer data that is aligned with other customer information systems<br>Home device is directly linked to customer thermostat<br>Customers are able to access pre-payment metering systems |

TABLE 30-continued

| | Manage Interaction Channel Management SMI Home Device |
|---|---|
| Leading Criteria: | Customer ability to remotely view time of use billing plans as well as differing tariff structures via the web channel
Near real-time power outage, restoration information and unusual usage report generation and handling
Smart metering home device has two-way communication enabled between retailer and customer in real time for billing and consumption data and real-time messaging
Device is integrated into a home area network or in home display linking smart appliances and thermostat
Sophisticated web based e-tools to analyze usage patterns and consumption levels for customers to remotely cap household usage, apply timers during peak hours and be provided with audible usage warnings from the retailer |
| | Software controlled real-time disconnection ability to remotely turn power on or off to a customer
Customer ability to remotely change billing plans (i.e. from credit to prepayment plans as well as differing time of use tariff structures)
Customized suggestions and messages provided to customers to educate and encourage behavior changes
Custom data solution in place to handle influx of incoming customer data that is fully integrated with customer information systems
Automated real-time power outage, power restoration and tamper |

The following Tables 31-42 provide an explanation of the capabilities and corresponding key assessment areas and performance capability criteria for each capability within the manage core operations platform 106.

TABLE 31

| | Manage Core Operations Market Brand Management |
|---|---|
| Description: | Brand Management encompasses the capabilities and processes that execute, at a tactical level, the brand strategy. This capability delivers the brand promise and preserves the role of the retail utility's brand internally and externally. This capability supports the delivery of a branded customer experience across the organization. |
| Basic Criteria: | Brand value is estimated and inaccurate and therefore no investment in measurement or tracking with no proven framework or consistency
Attempts are made to ensure a consistent view of the brand through marketing communications but a lack of definition of brand promise makes that ineffective
Misalignment between brand promise and customer experience (e.g. Customer Service Agents do not behave as the marketing campaigns imply they should). Not formally tracked or enforced
The brand promise does not have an impact on the organization at an operational level |
| Threshold Criteria: | Brand management group not present but branding activities are carried out by marketing or strategy groups
Brand value is calculated according to qualitative research for which there is limited investment
No formal focus on/delivery of a branded customer experience due to a lack of infrastructure to support integration of the brand across the organization
Agents have brand awareness but are not likely to be able to articulate the brand promise consistently
The organization is designed to support branding (e.g. branded offices, branded stationery) but this becomes stale and fails to influence agent behavior
Branding initiatives are rolled out in waves, rather than consistently |
| Above Average Criteria | Defined Brand Promise which is communicated via advertising campaigns
Brand value is tracked and reported in quantitative terms
Branded customer experience is supported by operational infrastructure but not effective in increasing high-value customer satisfaction at a minimal cost
Customer-facing agents have brand awareness and are able to articulate the brand promise in terms of their day to day work. Other employees have brand awareness but are not able to articulate the brand promise consistently
The organization is designed to support branding and brand promise and this is inconsistently successful in influencing employee and therefore there is little brand management investment |
| Leading Criteria: | Market strategy, brand management capability and other groups work closely on all communication activity. Branding programs and the brand investment is linked to P&L responsibility
Brand value and brand perception are proactively evaluated and managed with tangible brand goals in place
Role of brand is understood across all parts of the organization and employees are empowered to 'live the brand' |

TABLE 31-continued

Manage Core Operations
Market
Brand Management

| | |
|---|---|
| | All employees are given brand management training so that their behavior is consistent with brand promise |
| | All employees are able to articulate the brand promise in terms of their responsibilities |
| | Organization is designed and delivers a Branded Customer Experience at all customer and employee touch points |

TABLE 32

Manage Core Operations
Market
Lead and Prospect Management

| | |
|---|---|
| Description: | Lead and Prospect Management is the generation, qualification and management of customer prospects and leads. The capability includes data management, distribution and quality analysis. |
| Basic Criteria: | No formal process in place to generate or qualify leads |
| | Prospects are not identified until they enter the sales process |
| | Lead/prospect data is not stored in a data management tool and becomes stable quickly |
| | Success of sales efforts only identified after the sale has been processed or attempted |
| | No data enrichment of leads or quality analysis performed |
| | Data reviewed periodically and cleaned up annually but data currency is a constant concern |
| Threshold Criteria: | Prospects are identified and then categorized (basic categorization) |
| | No systematic process for lead generation in place |
| | Lead/prospect data is enhanced following interaction with sales team |
| | Able to provide historical information regarding the quality and disposition of all prospect leads |
| | Leads are distributed manually without factoring a reps' ability to convert lead |
| | Simplistic tracking in spreadsheets allows for limited knowledge sharing and no evaluation of ROI by source |
| Above Average Criteria | Prospects are identified and then ranked or categorized |
| | Systematic process in place utilizing a simple ranking system |
| | Lead/prospect data is proactively enhanced with details but the enhancements lack structure or relevance |
| | Leads/prospects are funneled to the sales force and their progress through the sales process is tracked |
| | Electronic distribution of leads based on reps abilities |
| | Lead generation system generated is integrated with sales tools and customer portal |
| | Standardized reporting enable effective tracking of key measures and ROI by source |
| Leading Criteria: | Prospects are identified and then scored, ranked and categorized |
| | All lead activity is tracked in the customer information system |
| | Lead/prospect data is proactively enhanced with appropriate details with the aim of assisting the sales force in tailoring communications, product offerings and pricing strategies |
| | Lead prospect generation programs are structured so that the quality of leads can be constantly measured |
| | Ability to provide real-time and historical information regarding the quality and disposition of all prospect leads |
| | Leads are automatically distributed and sales assignments are based on predetermined, multi-level hand-offs points based on the estimated customer conversion rate |
| | Automated lead generation system fully integrated with sales force that distributes, tracks, evaluates and continuously improves lead quality - ROI based on short-term revenue and customer's long term value |

TABLE 33

Manage Core Operations
Market
Campaign Management

| | |
|---|---|
| Description: | Campaign Management is the retailer's ability to develop and manage the functional and technical capabilities to deliver multi-channel and |

TABLE 33-continued

Manage Core Operations
Market
Campaign Management

|  |  |
|---|---|
|  | ongoing marketing messages that support customer acquisition, growth and retention objectives. |
| Basic Criteria: | Ad hoc direct marketing plan developed that focuses on mass marketing |
|  | No alignment of direct marketing plan with overall strategy and objectives |
|  | Target lists are not used for marketing campaigns, instead only mass marketing campaigns are conducted |
|  | Target lists cannot be maintained due to a lack of infrastructure (i.e. no dedicated marketing database) |
|  | Campaigns are not piloted/tested within a group of customers, they are simply reviewed and approved internally |
|  | No standard processes for campaign execution |
|  | No evaluation of campaigns using performance indicators |
| Threshold Criteria: | Annual direct marketing plan developed which aligns to marketing strategy |
|  | Target lists are used for direct marketing campaigns |
|  | Campaigns are designed for the mass-market rather than for a specific customer type |
|  | Target lists can be maintained in a dedicated marketing database which simply holds names and addresses rather than other customer data such as communication preferences, behavior, existing product holdings and contact history |
|  | Databases are not integrated with wider CIS systems and channel management practices |
|  | Campaigns are piloted/tested within a focus group who are enlisted without consideration for their suitability |
|  | Campaigns are executed based on a standard delivery process |
|  | Tracking of simple performance indicators such as cost/benefit analysis of campaigns is performed |
| Above Average Criteria | Annual direct marketing plan aligns marketing strategy, channel management and brand strategy |
|  | Target lists are used for direct marketing campaigns to a list of names and addresses of considered prospects |
|  | Campaigns are directed at new customers and existing customers as appropriate |
|  | Campaign target lists are pulled from an integrated marketing database which has contact information for each supply point/product holding, marketing preference and customer behavior |
|  | Marketing database exists as a single integrated unit and is updated periodically from the central customer database |
|  | Campaigns are executed using a defined process that utilizes the channel management plan and customer analytics |
|  | Campaigns are piloted/tested with a suitable group of prospects/customers of significant size |
|  | All key performance indicators are tracked for individual campaigns |
| Leading Criteria: | Annual direct marketing plan developed with key performance indicators identified and updated monthly |
|  | Target lists are used for direct marketing campaigns based on estimated lifetime customer value |
|  | Campaigns are designed for and directed to existing customers, new customers and differing customer segments (e.g. size, type, location, behavior) |
|  | Marketing database has single holistic view of a customer, their product holding and marketing preference |
|  | Marketing database is updated following every customer contact |
|  | Sophisticated tools are used to proactively contact prospects via multiple channels (e.g. customized IVR and web messages, specific bill messages or inserts) |
|  | Optimization of market spend and campaign management based on tangible profitability metrics such as marketing ROI as well as key performance measures |
|  | Root cause analysis performed to understand and refine campaign effectiveness |

TABLE 34

Manage Core Operations
Market
Loyalty Management

| | |
|---|---|
| Description: | Loyalty Management includes the development, design and implementation of programs to increase customer loyalty through multiple avenues such as acquisition, retention, win-back and the |

TABLE 34-continued

Manage Core Operations
Market
Loyalty Management

|  |  |
|---|---|
|  | identification and recognition of loyal customer segments and individual customers. |
| Basic Criteria: | No formal customer loyalty program in place |
|  | Basic schemes are offered to customers and applied inconsistently |
|  | Execution of the program is not formalized - customer agents apply simple incentives infrequently and on an ad hoc basis |
|  | Program is not measured formally |
|  | Insights are not incorporated into the planning of the loyalty program |
| Threshold Criteria: | Loyalty program in place and customer segments are identified in terms of value but insight is not actively employed for all relevant channels |
|  | Competitive environment is not considered in planning the loyalty program |
|  | Rule-based systems are used to execute program that treat customers in a simplistic sequence of events and do not take the full customer experience into consideration |
|  | Some customer loyalty incentives are offered but are often poorly administered |
|  | Programs are monitored infrequently and provide little or no insight on possible improvement measures |
|  | No integration plan between information collected from the insight capabilities and the loyalty program |
| Above Average Criteria | Developed loyalty programs in place for customers - utilizes customer profitability and cost to serve for planning |
|  | Competitive landscape is applied on an ad hoc basis during the planning phase |
|  | Loyalty programs are aligned around customer segments and simple forward looking analytics |
|  | Synchronized executed delivery of the program around the customer experience using profiles, preferences, segments, values, etc. |
|  | Loyalty program is not successful at reducing customer switching behavior |
|  | Programs are monitored on an ad hoc basis using simplistic measures |
|  | There is little integration planning between real-time analysis and pre-processed scoring for the loyalty program and insight capabilities |
| Leading Criteria: | Advanced loyalty programs in place for customers addressing various requirements based on a scientific, data driven approach to analyze customer drivers, lifetime value and the competitive environment |
|  | Advanced analytics and decision support technologies are tightly integrated to define and develop the customer loyalty strategy |
|  | Loyalty program includes multiple offerings that are tailored to specific segments and customer groups |
|  | Loyalty program is effective at reducing customer churn, is delivered at an optimal cost and can be activated and de-activated in a few simple steps |
|  | Programs are continuously monitored and adjusted as necessary |
|  | Loyalty program analytics provide greater ability to understand customers by profile, segment identification, account type, product holdings and performance |
|  | Recognition of loyal customers occurs proactively |

TABLE 35

Manage Core Operations
Sell
Customer Acquisition

|  |  |
|---|---|
| Description: | Customer Acquisition, also known as registration, is the process of securing a new customer through standard sales channels or through assignment to the retail utility the moment a new account is billable. |
| Basic Criteria: | Sales capability is independent from the registration capability and has a significant impact on the time taken from customer contract agreement to account creation - means that the sales agent has no view of supply point details at point of sale |
|  | No formal validation built in to the registration process such as automated address validation |
|  | Reactive and delayed credit check process |
|  | Automated bank details validation, identity validation, etc. |

TABLE 35-continued

Manage Core Operations
Sell
Customer Acquisition

| | |
|---|---|
| | No integration between Change of Tenancy and Registration processing |
| | Change of Tenancy is passed from the registration team to the Change of Tenancy team as an exception |
| | Manual communication between suppliers/industry to confirm change of supplier |
| | Delay in ability to sign up customers makes it hard to obtain an accurate usage view on move-in |
| | Manual discovery of meters for retailer transfers. Market data and CIS system are separate |
| | Transfer exceptions are handled manually |
| Threshold Criteria: | Sales operation is independent from the registration operation but this has very little impact on the time taken from customer consent to active account creation as the teams are integrated and work efficiently together |
| | Sales teams have an out of date view of supply point details at point of sale and therefore cannot validate meter details and read at point of entry |
| | Some formal validation built into the registration process such as automated address validation, automated bank details validation, identity validation, etc. |
| | Manual credit check process |
| | Validation steps often cause bottlenecks in the process as exceptions are handled manually and input data is of a poor quality |
| | Some automated communication between suppliers/industry parties to confirm change of supplier via workarounds (e.g. spreadsheets) |
| Above Average Criteria | Sales, home move and registration operations integrated in one solution but this is not a cost-optimal solution due to poor quality data, lack of training and poor exception handling |
| | Sales teams have a up-to-date view of supply point details at point of sale and therefore can validate meter details and read at point of entry but commonly overlook discrepancies in order to complete the sale |
| | Formal validation in place, (such as automated address validation, automated bank details validation, identity validation, etc.) is carried out after point of sale and so data is corrected with the customer still in contact |
| | Automated credit check process performed after customer sign-up |
| | Existing customers are usually not mistaken for 'new customers' as the sales agent has a view of the supply point and associated customers at the point of sale |
| | Product/service configuration agreed at point of sale, enabling flexible price plans/payment arrangements |
| | Automated communication between suppliers/industry to confirm change of supplier but exception handling requires significant FTE support |
| Leading Criteria: | Sales, home move and registration operations are integrated in one solution and executed by multi-skilled agents and field representatives who work collaboratively to process transactions within the pre-defined service level agreement |
| | Sales teams have an up-to-date view of supply point details at point of sale and therefore can validate meter details in real time |
| | Integrated credit check process at the point of sign-up |
| | All data is validated on entry, such as addresses, bank details, identity details and credit rating - there are overrides for exceptions like cherished addresses, foreign addresses, customers with poor credit. Validation is automated and has negligible impact on processing times |
| | Automated communication between suppliers/industry including filtering and auto-validation of all messages |
| | Fully automated and integrated transfer process that confirms a unique meter identifier to the master market data right now to the move in |
| | Transfer exceptions are routed automatically to customer service agents |

TABLE 36

Manage Core Operations
Sell
Cross Sell / Up Sell

| | |
|---|---|
| Description: | Cross Sell/Up Sell is the process to identify, act on and secure opportunities to increase the value of the customer base and provide additional valued products and services to retail utility customers. |

TABLE 36-continued

| Manage Core Operations Sell Cross Sell / Up Sell | |
|---|---|
| Basic Criteria: | Application architecture does not support the identification of up sell opportunities outside of the standard sales process<br>Data is not available to sales team so that they have a complete view of the customer and their existing product holding<br>Identification and understanding that agents should be trained to convert customer service call to a sales call if prompted by a customer<br>Customers are not offered tangible incentives or bundling options to expand their product holding<br>Customer quotes are often inaccurate due to poor data for tariffs and estimated consumption<br>Enabling one bill for multiple products is a manual and time consuming process |
| Threshold Criteria: | Application architecture supports the identification of opportunities, primarily driven by the effectiveness of the latest marketing campaign<br>Data is not readily available to sales team but agents do have a view of the supply points available and simple product holdings<br>Identification and understanding that agents should be trained to convert customer service call to a sales call without the need to transfer<br>Customers are offered quotes based on past billing levels via advertising such as bill inserts<br>Customer quotes are often artificially low so as to entice the customer<br>Customer data model is not flexible enough to process a product change in real time with the customer |
| Above Average Criteria | Application and process architecture supports the identification of opportunities through standard customer service and sales processes (e.g. up sell as part of standard wrap up script)<br>Data is available to sales team so that they have a single view of the customer and their product holding at initial point of contact presented to the agent using computer telephony integration (CIT) technology and caller identification<br>Training requires agents to provide customer with a quote (which is auto-generated) during a customer service call, thereby gaining customer commitment before the sales process is initiated<br>Customers are given quotes on a regular basis based on customer segments, past usage and length of time with retailer<br>Customer data model is flexible such that the customer account can remain static for a change to their product holding but this is poorly controlled and tracked |
| Leading Criteria: | Application and process architecture supports the identification of opportunities following auto-prompts generated according to customer profile<br>Data is available to the sales agent so that they have a single view of the customer and their predicted behavior<br>Agent is automatically informed about recent complaints, sales opportunities and special needs at initial point of contact with customer<br>Training requires agents to respond to auto-prompts and provide customized bundles and quotes to individual customers using a product configuration tool<br>Customers are given quotes on a regular basis according to individual levels of estimated lifetime value and predicted behavior via customized advertising vehicles<br>Customer data model is flexible such that the customer account can remain static for a change to their product holding and can be processed in real time |

TABLE 37

| Manage Core Operations Sell Retention | |
|---|---|
| Description: | Retention is the ability to maintain the customer base and promote a customer loyalty program to prevent customer complaints, escalation and churn. |
| Basic Criteria: | No formal process in place to specifically target high value customers<br>Limited integration with loyalty program when executing retention processes |

TABLE 37-continued

Manage Core Operations
Sell
Retention

| | |
|---|---|
| Threshold Criteria: | Customer withdrawal process includes mandatory checks for opportunity to object to and potentially save the customer from leaving (these basic checks are in line with regulatory compliance)<br>Customers who have begun the withdrawal process are not targeted by a 'save campaign'<br>Forwarding details for former customers are not collected<br>Retention program is not measured for effectiveness or efficiencies<br>Processes in place to identify high value customers by segment are in place<br>Loyalty program is executed through the retention processes and incentives are in line with delivering a consistent customer experience |
| Above Average Criteria | Customer withdrawal process includes mandatory checks for opportunity to object to and potentially save the customer from leaving (these basic checks are in line with customer advocacy processes and the loyalty program)<br>Forwarding details for former customers are automatically collected so that the customer may be contacted in the future for win-back campaigns<br>Retention program metrics are loosely based on the loyalty program and are in a standard format<br>High value customers are identified using profiles, preferences, segments, and values<br>Loyalty program and analytics are executed through standardized processes to identify and adequately retain high value customer<br>Customer withdrawal process includes mandatory checks for an opportunity to object but also includes a prompt to save the customer<br>The resulting 'save campaign' list is sorted such that high value customers are prioritized<br>The process for customers that are retained or 'saved' (i.e. they do not complete the withdrawal or are immediately won back) is costly and slow so that 'cost per save' is high<br>Individual retention actions are measured for effectiveness and efficiency which roll up into loyalty program metrics<br>Customers who are not saved receive targeted recovery letters or emails inviting their feedback and indicating retailer's interest in having them back as a customer in the future |
| Leading Criteria: | High value customers identified based on customer drivers and lifetime value to specifically tailor retention offers<br>Retention efforts are directly implemented based on the loyalty program plans<br>The resulting 'save campaign' list is sorted such that high value customers are prioritized and the outbound contact is automated via predictive dialing or customers preferred contact method<br>Customers are 'saved' (i.e. they do not complete the withdrawal or they are immediately won back) - this process is low cost and quick to react to customer intentions and even predicted intentions<br>Forwarding details of customers who could not be retained is collected with the customers' approval so that the customer may be contacted at a time when they should receive their first bill from their new supplier when their new deal can be reviewed against a competitive offer |

TABLE 38

Manage Core Operations
Serve
Customer Contact

| | |
|---|---|
| Description: | Customer Contact is the ability to manage all customer contact and requests/inquiries efficiently by ensuring consistency and quality in the delivery of customer service regardless of the channel. This capability includes the coordination of workflow between locations and functional employee groups. |
| Basic Criteria: | Workflow is managed manually - no tracking of workflow or reporting on efficiencies<br>Staffing levels do not match effective workflow levels<br>Fluctuating service levels due to lack of reporting and forecasting capabilities<br>Basic inquires are handled at initial point of contact - more advanced inquires need to be followed up<br>Significant customer wait times to access any channel |

TABLE 38-continued

Manage Core Operations
Serve
Customer Contact

| | |
|---|---|
| Threshold Criteria: | No strategy for handling customers - reactive handling of inquires<br>Reactive and delayed credit check process<br>Quality of contact not evaluated/measured - no quality expectations and no formal/directed training provided<br>Quality and performance management not actively measured<br>Workflow managed manually or with limited automation<br>Limited resources assigned to planning and strategy for handling customer inquires - proactive based on real-time issues not on proactive operational improvements<br>Ability to handle more complex inquires in a silo structure<br>Fluctuating wait times<br>Manual credit check process |
| Above Average Criteria | Metrics calculated and contacts spot checked for quality by Operations Management<br>Quality and performance management are managed separately<br>Workflow automated and handled by designated group<br>Strong forecasting capability resulting in high utilization rate of FTEs<br>Efficiency of processes for transactions - implemented initiatives like first call resolution<br>First call resolution focused - handle times are measured with real-time delivery at agent and manager level<br>Knowledge and ability to handle multiple inquires per customer contact<br>Automated credit check process performed after customer sign-up<br>In-house quality team measures metrics and quality and delivers results to employees monthly - customized customer contact quality training<br>Quality and performance management is measured and managed together |
| Leading Criteria: | Employees cross trained to handle different customer contact channels<br>Workflow managed to highest level of efficiency - coordinated and prioritized around incoming volumes<br>Fully automated and flexible workflow distribution system with automated real-time performance dashboard<br>Proactive meeting of customer needs/inquires<br>Next best action focused when responding to customer inquiries.<br>Agents have access to systems to assist with real-time decision making<br>In-house, centralized quality team and external customer surveys given to measure quality<br>Integrated customer verification process at the point of sign-up that is well understood and proactive<br>Metrics and quality measured and coached throughout month - various training methods offered geared towards individual learners including refresher training programs<br>Focus on gaining efficiencies through a improvements around first contact resolution and next best action<br>Quality is measured proactively by automated tools<br>Employees are seen as a strategic channel for gleaning customer and operational insight and are regularly used to identify and drive improvements |

TABLE 39

Manage Core Operations
Serve
Usage

| | |
|---|---|
| Description: | Usage is the ability to collect, validate and store consumption data such that a customer may be billed accurately and in a timely manner. This capability includes gathering all types of meter reads and managing the read schedule. |
| Basic Criteria: | Reads are costly to collect due to frequent problems accessing some meters<br>Reads are rarely uploaded in a consistent format so that upload processing has a significant level of exception processing.<br>Reads are collected but not validated at the supply point so reads that are entered incorrectly are not amended onsite and the quality of read data uploaded causes high volume of exception processing<br>Reads are often forced complete or estimated if a read is unavailable |

TABLE 39-continued

Manage Core Operations
Serve
Usage

| | |
|---|---|
| | Meter read scheduling is coordinated (commodity read schedules are integrated where possible) and the majority of meters are read within the required service level agreement |
| | Read history is not stored in a single, central location, making replacement billing and disputed reads processing costly and awkward |
| | Meter reads are not captured in standardized format, making compilation for analysis and trending difficult (e. g. manually, via spreadsheets, electronic data transfer, and therefore requires significant FTE support) |
| | Manual manipulation required for ad hoc or off-cycle readings |
| | Inability to assess manual meter read quality and performance at the individual level |
| Threshold Criteria: | Read collection is fairly efficient and is uploaded using various formats/applications |
| | Reads are collected and validated at the supply point using mobile technology improving the quality of the data uploaded |
| | Reads are sometimes forced complete or estimated if a read is unavailable |
| | Meter read scheduling is complex with reads being distributed across billing cycles for cash flow and threshold processing. All meters are read within the required service level agreements |
| | Read history is stored in a single, central location and are controlled by process and business rules |
| | Meter operators and meter operator agents are given online access to customer data such that explicit access instructions can be passed from customer to agent and so that the agent follows any required security routine |
| | Ability to assess manual meter read quality and performance at the route level only |
| Above Average Criteria | Reads are collected via multiple channels and uploaded in a more standardized format but the tools for analysis and trending are not readily available |
| | Regardless of channel or application, all reads are validated at point of entry such that the data uploaded is high quality |
| | Reads are rarely forced complete or estimated if a read is unavailable |
| | Meter read scheduling is more complex and flexible; can include the ability to automatically balance reading routes and cycle days with travel modes (walking, driving), types of meters (automated and manual read), read required, etc. - ad hoc changes in routes/cycles easily incorporated |
| | Read history is stored in a single, central location where it is accessible and simple to maintain |
| | Target service levels for timeliness, accuracy and completeness are consistently achieved |
| | Ability to assess manual meter read quality and performance |
| Leading Criteria: | Reads are collected in real time through advanced or smart meters and compiled using a consistent format, enabling trending, analysis and early detection of issues |
| | Usage information is available to the customer at the time of use |
| | First call resolution for usage inquiries |
| | Real-time outage detection technology exists, and where appropriate, is used to inform the usage routine |
| | Meter data solution is integrated with billing and CRM solutions to support business processes such as new connections, meter exchanges, settlement and scheduled billing |
| | Meter read scheduling is conducted in real time and remotely |
| | Read history is stored in a single, central location and is proactively managed |
| | Customers have web access to their usage patterns and information with monthly reporting capabilities |
| | Usage data is used as a predictive tool for peak times, planned outages, demand side management and advanced tariff structuring. Includes baseline threshold alarms |
| | Ability to assess meter read quality and performance at the individual level that is integrated into coaching activities |

TABLE 40

Manage Core Operations
Serve
Billing

| | |
|---|---|
| Description: | Billing encompasses the end to end activities to generate accurate bills on schedule. Also included are formatting, printing, invoicing and mailing/sending bills, exception management, adjustment and cancellation. |
| Basic Criteria: | Bill accuracy levels difficult to manage and incorrect bills are sent out to customers due to poor meter read data and a poor estimation routine |
| | Bills are difficult to understand and are not offered online |
| | Non-energy bills are separated |
| | Customers are not offered tailored billing in terms of frequency, format or language |
| | Difficulty reconciling accounts billed versus not billed resulting in customers not being billed for extended periods |
| | Vacant premise consumption undetected for long periods |
| | Reactively managing billing exceptions through manual, report based distribution of billing work |
| | The level of billing exceptions means that the cost per bill is high and potentially unsustainable |
| | Volume and type of exceptions not tracked for trending and exception resolution productivity not measured |
| | Consolidated, multi-site billing not available or done entirely manually |
| | Billing channels are limited |
| Threshold Criteria: | Customer Service Agents are not consistently able to explain the bill and give information on reads or estimated consumption |
| | Bills meet regulatory requirements and offer an auditable calculation of the balance |
| | Non-energy charges managed by process work-around, requiring manual entry miscellaneous charges, which impacts receivables/revenue reporting |
| | Customers are offered tailored billing, (e.g. budget billing equal installments across the year, event-based billing) |
| | Customers can view bills online via a static representation of the current bill |
| | Bills re-design process occurs infrequently with little to no customer input |
| | The level of billing exceptions requires significant FTE support but is successfully managed by a dedicated root cause analysis and resolution team |
| | Manual multi-site billing, some consolidated billing functionality |
| Above Average Criteria | Customer Service Agents are able to explain highly accurate bills |
| | Bills meet regulatory requirements and offer an auditable calculation of the balance as well as a user-friendly view of rates, read history and ways to reduce bills in the future |
| | Customers are able to resolve queries online themselves |
| | Bills are flexible enough to include non-energy billing and allow reflective reporting |
| | Customers can view multiple bills online and can make simple online adjustments to filter bill information |
| | Bills are used to request payment and demonstrate bill calculation as well as deliver marketing messages and customer service information |
| | Bills are available in multiple languages |
| | Billing exceptions proactively and successfully managed by a dedicated root cause analysis and resolution team |
| | Errors and exceptions automatically routed to specific operators based on pre-determined criteria (e.g. error code and skill level) for resolution before bill sent to customer |
| | Automated multi-site consolidated billing |
| | Bill re-design process occurs annually with customer feedback aiding the design process |
| Leading Criteria: | Bills are produced within one day from read to bill |
| | Proactive management of operational costs to reduce cost per bill, for example reduced meter reading activity from AMR/SMI devices |
| | Month to date billing |
| | Bill frequency and format is flexible, includes non-energy components, according to customer preferences, and cost per bill is optimal |
| | End-to-end billing routine in finely tuned and monitored for early detection of any process failure |
| | Customer have the ability to select their predominant channel such as e-billing |
| | Customers can perform advanced queries online, generate on demand bills based on recent transactions, download in various formats and make adjustments |

TABLE 40-continued

Manage Core Operations
Serve
Billing

Automated root cause and exception handling based on predefined business logic
In-house quality assurance team for the back office transaction monitoring that utilizes automated real time tools and dashboards
Customers can choose billing channel, delivery method and preferred format
Bill re-design occurs annually and includes ongoing customer and employee feedback

TABLE 41

Manage Core Operations
Serve Payments

| | |
|---|---|
| Description: | Payments is the ability to process inbound customer payments. This capability includes managing the range of payment options available, working with payment processing vendor(s), reconciliation of the customer's account and managing prompt payment. |
| Basic Criteria: | Payments take time to be uploaded and credited to a customer's account and therefore retailer is unable to offer/manage prompt-pay incentives for customers
Payment batches come from several sources and require significant manual effort to upload and reconcile
Missing payments (payments that are received but cannot be matched to an active account), drive customer complaints
Customers are restricted in terms of payment method/frequency/options and this is a prominent source of customer dissatisfaction |
| Threshold Criteria: | Payments are uploaded and credited to a customer's account quickly - this is subject to a significant volume of exceptions and therefore requires high levels of FTE support
Payment returns and associated fees are manually processed
Prompt-pay incentives are offered to customers
Missing payments (payments that are received but cannot be matched to an active account) are followed-up and manually worked to ensure minimal unallocated payments
Customers are offered multiple payment options (e.g. cash, direct debit, pre-authorized payments, third party) |
| Above Average Criteria | All payments are automatically uploaded and credited to a customer's account efficiently and at negligible operational cost
Prompt-pay incentives are proactively offered to customers and prompt-pay discounts automatically assigned via standard bill processing
Payment exceptions are infrequent and proactively managed to resolution
Customers are offered multiple payment options, methods, plans and channels (i.e. payment by IVR, web, pre-payment meters)
Customers can make reoccurring payment arrangements via the online billing system |
| Leading Criteria: | Payments are uploaded and credited to a customer's account automatically and efficiently - cost per payment is optimal
All available one time and recurring payment platforms are consistent through all customer interaction channels
Returned payments and associated fees are automatically processed
Prompt-pay incentives are proactively offered to customers and prompt-pay discounts assigned via standard bill processing - customers are also given incentives to take up low-cost payment options such as direct debit
Misapplied payments are placed in exception and rectified by next billing cycle |

TABLE 41-continued

Manage Core Operations
Serve Payments

Outsourcing of return mail processing
Ability to direct payments to clear receivables and prevent allocation to disputed receivables (until resolved)
Customers are offered multiple and flexible payment options, methods and plans
Ability to adjust billing/payment cycles for customers on demand

TABLE 42

Manage Core Operations
Serve Credit & Collections

| | |
|---|---|
| Description: | Credit & Collections is the ability to establish and implement a defined credit policy and manage customer credit. This includes the ability to control credit according to customer value and maintain an effective cost to collect. |
| Basic Criteria: | Collections objective is not formally defined and can fluctuate according to management team or overall retail performance
No formal identity verification capability and external credit check is available on an exceptional basis
Ad hoc debt management and tracking
No segmentation or products for high credit risk customers
Standard debt collection methods and techniques are available
Credit policies are designed according to statutory requirements
Customers in debt are treated aggressively but this can be problematic when customer debt is incorrectly calculated. Retailer has been subject to regulator penalties for poor customer treatment
No standardized policy for commodity theft
External collection agency not usually utilized for bad debt
No standard approach/policy for handling bankruptcies, write-offs or receiverships |
| Threshold Criteria: | Collections objective is account reconciliation
Identity verification is not available as a standard solution, external credit check is available on an exceptional basis
Customers are offered a security deposit option to minimize their credit risk and this is managed manually
Credit management team are reactive to customers in debt and tend to handle customers manually
The retailer offers a standard set of collection methods and techniques according to level of debt, rather than customer insight analysis
Advanced "sensitivity" training, "talk-off" training (negotiating skills) provided to agents
Commodity theft measures are reactive and handled manually |

TABLE 42-continued

Manage Core Operations
Serve Credit & Collections

| | |
|---|---|
| | Allocation to external collection agency is manual and time consuming to reconcile |
| | Standard policies for handling bankruptcies, write-offs and receiverships but very manual process |
| Above Average Criteria | Collections objective is loss minimization and non-payment exposure |
| | New customers are subject to identity verification as standard but there are few guidelines for external credit check. This means that agents tend to run improper credit checks |
| | Credit policy offers programs and differing treatments for all customer segments which align with regulator |
| | Customers are offered limited credit products to reduce overall risk |
| | Policies in place for commodity theft management |
| | Accounts automatically selected for transfer to external collection agency. Transparent reconciliation of payments and commission calculation |
| | Handling of bankruptcies, write-offs and receiverships are partially automated |
| | Collection campaigns and techniques are refreshed such that customers are not de-sensitized |
| | Credit system integrated with billing and CRM system, ensuring real-time information and access to customer notes |
| | Automated selection based on pre-set criteria for accounts eligible for disconnection - manual review option before dispatch |
| Leading Criteria: | Collections objective is profit maximization and this manifests itself as an integrated solution for tariff/rate management, payment processing and managing customer experience. |
| | All outbound calls are process automatically |
| | Utilization of third party management and tools in the billing cycle |
| | All new customers are subject to an identity and credit check |
| | The retailer seeks to understand why a customer is in debt and will tailor collection methods accordingly. Treatments incorporate internal and external payment patterns |
| | Customers are offered a various credit products to minimize credit risk before collections costs are incurred (e.g. security deposits, credit checks, pre-payment plans, flexible bill dates) |
| | Retailer has the ability to balance willingness to pay and collection costs |
| | Standardized policies in place for revenue protection management |
| | "Scientific" collection management (i.e. propensity to pay) and predictive behavioral analytics utilized |
| | Payment arrangement installment plans fully automated (including collection action on default, cancelled installment plans and transfers) |
| | Final accounts are accounted for by a customer leaving the retailer with a final bill matching the final bill transfer |
| | Automated release management of security deposits based preset criteria |

The following Tables 43-46 provide an explanation of the capabilities and corresponding key assessment areas and performance capability criteria for each capability within the manage supply platform 108.

TABLE 43

Manage Supply
Demand Forecast

| | |
|---|---|
| Description: | Demand Forecast enables a retail utility to determine customer commodity demand in the long term, short term and intra-day. This includes forecasting base demand, incremental demand from customer acquisition or growth, and reductions from customer churn or shrinking market demand. |
| Basic Criteria: | Long-term, sales-based forecasting is poor and increases risks associated with supply |
| | Short-term, forecasting is not a key skill within team |
| | Inability to incorporate weather forecasts into short term demand |
| | Inability to develop intraday forecasts |
| | Retail and wholesale do not communicate effectively and are therefore unable to work collaboratively |
| | Forecasts are reviewed on an ad hoc basis with no regular checkpoints |
| Threshold Criteria: | Some successful long-term and short-term forecasting based on sales |
| | Poor short-term weather based forecasting |
| | Poor ability to forecast economic and industry trends in both the long and short term |
| | Teams are informally integrated with customer supply forecasting - looking at churn rates |
| | Forecasts are periodically updated |
| Above Average Criteria | Accurate short term, long-term and intra-day forecasting based on sales |
| | Limited success in weather-based short-term forecasting |
| | Relatively accurate forecasts of the market, macro-economic and industry segment trends are incorporated into the short and long term forecasts |
| | Wholesale group uses periodic forecast data |
| | Teams are formally integrated with customer supply forecasting |
| | Forecasts are regularly reviewed and updated |
| | Demand forecast is fed into a Value at Risk (VAR) model |
| Leading Criteria: | Excellent long-term forecasting as well as weather-based/short-term forecasting |
| | Dynamic and reactive to short-term and real-time forecasting |
| | Advanced ability to forecast market, economic and industry trends using a variety of sources |
| | Intelligent ability to balance the market forces as wholesale and retail market teams interact under protocols defined by long term and short-term agreements. |
| | Day ahead view of customer sign-up and disconnects integrated into short-term forecasts |
| | Adherence to protocols for intraday forecasts |
| | Effective communication between teams focused on different markets |
| | Advanced modeling and multi-variant analysis is used to consistently re-evaluate demand forecasts |
| | Sophisticated modeling tools in place that are integrated with other systems |

TABLE 44

Manage Supply
Procurement

| | |
|---|---|
| Description: | Procurement includes identifying and negotiating commodity supply procurement contracts. This could include long-term supply agreements, internal transfer agreements (if the utility also has generation to transport capabilities), market sourcing, participation in Power Purchase Arrangements or spot market sourcing. |

TABLE 44-continued

Manage Supply
Procurement

| | |
|---|---|
| Basic Criteria: | Wholesale and retail are not integrated in communicating demand forecast changes, risk allocation and transfer and product pricing<br>Poor optimization of supply portfolio<br>Poor at managing short-term weather based swing risk (i.e. no integration with demand forecasting) |
| Threshold Criteria: | Wholesale and retail level of integration is marginal<br>Communication on demand forecast changes is sporadic<br>Suboptimal supply portfolio balance<br>Risk allocation and transfer is marginal - sporadic management of swing risk |
| Above Average Criteria | Wholesale and retail are integrated in certain aspects (i.e. communication of long-term sales forecasts may be good, but short-term weather based forecasts may be sporadic or unreliable)<br>Risk allocation & transfer may be consistent for base load type customers (wholesale look alike) but not swing customers - swing risk management may be sporadic<br>Optimization of supply portfolio meets business goals and objectives<br>Experimentation with broader, innovative demand-side strategies and investment in customer facilities (e.g. Owning certain components of the building energy plant)<br>Demand reductions included in supply planning |
| Leading Criteria: | Wholesale and retail are well integrated in communicating demand forecast changes, risk allocation & transfer and product pricing (i.e. good at managing short-term weather based swing risk)<br>Active load balancing between wholesale and retail - dynamic response to market conditions<br>Common wholesale and retail portfolio<br>End-to-end integration with demand forecasting and settlements management<br>Excellent optimization of supply portfolio that exceeds expectation<br>Advanced use of alternative energy supplies and procurement to balance requirements and reduce ecological footprint<br>Fully integrated with pricing strategy |

TABLE 45

Manage Supply
Contract Management

| | |
|---|---|
| Description: | Contract Management covers the maintenance and management of commodity supply contracts. The focus of this capability is effective supplier and materials management for the optimal efficient purchase of required commodities. |
| Basic Criteria: | Basic agreements available with tightly defined parameters<br>Contracts are manually tracked causing delays and higher instances of mishandling agreements<br>Reactive audits of specified contracts to ensure enforcement<br>Ad hoc risk assessments completed for potential agreements |
| Threshold Criteria: | Standardized agreements available with customizable aspects<br>Basic contract management system in place with shared resources<br>Periodic reviews of sample agreements to ensure compliance<br>Basic risk assessments conducted by segmentation of contract type |
| Above Average Criteria | Customizable contracts available with structures and parameters in templates<br>Advanced contract management system in place with electronic searching, advice of key dates, etc. |

TABLE 45-continued

Manage Supply
Contract Management

| | |
|---|---|
| | Regular reviews of contracts are used to uphold contract terms and conditions<br>Thorough risk assessments completed for each agreement by specialized resources |
| Leading Criteria: | Fully customized contracts available utilizing specialized resources<br>Virtual or centralized contract management system with dedicated support resources<br>Contractual arrangements are automatically monitored against all commodity use to ensure contract compliance<br>Automated and sophisticated risk assessment tools are employed to ensure risks are mitigated and agreements are swiftly executed |

TABLE 46

Manage Supply
Settlement

| | |
|---|---|
| Description: | Settlement includes supplier invoice validation, processing and remittance. Also included in this capability are processes to ensure that aggregate consumption across the customer base has been accounted for and balances with the supplied commodity amounts that are being charged by suppliers. |
| Basic Criteria: | Annual balancing with demand forecasting and logged consumption<br>Infrastructure charges for consumed commodities do not always correlate with calculated consumption<br>Settlements strategy aligned with credit risk strategy<br>No credit risk strategy<br>Reactive or sporadic balancing and investigation of discrepancies<br>Irregular supply/distribution balancing leads to regular write-offs of substantial value |
| Threshold Criteria: | Periodic balancing with demand forecasting and logged consumption<br>Infrastructure charges mostly correlate with calculated consumption<br>Reactive strategy for credit risk<br>Tracking of settled prices versus consumed value<br>Tracking of volume nomination versus scheduled volumes versus contractual volumes<br>Periodic balancing and investigation of discrepancies leads to the reduction of write-offs to minimal amounts |
| Above Average Criteria | Regular auditing and balancing with demand forecasting and logged consumption<br>Infrastructure charges can be mapped to calculated consumption - all comparisons are auditable<br>Proactive strategy for credit risk and counterparty risk<br>Tracking of settled prices versus consumed value<br>Regular balancing and investigation of discrepancies leads to write-offs only being used in exceptional cases |
| Leading Criteria: | Ongoing auditing and balancing with demand forecasting and logged consumption<br>Detailed tracking of volume nomination versus scheduled volumes versus contractual volumes<br>Ongoing strategy for credit risk<br>Top performer capable of offering a managed service externally as a balancing provider<br>Ongoing balancing and investigation of any discrepancies virtually eliminating any imbalance write-offs |

The following Tables 47-50 provide an explanation of the capabilities and corresponding key assessment areas and performance capability criteria for each capability within the manage field requests platform 110.

TABLE 47

Manage Field Requests
Field Request Management

| | |
|---|---|
| Description: | Field Request Management includes processes to manage requests for field services transactions, such as meter installations, distribution system repairs, meter exchanges, or emergency services. |
| Basic Criteria: | Field requests are received from customers and relayed to the receiving distribution centre within established service timelines via limited channels
Meter reads are accepted by retail customer service agents
Tracking system is basic - minimal individual request information is available to the customer service agents. This leads to long turnaround times for information requests and inefficient use of time spent liaising with the distribution entity's field service operations
No feedback loop exists to confirm completion of requests |
| Threshold Criteria: | Field requests can be submitted by customers via online, self-service channels
Once validated, retail customer service agents can automatically send and receive service requests and reply to information within agreed upon service standard timelines
Meter readings can be accepted through a self-service channel
Agents can access the distribution entity's field service operations log to track progress of specific requests
Periodic audit of completed requests allows Retail Customer Service Agents to confirm if requests have been handled/addressed in a past period |
| Above Average Criteria | Customer Service Agents are provided with regular updates on the status of field service requests via multiple channels
Regular reporting - provides a more time-sensitive view of request completion
Proactive messaging is available through self-service channels (web, IVR, etc.) notifying customers of major requests that have already been logged
Information can be retrieved by customers on an "as requested" basis (for specific requests) through self-service channels |
| Leading Criteria: | Proactive real-time communications relayed to customers regarding potential work, outages, or impacts through multi-channels (SMS, email, voice, etc.)
On demand, real time updates and information is available to customer service agents
Requests are logged and updated with specific tracking numbers
Updates and information available about specific requests on demand for customers via self and full service channels
Real-time two way communication channels between distribution service centers and retail customer service representatives enable the timely flow and distribution of information
Ability to schedule field requests within a specified window that is adhered to and communicated to the customer |

TABLE 48

Manage Field Requests
New Connection

| | |
|---|---|
| Description: | New Connection encompasses the ability to install new meters in new construction areas, replace faulty or outdated existing meters, and provide final open or live connection to the distribution network or pipeline for customers. This capability also covers recording the site as "live" in the related customer information system to enable billing. |
| Basic Criteria: | Requests for new connections accepted by Customer Service Agents through a manual process. This can lead to delays, mishandling of requests, and an inability to track or estimate costs
New connections are requested individually, creating a labor intensive manual process for multiple connections
Changing ownership and associated reconciliations are done manually
No distinction between residential, development or commercial connection requests |
| Threshold Criteria: | New connection requests are handled and manually entered into a customer information system enabling tracking
Ad hoc processes (spreadsheets, etc.) are utilized to assist with multiple or bulk connections
Change of ownership and reconciliations are done manually with agents diarizing dates to reconfirm with customers
Consistent processes utilized for all segments
Separate queues or contact points based on customer segmentation |
| Above Average Criteria | Customer information system able to track and proactively provide agents estimating guidelines and standard estimates
Automated processes are utilized to create multiple connection requests
Ownership changes and energy use reconciliations are processed automatically when triggered by a request
Dedicated channels for each customer segment
Customized processes and service level standards developed for each customer segment based on strategic importance, profitability and lifetime value
Shared account services team able to process connection requests |
| Leading Criteria: | Request management system able to track and proactively notify customers of the state of their request
Online or automated scheduling enables service calls to be booked and optimized to minimize travel or equipment delays for crews
Integrated modules or tools in the request management system create multiple connections, track and monitor ownership and proactively alert contacts to changes in costs or connections through the development process
Change of ownership is completed automatically on a pre-arranged date and all charges are appropriately assigned
Dedicated real time channels and processes to optimally serve various customer segments (residential, development or commercial)
Customer care and crews have a single view of the customer available in real time
Dedicated account managers process individual connection requests
Customer can bill on behalf of a real-estate management company or builder |

Table 49

Manage Field Requests
Emergency Response

| | |
|---|---|
| Description: | Emergency Response includes the ability to respond and address an emergency situation such as a gas leak, downed power line or intrusion into a high |

Table 49-continued

Manage Field Requests
Emergency Response

| | |
|---|---|
| Basic Criteria: | voltage area. The ability to dispatch adequately trained and equipped response teams is critical in ensuring incident prevention and management.<br>Emergency notifications received by retail contact centre<br>Basic messages available for agents to notify customers of potential issues<br>Notifications and requests relayed to emergency crews - no feedback loop exists<br>All notifications relayed directly to the distribution response team<br>Emergency disconnections are requested and handled at the discretion of the distribution response team |
| Threshold Criteria: | Emergency situation notifications received via s multiple channel<br>Feedback notifications regarding specific events available on an as needed basis<br>Retail agents receive notifications and assign to pre-assigned (broad) categories<br>Emergency energy disconnections are requested through the distribution organization |
| Above Average Criteria | Notifications are triaged according to severity by a pool of up-skilled agents<br>Detailed information is gathered and relayed to the response team<br>Ongoing updates are provided to retail agents for the purpose of updating customers<br>Emergency disconnection requests are entered and transmitted directly to response crews |
| Leading Criteria: | Emergency notifications are accepted via all communication channels available including smart metering infrastructure technology<br>Agents with specialized skills interact directly with emergency response crews to actively support the response process<br>Agents are able to answer queries on the cause of the outage, when restoration will occur, the breadth of the impact and assess the outage window<br>Proactive, real-time communications with customers, media, government and regulators via multiple channels (voice, SMI, IVR, email, SMS, door knockers, etc.) to advise of potential emergency situations and the status of current responses<br>Integrated initiation of execution of emergency response plans as appropriate<br>Two-way communications are seamless between the retailer and the emergency response team.<br>Response team has real time access back to customer care information<br>Customer care has the ability to identify the exact cause of the problem remotely<br>Energy supply can be remotely disconnected in emergency situations with minimal delays |

TABLE 50

Manage Field Requests
Meter Data Management

| | |
|---|---|
| Description: | Meter Data Management includes the organization of meter data according to supply point configuration, data security, data quality management and integrity. |
| Basic Criteria: | Meter data is imported using ad hoc methods and templates leading to inconsistent data - a high volume of exceptions and billing backlogs. Backlogs tend to become regulatory compliance issues or have major impacts on business performance<br>No proactive management of meter data quality<br>Meter data is stored and modeled in several applications and therefore does not support a robust data model<br>Historical meter data is stored according to regulatory requirements but it inaccessible and is not auditable<br>Meter data database has no concept of, or alignment with, business processes, it is simply a data repository. Relevant meter data is also stored in other systems/formats (e.g. customer records or spreadsheets) |
| Threshold Criteria: | Meter data is imported and transferred using inconsistent file formats which require complex validation. Meter data management typically requires a significant FTE impact and lack of data integrity affects the customer experience<br>No dedicated meter data management solution - data is managed according to standard report formats across all back office operations. Resolution of issues and improvement in performance requires skilled IT resources<br>Meter data is stored and modeled in a few major applications and therefore supports a consistent data model<br>Meter data is stored in multiple systems (without a clearly defined master) in order to be aligned with other business functions but this means that the data can become inconsistent across systems |
| Above Average Criteria | Meter data is imported and transferred using standard file formats which are subject to automated validation to ensure consistent data integrity. This upload of data generates a high volume of exceptions and therefore can affect the efficiency of back office operations and impact the customer experience<br>Meter data management system offers analysis tools for data quality but cannot quickly and consistently identify the root cause of data integrity issues. Resolution of issues and improvement in performance is supported by system tools and therefore does not always require skilled IT resources<br>Meter data is mastered in one application. Data dictionaries are created but poorly maintained and often out of date - this can lead to inconsistent data entity definitions in other systems<br>Meter data management solution is configured to support business processes such as new connections, meter exchanges, settlement and scheduled billing |
| Leading Criteria: | Meter data is imported and transferred using standard file formats which are subject to automated validation and auto-correction to ensure consistent data integrity. Exceptions are handled within SLA to ensure no backlog for the upload of reads and generation of bills<br>Meter data is transferred in real time via smart metering home devices<br>Meter data management system offers graphical analysis tools for comparing raw/industry data to system edited data and will track defined KPI values<br>Meter data is mastered in one application and data integrity in other systems is ensured by the clear definition of an integrated data model (data dictionary, data event modeling, metadata defined)<br>All historical meter data is stored and is auditable to specific user edits enabling efficient resolution of data integrity issues<br>Meter data management solution is integrated with billing and CRM solutions to support business processes such as new connections, meter exchanges, settlement and scheduled billing |

The following Tables 51-55 provide an explanation of the capabilities and corresponding key assessment areas and performance capability criteria for each capability within the manage retail insight platform 112.

TABLE 51

Manage Retail Insight
Data Management
Customer Insight

| | |
|---|---|
| Description: | Customer Insight is the ability to analyze customers according to attributes, usage intentions and behavior. The output of this analysis and modelling will support the identification and generation of initiatives to influence how best to market, sell, and serve customers, and can also be used to evaluate channel effectiveness. |
| Basic Criteria: | Customer channel usage is not tracked for each customer or reason for inbound contact
No formal processes, tools or methodologies in place to gather and analyze customer data
Any ad hoc analysis carried out tends to be costly due to poor quality data, a lack of focus on what metrics are required and inconsistent sponsorship and management
Customer data report offer an inaccurate view of the customer
Mystery shop calls are made to assess the customer experience during customer interaction but this is then assessed on a subjective basis and this can be problematic in terms of ensuring all agent assessments can be comparable
Customers are not asked to carry out a survey as this is seen as inciting criticism
It is not known how many times a customer calls in a given period or why they have contacted the utility
No formal processes in place to track and measure the impact and effectiveness of past improvement initiatives |
| Threshold Criteria: | Customer channel usage is tracked for reason for inbound contact.
Records of customer contact are created each time a customer calls, e.g. agents are required to complete a 'wrap up' at the end of each call.
Basic information is gathered from the IVR and WEB but lacks common channel integration strategy and usability of insight data
First call resolution is measured but not consistently and not well defined
Tools or methodologies used to analyze customers are unsophisticated and not reliable
Customer information is collected and analyzed on ad hoc basis, as per requirements
Basic information is gathered from the IVR and WEB but lacks common channel integration strategy and usability of insight data
No formal processes are in place for turning customer insight into actionable feedback, reports and continuous improvement initiatives
Mystery shop calls are supported by call recording to assess the customer experience during customer interaction and this is then assessed on a formal basis
Customers are occasionally asked to carry out a survey which is sent with their bill and requires customer to return a form by post.
Forms which are not returned are not chased and data received is difficult to analyze
Customer channel usage is tracked for reason for inbound contact
No formal team in place
Ad hoc processes and metrics in place to assess past initiatives |
| Above Average Criteria | Records of customer contact are created each time a customer calls, e.g. agents are required to complete a 'wrap up' at the end of each call.
IVR & WEB analytics are extracted and transformed into customer specific or enterprise data warehouse.
Exploration of channel analytic tools (e.g., ClickFox) to drive higher utilization underway |

TABLE 51-continued

Manage Retail Insight
Data Management
Customer Insight

| | |
|---|---|
| | First call resolution is measured and assessed
Tools and processes used to analyze customers are unsophisticated but reliable and standardized
Customer information is collected and analyzed on a formal basis and information includes customer intentions, preferences and characteristic
Mystery shop calls are supported by call recording to assess the customer experience during customer interaction and formally assessed
Customers are sometimes asked to carry out a survey at the point of contact, either online or at the end of a phone call. Customers who choose not to respond are not identified and reported
Customer experience is measured in tangible terms and detailed customer responses produce actionable feedback and regular reporting
Multi-discipline team works with customer and market strategy development teams
Past improvement initiatives are tracked inconsistently |
| Leading Criteria: | Customer channel usage is tracked for reason for inbound contact.
This data is then used to identify trends and customer preferences.
Records of customer contact are created each time a customer makes contact with the utility.
Calls and self-service channels are tracked alike
Sophisticated channel and customer intentions insight captured within channel analytics tools, intention mining software, and enterprise data warehouse(s)
First call resolution is measured and assessed.
Multiple measurement methods are used to accurately reflect customer experience and effectiveness of operations
Customer information is collected and analyzed on a regular, consistent and formal basis using sophisticated psychometric and/or behavioral techniques, providing a coherent single view of customer behavior and needs
Customer analytic tools include the utilization of predictive modeling, multiple channels used to gain insight
Insight data is synthesized into a format that allows for rapid root cause analysis and the production of standardized customer insight reports that are aligned to organizational metrics
Dedicated continuous improvement processes and initiative tracking
Structured, dedicated lab/pilot environment for evaluating any changes to customer experience
Customer survey is innovative and tailored to specific segments
Customer channel usage is tracked in real time and cross referenced with customer behavior
Dedicated customer analysis team works closely with customer and market strategy development teams
The quality program is calibrated with customer expectations consistently and at a fixed frequency
Standard process and key performance metrics used to continually track past initiatives |

TABLE 52

Manage Retail Insight
Market Insight
Marketing Analytics

| | |
|---|---|
| Description: | Marketing Analytics is the ability to gather information on key marketing performance indicators and to ensure that utilities can invest in the highest yielding marketing initiatives and evaluate marketing effectiveness around targeting, campaign effectiveness, loyalty management and brand management. |
| Basic Criteria: | Marketing programs and campaigns are not tracked via standardized processes and methodologies<br>No processes in place to gather data on marketing levers<br>Campaigns have no formal response tracking and measurement once executed<br>Analysis and continuous improvement capabilities do not exist to further develop marketing effectiveness<br>Little effort made to apply the learning from previous marketing campaigns to enhance effectiveness of future initiatives<br>Key metrics such as marketing ROI, lead costs and uptake rates are not effectively tracked<br>No dedicated resources in place to gather marketing data and provide meaningful insight<br>No formal processes in place to track and measure the impact and effectiveness of past improvement initiatives |
| Threshold Criteria: | Simplistic pre-existing analysis tools and models adapted for individual marketing analysis efforts developed independently and housed in multiple repositories<br>Analysis efforts require extensive data consolidation and manipulation prior to use due to unstructured and fragmented approach<br>Marketing initiative success is inferred from historical data to drive capability assessments<br>Manual report generation is available but costly and time consuming to implement<br>No process in place to share findings throughout the differing market functions to drive wider insights<br>Insights drive continuous improvement projects to new marketing are conducted on an ad hoc basis and are effectively tracked or aligned back initiatives<br>Key metrics such as marketing ROI, lead costs and uptake rates are manually calculated<br>Marketing team provides resources on an as needed basis to implement projects from key insights<br>Ad hoc processes and metrics in place to assess past initiatives |
| Above Average Criteria | Marketing data analysis is collected from databases that share a<br>Analysis of data provides automated and standardized report generation to cut both process time and cost<br>Marketing program success is derived from a blend of general historic metrics as well as the gap analysis between actual and expected results<br>Regular reporting and normalized common view databases allow for knowledge sharing between differing marketing capabilities<br>Standard processes to use knowledge gained from previous efforts to design enhanced marketing programs and campaigns<br>Insights are not consistently applied to marketing and resource decisions<br>Marketing programs and campaigns are routinely and rigorously tested using standardized metrics<br>Key metrics such as marketing ROI, lead costs and uptake rates are automatically calculated<br>Past improvement initiatives are tracked using inconsistent approaches |
| Leading Criteria: | User friendly tools and methodologies in place that integrate data stores from all marketing channels and programs to routinely and rigorously test and report on programs<br>Analysis of data includes predictive modeling used to continually improve programs and determine individual program contributions<br>Marketing program success is derived from systemic measurement of KPIs linked to specific marketing efforts and customer response to improve future initiatives<br>Standardized root cause analysis methodologies in place to support identification of insights for continuous improvement and knowledge sharing<br>New programs are not implemented until tested with select customers<br>Key metrics such as marketing ROI are automatically calculated for individual initiatives<br>Integrated with performance management functions to drive improved effectiveness and align people objectives with corporate goals |

TABLE 52-continued

Manage Retail Insight
Market Insight
Marketing Analytics

Operated by skilled practitioners dedicated to market analysis
who manage integration between marketing, sales
and customer service platforms
Standard process and key performance metrics used to
continually track past initiatives

TABLE 53

Manage Retail Insight
Sell Insight
Sales Effectiveness

| | |
|---|---|
| Description: | Sales Effectiveness is the ability to capture and track sales performance data to identify and act upon opportunities for increased sales and retention through a customer relationship management portal. Includes the tracking of past improvement initiatives for effectiveness and efficiency. |
| Basic Criteria: | Sales program performance is not tracked in standardized platform and information is often distributed via a paper-based channel
Data is collected over limited external and internal sources with limited ability to access up-to-date and accurate reporting
No sales analytics and business models are utilized
No standard methodologies in place to generate a continuous improvement cycle
No identification or prioritization capability into root cause of sales program success or failure
Limited use of internal metrics to assess the value of improvement opportunities
No sales standardized sales metrics aligned to CRM KPI's in place to draw consistent insight from
No dedicated resources in place to gather sales data and provide meaningful insight
No formal processes in place to track and measure the impact and effectiveness of past improvement initiatives |
| Threshold Criteria: | Simplistic pre-existing analysis tools and models adapted for sales performance measures and reports are distributed electronically
Data is collected over multiple sources and provides manual reporting functions that are timely and not necessarily cost effective
Internal historical data is leveraged as an input into a limited sales analytics and modeling process
Sales performance gaps identified via manual search by sales force
Ad hoc processes in place to identify and prioritize areas requiring improvement using root cause analysis
Sales force recognized as a strategic asset but not actively managed, developed and aligned through training and knowledge sharing
Metrics and feedback are tracked through a basic set of CRM KPIs
Sales program leaders provide insight on an as needed basis to implement projects from key insights and provide resources
Ad hoc processes and metrics in place to assess past initiatives |
| Above Average Criteria | Sales data analysis is collected from analytical databases that share a common view
Program performance information distributed electronically with automated report generation
Continuous use of internal and external comparison points to assess organizational performance
Ability to access up-to-date, aligned and accurate customer data and integrate it with sales performance data
Traditional analytics and modeling utilized to develop program business cases and predict outcomes and measure against collected outcome
Limited analysis capability into root cause of performance gaps using standard methodologies
Metrics contain transparent and specific CRM KPI's that easily track individual program outcomes
Dedicated insight team in place to analyze data, predict outcomes and action continuous improvement projects
Past improvement initiatives are tracked using inconsistent approaches |
| Leading Criteria: | Sales performance collected and measured via a sales workbench and portal that provides automated and customizable dashboard reporting capabilities |

TABLE 53-continued

Manage Retail Insight
Sell Insight
Sales Effectiveness

Sales data portal integrates macroeconomic external data with historical performance and advanced analytics and predictive modeling (Promotion Optimization, Forecasting, Econometric Modeling)
Dashboard aligned to customer data reporting systems to draw continuous improvement processes
Capability to identify and drill down into root cause of performance expectations and outcomes
Metrics contain transparent and specific CRM KPI's that easily track individual program outcomes and are associated to industry benchmarks to assess and promote performance
Skilled practitioners with a deep understanding of key levers driving revenue (e.g., cross-sell/up-sell and retention programs) are dedicated to market analysis who manage integration between marketing, sales and customer service platforms
Integrated with performance management functions to align people objectives with corporate goals
Standard process and key performance metrics used to continually track past initiatives

TABLE 54

Manage Retail Insight
Serve Insight
Operational Insight

| | |
|---|---|
| Description: | Operational Insight is the ability to gain insight into agent and system performance affecting key operational metrics. Performance data is used to identify opportunities for efficiency, growth or enhancement, generate continuous process improvement and manage transformational initiatives. |
| Basic Criteria: | Insight reporting is often subjective and is not consistently auditable
Operational reports are generated regularly but only reviewed, distributed on an ad hoc basis
Manual processes required to generate integrated insight reports
Integrated insight reports are generated, reviewed, and distributed on an ad hoc basis
Data from disparate call center applications is hard to access and use. Reporting is difficult and customized reports are costly to produce and implement
No formal balanced scorecard completed or generated
Management teams have limited view of agent arrival and departure times, amount of time working and how often they make themselves available
Data is not always accessible due to user configuration
Product and service outages are not planned |
| Threshold Criteria: | Insight reporting provides metrics but does not present an evaluation of performance based on the metrics and reporting is often disregarded
Reactive attention when poor performance becomes a priority and reporting is suddenly in focus
Reports are generated on a regular basis on agent and customer level metrics
Data is gathered from various call center applications using numerous base package and customized reports. Data is not gathered into one location making detailed analysis difficult
No formal balanced scorecard completed or generated to derive root cause analysis
Ability to monitor agents in near real time for all channels
Product and service outages are known to be down due to planned performance tuning |
| Above Average Criteria | Insight reporting is objective and mostly auditable for data analysis
Reporting is generated and posted to email accounts with a view of operations over a 1-2 hour interval - email accounts can fill up with report messages and therefore limit the impact to the recipient
Data is accessible but user access configuration is not tightly controlled such that agents are able to change data which should be protected
Data is gathered from various call center applications using numerous base package and customized reports. Data is manually gathered into one location (e.g. spreadsheet) making some cross-application analysis possible. Call center data is not married with customer data, however |

TABLE 54-continued

Manage Retail Insight
Serve Insight
Operational Insight

| | |
|---|---|
| Leading Criteria: | Balanced scorecard displays standard data generated to track performance against KPI's which is distributed to performance management teams<br>Simplistic root cause analysis models<br>Ad hoc qualification and prioritization and of potential improvement projects<br>Product and service outages are planned and are restricted to off-peak hours<br>Insight reporting through an integrated real-time online portal is objective, comprehensive and auditable and provides a holistic view of the operations capability. Audits are taken regularly to check that reports are valid and reports are used to manage workforce planning<br>Data is stable in the system and is sufficient for agents to do their job<br>Contact center data warehouse integrates data across channels, applications, and operations. A scorecard is used to display key metrics. Data warehouse insight enables cross-functional reporting, drill-down capabilities, and provides a single source of the truth. Insight is gained across multiple dimensions (e.g., call handling, quality, forecasting, etc.)<br>Predictive modeling capability is incorporated into operational insight program<br>Sophisticated tools are used that produce standardized reports to assess root cause analysis and to provide KPI tracking - the output is provided for performance improvement programs<br>Insight leveraged to enable product and service outages to take place during times that least inconvenience the customer |

TABLE 55

Manage Retail Insight
Serve Insight
Predictive Decision Analytics

| | |
|---|---|
| Description: | Predictive Decision Analytics is the ability to capture and track customer transaction data and behavior to identify, predict and act upon opportunities for increased effectiveness and efficiencies through the integration of data, systems and business processes. |
| Basic Criteria: | No predictive modeling software is employed - Collection behavior prediction is based on historical customer data only<br>Simple data querying and scoring mechanism are unable to create differing customer treatments for differing risk profiles - retailer is more reactive than proactive with collections analytics<br>No linkage with operational insight capability to collect data and identify initiatives for process improvement |
| Threshold Criteria: | Predictive modeling is limited to basic descriptive models for profiling and segmenting customer collection behavior<br>Customers are segmented by broad existing treatments used for marketing purposes<br>Historical data and developed predictive data is used to develop risk levels for segments<br>Segmentations and customer treatments are static and not updated on a regular basis<br>Limited linkage between operational insight capability prevents effective improvements to the billing, payments, and collections processes |
| Above Average Criteria | Predictive modeling utilizes advanced statistical models that offer a single approach to measuring the likelihood a customer segment will make payment<br>Application of various analyses to group collected data and validate predictions<br>Customers are segmented into differing risk factor treatments such as high, medium and low<br>Customer treatments are used to alter customer handling via operational improvement programs<br>Segments are cross referenced by demographics, geography, aggregated transaction data, channel usage and behavior<br>Capability linked to operational insight to directly leverage payment and collection analytics for improvement programs and metrics |
| Leading Criteria: | Predictive modeling utilizes a custom engineered software solution capable of targeted, forward-looking data collection methods and sophisticated statistical techniques/data mining to identify segments based on detailed collection behavior |

TABLE 55-continued

Manage Retail Insight
Serve Insight
Predictive Decision Analytics

Model produces behavioral scoring to define actionable individual
treatments (e.g. based on the customer's likelihood of payment)
and is cross referenced with customer's lifetime value
Treatments are validated continually using repeatable processes
and scoring
Analytics knowledge is retained to perform continual model checks
based on predicted and actual outcomes
Analytics used to understand concept of differentiated customer
treatment are applied consistently through operational
improvements
Operational insight linkage is more focused on forward-looking
models and analysis. Predictive analytics are used to build
business cases for prioritizing and tracking improvement efforts
and assigning resources The following Tables 56-57 provide an explanation of the capabilities and corresponding key assessment areas and performance capability criteria for each capability within the customer advocacy platform 114.

TABLE 56

Customer Advocacy
Complaint Management

| | |
|---|---|
| Description: | Complaint Management provides resolution to escalated customer complaints or issues with the retail utility, investigates root causes and addresses any gaps in processes that impact the customer. Includes trend analysis and analytics to prevent complaints before they occur. |
| Basic Criteria: | Poor customer service is usually followed by written complaints to management |
| | No complaint process exists - handled on an ad hoc basis depending on complaint type |
| | Elementary historical tracking system |
| | Complaint data collected only when there is a special circumstance that is going to cause customer dissatisfaction |
| | No involvement by those responsible for policy change |
| | No coaching or accountability |
| | Ad hoc feedback to improve process |
| Threshold Criteria: | Escalation process follows organization's hierarchy |
| | Poor customer service is escalated when appropriate and customer is pacified by appropriate team |
| | Customers with unjustified complaints (e.g. did not pay bill on time and dispute late payment charge) escalate through hierarchy wasting precious time throughout the organization |
| | Multiple touch-points for the customer |
| | Unable to post alerts to all agents |
| | Data is collected and distributed at a summary level to management |
| | Process in place for handling calls, no process for additional communication vehicles |
| | Manual tracking system for escalated issues and rudimentary log of summary information |
| Above Average Criteria | Focus at supervisor level - given time and ability to investigate the issues |
| | Standard definition of complaint is consistently understood across operations |
| | Clearly communicated and defined complaint management escalation process |
| | Minimal touch points for the customer |
| | Front line employees can enter complaints right into the customer information system |
| | Ability to issue alerts to all agents |
| | Coaching occurs but it is first thing to go when there are service level concerns |
| | Tracking escalated issues on a monthly basis |
| | Pulling customer care system and escalated issues together and sharing with the retailer and key business stakeholders |
| | Data extracted from CS system for trends analysis. Trends are identified and appropriate approach identified and implemented |
| | Exporting data and collecting the data from customer care system |
| Leading Criteria: | Specialized team responsible for handling escalated issues measured on issue resolution not average handle times |
| | Past trends are proactively anticipated (e.g. approaching high bill season) |

TABLE 56-continued

Customer Advocacy
Complaint Management

All customer service personnel are able to enter a complaint from a customer
Ability to issue near real time and proactive alerts to all agents via multiple channels
Coaching is a priority activity and opportunities are identified and fed back to responsible parties
Internal quality team that meet monthly with Customer Advocate to discuss and identify opportunities for innovation and process improvements based on escalated and front line complaint issues
Applying Operational Excellence methodology

TABLE 57

Customer Advocacy
Customer Recovery

| | |
|---|---|
| Description: | Customer Recovery helps to restore the customer relationship when there has been dissatisfaction. The approach to recovery is determined based on the significance of the impact to the customer. |
| Basic Criteria: | No defined recovery strategy/plan<br>Recovery done on an ad hoc basis resulting in an inconsistent customer experience<br>No insight into or consideration for customer needs |
| Threshold Criteria: | Defined criteria and recovery triggers<br>Packaged recovery options however efforts do not necessarily resonate with the customer<br>Customer complaints are responded to with compensatory gestures such as gifts or one-off credits |
| Above Average Criteria | Recovery efforts are supported by all levels or the business, at the customer service level only<br>Gain insight into customer needs by engaging customers through focus groups, to find out what their needs are when there has been an issue or customer dissatisfaction<br>Monitor social networking sites to glean customer information which is compiled in customer insights |
| Leading Criteria: | Well-defined recovery strategy and triggers<br>Recovery triggers and efforts are reviewed on a regular basis to keep up with customer expectations<br>Incidents resulting in a trigger of customer recovery are analyzed, root cause identified, and results integrated into planning, coaching, policy or system changes<br>Recovery plan is accessible and implemented by everyone in customer care with customer touch points including field representatives<br>Customers are awarded compensation for very poor customer service regardless of whether they have raised a complaint<br>Graduated variations in response are executed based on the severity of the customer complaint and the customer type<br>Differing customer segments receive differing treatment<br>Full understanding and line of sight with all stakeholders as to the triggers, their meanings and the purpose of the recovery plan |

The following Table 58 provides an explanation of the capabilities and corresponding key assessment areas and performance capability criteria for each capability within the monitor performance platform 116.

TABLE 58

Monitor Performance
Service Performance

| | |
|---|---|
| Description: | Service Performance provides a balanced and holistic view of retail operation performance. This includes a balanced scorecard containing service metrics, key performance indicators and benchmarks for industry comparison and analysis of future expectations. |
| Basic Criteria: | No performance dashboard in place to monitor performance - Service Performance is measured using operational reports.<br>Individual results are manually reviewed in isolation<br>Performance measurement is conducted by assigned managers and functional areas and is not coordinated through a central conduit<br>No formalized processes for ensuring that data gathered is complete, accurate or is collected in a timely fashion<br>Regular reporting of service metrics is not conducted |

TABLE 58-continued

| | Monitor Performance<br>Service Performance |
|---|---|
| Threshold Criteria: | No standard metric calculations available<br>No root cause analysis available<br>Formal performance dashboard is not in place - Service Performance is measured using a standardized annual tool to report on the strategic metrics identified by the strategic plan and regulators<br>Performance metrics are gathered annually by a dedicated team within business planning operations who act as a central point of contact<br>Standardized processes for data collection to help ensure data completeness and accuracy - timeliness of collections is not usually measured<br>Reporting of performance is conducted annually as part of the annual business planning and budget cycle<br>Performance data is used as an input into future planning and process improvements<br>Root cause analysis is undertaken on a reactive basis. No forward looking analysis available |
| Above Average Criteria | Performance dashboard in place that measures a balanced scorecard of metrics. Metrics are aligned to corporate and strategic objectives<br>Dashboard results are posted for all employees to view<br>Dedicated performance team in place to develop a standard process for reporting. Accuracy and completeness of metrics is checked on a bi-annual basis and adjustments are made to correct deficiencies in reporting<br>Reporting of metrics occurs on an as needed basis to the required stakeholders<br>Dedicated team provides subject matter expertise during the annual planning cycle regarding the reviewing and defining of performance level targets<br>Performance data is analyzed using non-standardized processes on a case-by case basis. Issues for resolution are generally flagged by line managers with performance metrics used as supporting data<br>Predictive analysis is conducted only when requested on an ad-hoc basis |
| Leading Criteria: | Graphical user interface for performance dashboard aligned to strategic objectives. Provides a holistic, balanced scorecard of operational performance, customer experience and continuous improvement measures and includes comparative industry benchmarks<br>Online, real-time dashboard that is accessible by all parties and stakeholders<br>Dedicated team in place within operational responsibility consistent and objective measurement of operational performance. Team ensures timeliness, completeness and accuracy of service metrics on an ongoing basis<br>Dedicated team provides insight into how to optimize performance and provides ongoing standardized reporting on trends and analyses for key stakeholder groups<br>Standardized processes and audits in place to track service performance data collection from managers and operational units<br>Performance data is analyzed for root cause identification and issues are escalated using a standard process to drive resolution and operational excellence<br>Predictive analysis integrated with business process |

The following Table 59 provides an explanation of the capabilities and corresponding key assessment areas and performance capability criteria for each capability within the manage compliance platform 118.

TABLE 59

| | Manage Compliance<br>Risk and Controls Management |
|---|---|
| Description: | Risk and Controls Management provides a system of processes and controls to manage the security of customer information, financial information, compliance with laws and regulations, public relations and the delivery of effective internal operational controls to support the achievement of the overall business objectives. |
| Basic Criteria: | No standard compliance process in place for the entire operation. Differing business units exercise latitude over solutions creating a patchwork approach |

TABLE 59-continued

Manage Compliance
Risk and Controls Management

| | |
|---|---|
| | Manual internal controls and audit reporting tool for management teams |
| | Reporting is not standardized and notification procedures often fail to report in a timely manner. Reporting functionality provides little insight into the effectiveness of the compliance program |
| | Audit process is not integrated with the compliance program and often provides inconsistent results causing backlogs in the annual audit process adding undue expense and operational costs |
| | No disaster recovery plan in place |
| | Security solution is not updated on a regular basis and presents a recognizable threat to the storage of customer data and high value information flows |
| | Processes are unable to actively address changes to the regulatory and legal environment creating isolated solutions that are not integrated with current systems |
| | No dedicated risk control team in place |
| Threshold Criteria: | Compliance program in place that provides a common platform to manage the various programs implemented by differing business units |
| | Electronic (e.g. spreadsheets) internal controls and audit reporting tool for management teams |
| | Biannual process of reporting on operating effectiveness, timely notification of control failures and monitoring of compliance with utility regulations with no data analysis |
| | Audit process is formally tied to the compliance program but is carried out using differing processes and reporting systems. The system identifies failures, however response through the compliance program is not timely or inconsistently applied |
| | Ad hoc approach to disaster recovery |
| | Security solution is up-to-date with current technology and provides the minimally required level of protection against data threats but is difficult to upgrade consistently |
| | Non-standard process to managing legal and regulatory change creates integration issues and inefficient processes |
| | Ad hoc deployment of individual on an as needed basis to the risk and control team |
| Above Average Criteria | A standardized compliance program is in place for reporting and production of pertinent communications throughout the various business units |
| | Online internal controls and audit reporting tool for management teams |
| | Monthly & biannual process of reporting on operating effectiveness, timely notification of control failures and monitoring of compliance with utility regulations with limited data analysis |
| | Comprehensive audit process in place to meet current reporting standards in a given jurisdiction. Failures of compliance are identifiable but create operational expenses to fully understand and mitigate |
| | Disaster recovery plans are rolled into wider corporate plans |
| | Security solution is up-to-date with current technology offerings but is not deployed consistently |
| | Processes actively manage legal and regulatory change but do so in a reactive manner |
| | Leads of differing functional areas support the implementation of the risk and controls program |
| Leading Criteria: | Standardized and collaborative compliance program that provides the necessary information reporting and regular communications reporting through a single point of contact |
| | Online and user friendly internal controls and audit reporting tool for management teams |
| | Monthly process of reporting on operating effectiveness, timely notification of control failures and monitoring of compliance with utility regulations with full data analysis |
| | Integrated audit process exceeds current regulatory standards and minimizes operational impact |
| | Significant changes to or failures of key controls are easily identified and data and supporting documents are provided to auditors on a timely basis |
| | Dedicated disaster recovery and business continuity process in place that is updated annually |
| | End-to-end standardized risk mitigation processes for managing the security of customer information from collection to disposal |
| | Theprocesses proactively address any changes to legal or regulatory requirements prior to enactment |
| | Dedicated team in place to support and facilitate risk and control program |

The following Tables 60-68 provide an explanation of the capabilities and corresponding key assessment areas and performance capability criteria for each capability within the manage quality and performance platform 120.

TABLE 60

| | Manage Quality and Performance Workforce Planning |
|---|---|
| Description: | Workforce Planning manages the organizational structure for customer service and operations, scheduling of workload and reporting. This capability includes having systems and processes in place to give structure and logic to staffing and correlated budgets. |
| Basic Criteria: | No assurance that an agent is available to answer a query within a reasonable time period when a customer contacts the utility - no capturing or measuring occupancy |
| | Inbound calls/letters/faxes are assigned and processed according to agent availability, not according to agent skills - no consistency |
| | Agents work in silos and are unable to transfer customer calls to different teams/locations |
| | Volume of work subject to peaks and troughs according to season/day/time due to lack of planning |
| | Service level agreements not clearly defined/defined or not met - no forecasting or hard targets |
| | Management teams have little/no view of agent arrival and departure times, amount of time working, and how often they make themselves available |
| | Staff schedules are created with unsophisticated tools and minimal forecasting is used to help predict call volume and ideal staffing |
| | Reactive and ad hoc approach to managing key performance areas. No formal plans exist |
| | Contact Centre actual performance results adjusted retroactively to accommodate poor planning |
| | Team and/or centre-level statistics are available on an occasional basis |
| Threshold Criteria: | Agents are available to answer inbound calls within an SLA but no assurance that the agent assigned a call has the relevant skills to handle the query |
| | Defined telephone service factor target to staff accordingly |
| | Agents work in silos and often transfer customer calls to different teams/locations |
| | Contingency plan in place for peaks and troughs of work volume |
| | Service level agreements are defined for a given team and tracked |
| | Supervisors have a view of agent arrival, departure, and working times |
| | Formal utilization of staff forecasting and scheduling tool integrates functions of scheduling and forecasting of call volumes. Defined management accountability for teams/business functions |
| | Agent occupancy is a key business metric for under or over utilization and setting targets |
| | Some mechanisms of reviewing trends and forecasting are utilized but rely on spreadsheets and manual processes that are prone to errors |
| | Service level action plan exists but escalation levels not clearly understood. Escalation approach initiated inconsistently |
| | Team and centre-level statistics are available on a periodic basis |
| Above Average Criteria | Appropriate agents are available to answer inbound calls within an SLA |
| | Service level agreements are defined. Accuracy of consistently hitting the telephone service factor is tracked and managed |
| | Inbound contact is assigned to the appropriate team, but first call resolution is not assured |
| | Mostly reactive team management to handle peaks and troughs |
| | Clearly defined areas of management accountability at a process and team level |
| | Effective in defining targets and tracking gaps effectively and holding accountability |
| | Supervisors are able to view agent performance statistics using a real-time adherence tool. When statistics indicate a problem, supervisors approach agents on an individual basis for assistance |
| | Staff forecasting and scheduling function is utilizing enhanced features such as real-time adherence and advanced capabilities to support skills-based routing. |
| | Automated analysis and how historical data is captured and projected outwards - a number of tools and spreadsheets in place |
| | Individual, team, and centre-level statistics are regularly available |
| | Service level action plan clearly understood |
| Leading Criteria: | A suitable agent is available and able to handle work/calls assigned to them within an SLA. Achieves the target average handle time while balancing other factors like occupancy |
| | Effective at staying within a close margin (i.e. 2%) of targets |
| | Inbound contact is assigned to the appropriate team/agent according to customer segment, customer request and agent skills |

TABLE 60-continued

Manage Quality and Performance
Workforce Planning

Dedicated group performs scheduling, compiles performance metrics, reports and daily workload balancing with call blending
Supervisors are able to view agent performance statistics using a real-time adherence tool. When statistics indicate a problem, supervisors approach agents on an individual basis for assistance.
Staff forecasting and scheduling tool integrates all media types into work consideration from calls, email, chat, and fax. Staff forecasting evolution towards front and back-office blending
Proactive smoothing of high volume, seasonal and proactive work across various locations
Individual, team, and centre-level statistics are available in near real time (i.e. utilizing a quality and performance management dashboard tool)
Service level action plan regularly reviewed and effectiveness evaluated

TABLE 61

Manage Quality and Performance
Onboarding

| | |
|---|---|
| Description: | Onboarding includes processes to recruit, retain and provide new joiners with a sense of the corporate culture and the opportunity to experience what the retail utility stands for, its background, business drivers and strategic objectives as well as its mission, vision and core values. In doing so this capability ensures engagement and retention at the outset of the utility's relationship with employees. |
| Basic Criteria: | No recruitment strategy, very basic recruitment techniques with minimal screening
No strategy or agenda for onboarding program, focused on basic overview and compliance. Operationally based and policy driven, and does not set corporate context
Generic program with no customization
New employee experience is inconsistent. New joiners receive minimal training (2-3 days) and some are not given the same content about company core values
Subject matter experts (SMEs) are trainers, do not draw on people from the operations
Static, one-way PowerPoint style delivery with no interactive components
No "Welcome Day" (need description/explanation) |
| Threshold Criteria: | Reactive recruitment - manual screening
Meets basic HR needs/information
Majority of training delivered by a trainer including key messages
Training includes manuals and basic trainer knowledge
Some PowerPoint and material delivered by managers
Basic orientation given |
| Above Average Criteria | Web-based application recruitment tools, supported by telephone fit interviews
Larger scope - focus on creating a sense of belonging and increase engagement through customized information to functional areas
Diverse training methods
Discussion about how employees fit into corporate structure and relationships
Key people from the operations delivering key messaging rather than done by a trainer
Interaction that is applied to the methodology
PowerPoint and videos are placed strategically throughout for key messaging - play learning games, giving real-life examples and goal based learning
More in-depth orientation including presentations by managers |
| Leading Criteria: | State of the art on-boarding process including behavioral profiling, web based application/IVR response
Senior executives delivering material in person rather than via a video
Program has a high profile in the company
Instills core values and more information on where you fit in the bigger picture - grounding this and re-visiting key messages/points
Career progression messages, where appropriate, are delivered in person by a SME from senior management and not a trainer
eLearning tools - use technology for interaction/simulation and video conferencing to bring in key people to speak/train
Importance put on who is delivering material as well as opposed to the material itself |

TABLE 61-continued

Manage Quality and Performance
Onboarding

Focus on trainers who are passionate about the messages they are delivering
Comprehensive orientation including presentations by managers and senior executives.

TABLE 62

Manage Quality and Performance
Training

| | |
|---|---|
| Description: | Training provides a blended learning approach that trains employees on processes and associated business rules focusing on what the employee needs to know and where to find it. This capability places a high focus on where to find answers using online tools. |
| Basic Criteria: | Training carried out on a need-to-know basis
All training is instructor led with minimal hands on practice
Overuse of eLearning with minimal Instructor lead or support
Learning Specialists/training associates provide training rather than experts with operational experience |
| Threshold Criteria: | Generic training - no flexibility for segments or individual/team skill sets
Utilize a training environment with pre-developed exercises relevant to the learning material
Online assessments for testing
Blended learning approach - instructor led and eLearning - includes exercises, role-plays, review activities and questioning techniques
Subject matter experts deliver training with Learning team providing content but minimal direction or contact from Learning Specialist |
| Above Average Criteria | Instructor led classroom training blended with eLearning simulations and assessments that are customized to support different functional areas
Demonstrations, interactive learning and testing throughout to measure proficiency
After the initial training is complete, continuous learning or refresher training is delivered via eLearning modules with a pre- and post-assessment to measure employee proficiency
Training debrief sessions after training is completed to evaluate and apply continuous improvements to training methodologies
Includes games, activities, listening sessions and demonstrations
Subject matter experts deliver training and learning team providing thorough speaking notes and train the trainer overview |
| Leading Criteria: | Training includes technical skills, cultural awareness, industry insight and business effectiveness
Training is tailored to individual/team skill set - regular refresher courses available - participation is tracked against performance
Virtual learning is in place for all material and eLearning customized to workforce specific needs
Increased observations and live assessments such as practicums and "nesting." Nesting is a continuation of the training environment where the agents have moved from formalized classroom training to a "live environment" on the call centre floor. The reps receive first hand support from their trainer as they begin to take live calls
Ensure Train-the-Trainer capabilities are met, thorough speaking notes, consistent training methodologies by ensuring knowledge transfer
Learning Specialists provide support and coaching throughout delivery to ensure Trainer expectations are met |

TABLE 63

Manage Quality and Performance
Quality Management

| | |
|---|---|
| Description: | Quality Management evaluates interactions between customers and the retail utility's employees and ensures documented best practice and processes are followed thus enabling effective coaching and higher quality customer interactions. |
| Basic Criteria: | No structure or consistency
No sharing of best practices and limited accountability
Reactive based feedback - information gathered only if there is a complaint or an internal error is found |

TABLE 63-continued

Manage Quality and Performance
Quality Management

| | |
|---|---|
| | No remote voice or screen capture capability |
| | Supervisors are able to listen in on live calls and can review agent behavior to assess customer interaction performance. Call recording is not enabled |
| | Managers observe employees without clearly defined expectations |
| | No defined process or regular scoring |
| | No defined behaviors/transactions resulting in subjective measurement |
| | Inconsistent feedback and coaching |
| Threshold Criteria: | Basic audits from random samples done on a reactive basis following basic policy and procedures. |
| | Inconsistent approach which may only take place with new staff |
| | Voice capture methodology is in place where customer/agent interaction is audited for individual coaching purposes |
| | Supervisors are able to listen in on calls and can review agent behavior to assess customer interaction performance. Limited voice recording is done at random throughout the month for each agent with screen capture. |
| | Audit based on end result of transaction. Internally focused without taking the customer into account |
| | Very basic measurement occurs with no view to process results |
| Above Average Criteria | Defined quality assurance program in place with detailed scoring rationale, calibration process, revision process and audit process |
| | Program used as a compliance and performance tool |
| | Voice and screen capture capability sampling both sides of the conversation/transaction and scoring to the criteria with both sides of the relationship in mind to ensure process procedures are followed |
| | Proactive based on random samples taken from a quality system that is capturing employee activity |
| | Supervisors are able to listen in on calls and can review agent behavior to assess customer interaction performance. Reasonable sample of calls recorded with screen capture per month. |
| | Weighted evaluations are created (soft skills, procedures and resolution are measured) and measurement is used to gauge performance |
| | Defined expectations creating accountability |
| Leading Criteria: | The quality program is calibrated with customer expectations consistently and at a regular frequency |
| | Quality auditing and calibration in place. Analysis and trending is employed to improve results |
| | Customer comments are leveraged to improve agent performance as well as enhance upstream processes - increases accountability |
| | Clearly defined process to follow, intertwined with knowledge management and coaching |
| | Customer reviews are posted such that they may be shared with other customers and employees |
| | Interactive and immediate feedback |
| | Quality measures are extended beyond the call centre and applied to the back office. Internal and external measurement tools in place |
| | Supervisors listening sessions are used to coach to results and most pertinent data is provided in a timely manner. Large sample of calls recorded with screen capture monthly |
| | Information gathered is used for one-on-one coaching, process changes and to ensure process procedures are followed and are effective. This solidifies processes and uncovers best practices |
| | Quality management team is the key input provider in identifying best practices and performing root cause analysis |

TABLE 64

Manage Quality and Performance
Knowledge Management

| | |
|---|---|
| Description: | Knowledge Management ensures that there is system and process information available to each employee at the right time, in the right way that is specific to each job function. This capability includes process and policy documentation, support of knowledge transfer and the provision of training materials. |
| Basic Criteria: | No active strategy for knowledge management or knowledge exchange, this exists between teams on an informal basis - knowledge is only shared between segments or functions |
| | Inconsistencies in how business processes and procedures are followed |

TABLE 64-continued

Manage Quality and Performance
Knowledge Management

| | |
|---|---|
| | Hard copy training or reference manual explaining steps of the process |
| | Information is available but no proven way to determine how efficient it is |
| | Online PDF manuals documenting process mapping for main business processes |
| | Knowledge Management tools exist but are not utilized in training. Limited use of the tools due to lack of trust. Individuals create own work-arounds |
| | Knowledge Management application lacks intuitive user interface and basic search capabilities |
| | Online business reference manuals with basic search capability |
| Threshold Criteria: | Knowledge sharing is encouraged but there is no formal provision in the work day for this activity |
| | Awareness of pre-defined policy and procedures and these are followed according to volume of work - Knowledge Management tool is referenced |
| | Transactions are carried out in multiple ways, even though job aids attempt to discourage this. Job aids are not effective for experienced members of staff |
| | Online information in PDF format reference manual, explains step by step with basic search tool |
| | Online mapping with related linked documents for main business processes |
| | Some reference to the tool but not directly using the tool for training delivery |
| | KM Application is easy to use and find information relevant to a inbound call or back-office transaction |
| | Key words identified in search capability for easier access to online learning material |
| | Some means of capturing usage patterns of tool and some reporting |
| Above Average Criteria | Knowledge management or exchange strategy is in place but lacks clarity or system/application support |
| | Awarenessof pre-defined policy and procedures are easily accessible to via their desktop |
| | Policies meet regulatory and accountability requirements |
| | Consistency between employees in performing transactions |
| | Visual end-to-end business process flows with supporting documentation linked to each flow |
| | Online mapping and link to related data and documentation |
| | All training material housed in knowledge management tool and it is used for classroom delivery |
| | KM Application is robust, either leverages directly or integrates with existing Web Self-Service FAQ and is calibrated to drive efficiency during each interaction. CTI integration allows for screen pops that drive specific KM content to be displayed for specific call/interaction types |
| | Consolidated indexes for all employees to search |
| | Driving adoption through coaching and direct link to performance management |
| Leading Criteria: | Knowledge management or exchange strategy is in place and is supported by a dedicated knowledge management system/application and team |
| | Knowledge management materials are consolidated and indexed so that they may be easily accessed and searched by all employees. |
| | All materials are available within three clicks online with linked mapping |
| | Adherence to process and policy requirements - standardized policies and processes |
| | Job aids specific to each functional area as well as end-to-end process function |
| | eLearning knowledge management tool drives self-paced training and computer and self-based training that is customized to each individual |
| | Understand fully the business impacts of knowledge inconsistencies |
| | KM Application is maintained and supported by one group, driven by sophisticated natural language query, and "Smart" learning capabilities |
| | Continued investment in ongoing new service/product and "refresher" training |
| | A Google type search engine with "did you mean" capability |
| | Robust understanding of usage - reporting that shows each click, analysis of site and directs changes to site |

TABLE 65

Manage Quality and Performance
Coaching

| | |
|---|---|
| Description: | Coaching delivers improved employee performance and increased efficiencies by communicating, demonstrating and reinforcing best practices. This capability constantly drives improvements by engaging employees, building relationships, creating a two-way feedback forum, and by tailoring practices based on procedural findings. |
| Basic Criteria: | No technology supporting coaching<br>No real-time or regularly scheduled coaching. Employees are only reactively coached when there is a problem<br>Manager posts performance statistics once per month and agents are required to seek them out to determine relative performance<br>Coaching takes the form of ad hoc meetings that do not happen on a regular basis. Only problem areas are reviewed and proactive developmental areas are not addressed<br>Manager must gather performance and quality information and manually log into the system |
| Threshold Criteria: | Monthly coaching provided by manager<br>No real-time coaching<br>Reactive follow-up with no focus on employee development<br>Inconsistent coaching methodologies. Basic areas are reviewed but using inconsistent methodologies.<br>Some peer-coaching is supported |
| Above Average Criteria | Quality and Performance Management (QPM) tools are employed.<br>Employees can access their own statistics online and determine relative performance<br>Coach initiates sessions and discusses improvement plans with agents<br>Templated and consistent feedback for each performance measure and for sharing best practices |
| Leading Criteria: | Individual, team, and center-level performance statistics available to agents on a real-time basis<br>Agents have access to the reporting tool and have the knowledge to understand how to attain and surpass the expectations on a near real-time basis<br>Online coaching forms completed prior to going into coaching sessions - employee initiated direction and actions<br>Training provided on how to drive own performance, plans and commitments<br>Career coaching component is integrated into the process<br>Involves video or live-monitor coaching sessions to give coaches feedback on the sessions<br>Formal program to train coaches, managers and peer coaches to ensure consistency and effectiveness in approach |

TABLE 66

Manage Quality and Performance
Performance Management

| | |
|---|---|
| Description: | Performance Management creates a high performance culture that actively supports employee development, continuously improves performance, and rewards measurable results. This capability supports the timely, cost-effective delivery of high quality services by motivating staff and placing and retaining the best people in the most appropriate roles. |
| Basic Criteria: | Performance feedback is reactive and generally negative, usually delivered by supervisor and based on subjective assessments by colleagues and supervisors<br>Performance appraisal system is aligned with annual HR-managed pay reviews, as opposed to being part of an ongoing process<br>The performance management system is inflexible and outcomes rarely reflect true performance which tends to not be motivational<br>Supervisors are not accountable for individual agent performance and satisfaction<br>Training programs are unstructured and reactive to work errors, rather than performance objectives - annual coaching<br>No career path or succession planning<br>Ad hoc recognition with no structured program in place |
| Threshold Criteria: | Performance feedback is proactive but often overlooked and presented in quantitative terms<br>Performance appraisal system is aligned with annual HR-managed pay reviews - bonus payout is based on a very subjective ranking process<br>The performance management system is inflexible but mostly effective. Feedback style is not controlled/censored/relevant |

TABLE 66-continued

Manage Quality and Performance
Performance Management

| | |
|---|---|
| | On-the-job performance management training |
| | No documentation of performance throughout the year |
| | Succession planning tracking through spreadsheets |
| | Recognition and performance is encouraged at the management level |
| Above Average Criteria | Proactive performance feedback provided by supervisor in a controlled feedback style |
| | Ongoing performance management system including proper performance documentation throughout the year |
| | Annual process based on objective criteria for ranking. Not based on just a conversation but an objective calculation that determines threshold of payout |
| | Annual bonus process is attractive and helps recruit high-quality staff |
| | Monthly bonus payout |
| | Monthly performance coaching |
| | Training programs are structured towards career progression and training targets are set at an individual level |
| | Rigorous succession planning process linked to Workforce Planning and to HR. Proactive approach including the use of career counselors |
| | Recognition and performance is encouraged at all levels through formal and informal processes |
| Leading Criteria: | Performance feedback provided by supervisors and customers (via surveys). Near real-time online performance feedback enables near real-time coaching |
| | Consistency with regards to set objectives based on role function. Rewards and assessment criteria are clearly understood and allocated and contributions are identified and recognized |
| | Performance appraisal system is ongoing with quantitative and qualitative assessments, culminating in an annual review - |
| | Leadership surveys and 360 reviews factored into annual reviews |
| | The performance management system is appropriate for purpose and efficient to manage and implement |
| | Supervisors are accountable for their team's performance, trained to assess performance, give constructive feedback and to determine the root causes of quality and metric issues |
| | Effective succession planning program in place to identify and address skill gaps |
| | Recognition and performance is encouraged at all levels and automated tools are available to all |

TABLE 67

Manage Quality and Performance
People Development

| | |
|---|---|
| Description: | People Development develops and empowers employees by providing access to resources and training opportunities to acquire the skills required for both themselves and the operations to achieve maximum potential. |
| Basic Criteria: | No job rotation program. Cross training of employees occurs only when there is a need to back-fill for vacation or attrition (reactive approach) |
| | No structured mentoring program. Mentoring relationships may form naturally however is usually with own manager |
| | No educational programs for business/operation knowledge development |
| | No structure or plan for succession or targeted job related learning |
| Threshold Criteria: | Proactive approach with regards to training to back-fill for absences |
| | Mentoring relationships are encouraged however no structured program exists. Time spent mentoring is on an ad hoc basis |
| | Educational programs exist in the form of "lunch and learns" which are not necessarily business relevant. These sessions are often held on an ad hoc basis with no set objectives |
| | Manager directed development based on performance meetings. Very basic level based on employee interests and showing the employee how to further gather information |
| Above Average Criteria | Job rotation and cross-training occurs within employees' own department Proactive approach based on absences |
| | Structured mentoring program at the employee level. Formal matching of relationship occurs with individuals outside of direct manager but within home department. Additional mentoring program for future/potential leaders |

TABLE 67-continued

Manage Quality and Performance
People Development

| | |
|---|---|
| Leading Criteria: | Educational programs in the form of "lunch and learns" and formal communications Business relevant and based on predetermined objectives. Reactive based on needs<br>Online resources and tools available for personal (job related) development - e.g. "lunch and learns"<br>Personal development efforts are directly tied to succession planning<br>Proactive approach to job rotation and cross-training - based on needs analysis with regards to absences and business needs<br>Job rotation and cross-training occurs within own department and across other departments<br>Cross-training programs in place for the purposes of succession planning and personal development<br>Structured mentoring program at both the employee and manager level. Formal matching of relationship across company (may occur across borders). Peer buddy program in place for new joiners<br>Educational programs exist in various delivery forms (e.g., self study, lunch and learns, electronic self assessment) based on the needs and strategic objectives of both the utility and the business - proactive approach, themes determined annually<br>Educational programs are supported by management and operations - corporate wide visibility and participation (where applicable)<br>Personal development embedded in performance process.<br>Employee initiated plan - tools, resources and career counselors available |

TABLE 68

Manage Quality and Performance
People Advocacy

| | |
|---|---|
| Description: | People Advocacy creates an engaged workforce that is empowered, challenged and motivated to collectively achieve maximum potential on an individual and team basis by deploying an integrated proactive and comprehensive program to encourage and transform the culture. |
| Basic Criteria: | No communication strategy and unstructured and reactive communications<br>Ad hoc leadership courses offered on a reactive basis with no consistency<br>No leadership program curriculum<br>Rewards and recognition given on an ad hoc basis. No structured rewards or consistency in recognition practices<br>Employee engagement strategy is based around social events<br>No specific change management plan, process or strategy in place - reactive approach |
| Threshold Criteria: | Basic communication strategy with various unproven communication vehicles<br>Basic leadership courses/training offered for managers only. No customization of leadership training to meet specific needs and no assurance that learned leadership skills are transferable into the workplace<br>Some predetermined criteria for recognition however no consistency with regards to rewards or across departments<br>Each department has their own strategy and approach to employee engagement. No consistency or focused attention<br>Change management efforts exist for some projects with no dedicated effort or consistency. Once a project is completed the change management stops |
| Above Average Criteria | Tested and proven communication vehicles (two-way and audience specific)<br>Concrete communication strategy and processes with proactive communications that are consistent and professional with an identifiable brand<br>Leadership development needs analysis completed with specific training offered based on identified needs. Accountability to ensure leadership skills are practiced and transferred into the workplace<br>Reactive succession planning<br>Structured rewards & recognition program based on needs analysis<br>Heavily administrative - fair, meaningful and consistent recognition predetermined goals/behaviors<br>Well-defined employee engagement strategy customized based on high level corporate strategy and employee feedback versus not functional level specific. Management are held accountable for employee engagement |

TABLE 68-continued

Manage Quality and Performance
People Advocacy

| | |
|---|---|
| Leading Criteria: | A basic change management strategy in place for all projects and/or changes. Mainly reactive efforts<br>Online communication portal which archives communications and fosters two-way communication<br>Well-defined leadership program curriculum. Diversified training vehicles and online resource portal and links to performance management and leadership surveys<br>Customized Leadership Program to identify and develop future leaders and an effective succession planning process linked to career development<br>A structured, online program that enables individual customization of rewards with minimal administration<br>Tracking and submission of nominations for external prestigious business awards<br>Departmental engagement strategies are aligned with corporate engagement strategies and objectives<br>A proactive, customized approach to employee engagement that is functional and departmental specific<br>Embedded change management plan and strategy. All projects/efforts required change management plans |

The following Tables 69-71 provide an explanation of the capabilities and corresponding key assessment areas and performance capability criteria for each capability within the manage third party interaction platform 122.

TABLE 69

Manage Third Party Interaction
Vendor Management

| | |
|---|---|
| Description: | Vendor Management is the use of a third party in the retail back office (e.g. outsourced services or third party meter read operators). This capability includes the structure of interaction with a third party specifically pertaining to the contract roles and responsibilities, training, workforce management, service levels and retailer interaction. |
| Basic Criteria: | Prospective vendors and third parties are not fully investigated and impact of the agreement is not fully realized prior to contractual commitment<br>Service provider required to handle a varying volume of work in an unstructured manner (e.g. call centre handling over flow during peak call times)<br>Limited induction training<br>Limited or no data sharing takes place. If so, data is transferred via email and spreadsheet on an ad hoc basis<br>No formal data sharing mechanism in place<br>Service provider has no concept of required customer experience<br>No contingency plans are in place for vendors<br>No periodic review of vendors is conducted |
| Threshold Criteria: | Vendor and third party opportunities are created as a reaction to offers rather than through proactive initiatives<br>Service provider and retailer in a mutually beneficial collaborative manner<br>Limited or no data sharing (e.g. data is transferred via email and spreadsheet on an ad hoc basis)<br>Simplistic contingency plans in place for vendor relationships<br>All third parties and retailer have common goals however these are not necessarily tracked<br>Communication between retailer and third parties is formal but lacks quality and rigor and therefore compromises the focus on contractual commitments<br>Ad hoc review of vendors to measure realized value |
| Above Average Criteria | Vendors and third parties are sought/investigated in response to a sudden change in customer base/value or operational need rather than as part of a long term strategy<br>Service provider and retailer work in a mutually beneficial collaborative manner with a data and knowledge transfer strategy in place to support this<br>Proactive contingency planning<br>All third parties and retailer have common goals against which progress is formally tracked both individually and collaboratively<br>Communication between retailer and third parties is consistent and defined in the formal agreement and focuses on contractual commitments and customer experience<br>Vendors are regularly appraised |

TABLE 69-continued

Manage Third Party Interaction
Vendor Management

| | |
|---|---|
| Leading Criteria: | Vendors and third parties are proactively sought/investigated as part of a long term strategy to meet customer requirements and promote growth in terms of brand value, customer value and operational effectiveness |
| | Maturity of relationship is based more on business outcomes rather than metrics |
| | Service provider and retailer work in a mutually beneficial collaborative manner that is stable |
| | Proactive contingency planning that is tested regularly |
| | Third parties and retailer have aligned goals, objectives and service level agreements against which progress is formally tracked both individually and collaboratively |
| | Service provider is chosen to strategically provide complementary benefits (e.g. differing time zones offering opportunity for 24 hr support) |
| | Communication between retailer and third parties is frequent and varied, with informal communication to ensure strong team work and formal communications to maintain focus on contractual commitments and customer experience |
| | Vendors are regularly appraised and measured against a standard set of performance metrics displayed in a dashboard format |

TABLE 70

Manage Third Party Interaction
Industry Transaction Management

| | |
|---|---|
| Description: | Industry Transaction Management is the information management and transfer between a retail utility, the market, other utilities and other retailers for the purposes of transactional customer and metering data needed for acquisition, consumption, billing, service orders, and loss notification processes. |
| Basic Criteria: | Manual reporting capability into the clearing house hub to comply to reporting protocols |
| | Transactional data is shared on an ad hoc basis and formats often need to be translated to apply to each participant |
| | Basic consumption information is exchanged |
| | Start/stop requests are received by the retailer and manually transmitted to other industry participants |
| | Reactive reporting at a basic level available to satisfy regulatory requirements |
| Threshold Criteria: | Semi-automated reporting capability into the clearing house hub to comply to reporting protocols |
| | Transactional data is shared on a periodic basis |
| | Format is consistent for information exchange but source systems are disparate across the market |
| | Templated tools are used to capture start/stop requests and relay to distribution organizations and other entities |
| | Periodic reporting distributed to key participants to satisfy regulatory requirements |
| Above Average Criteria | Automated reporting capability into the clearing house hub to comply to reporting protocols |
| | Transactional data is shared on a daily basis through a centralized information exchange |
| | Increased standardization enables the customization of each party's systems |
| | Start/stop requests are logged into shared systems and status is available to all participants |
| | Regular reporting available to satisfy regulatory requirements distributed to all participants |
| Leading Criteria: | Automated and configurable reporting capability into the clearing house hub to comply to reporting protocols |
| | Transactional information is shared on a real-time basis directly from CIS and other output systems in a consistent native format |
| | Industry-wide participation in determining technical interface requirements |
| | Standardization enables each participant to proactively design enhancements and new systems to seamlessly integrate with markets |
| | Detailed consumption history, patterns, and current consumption is shared among participants |
| | Start/stop requests are received and processed automatically with tracking and push notifications of status change |
| | Proactive, customizable and detailed real-time reporting available to regulators and all participants |

TABLE 71

| | |
|---|---|
| | Manage Third Party Interaction<br>Technology and Infrastructure Management |
| Description: | Technology & Infrastructure Management supports and stabilizes the customer contact system, contact center infrastructure, telephony, and all quality tools. It gives full support to the business with regards to business system requests, enhancements and maintenance. This capability also ensures that all assets fit the strategic objectives and needs of the business. |
| Basic Criteria: | No dedicated staff in place<br>No effective liaison or coordination between differing data needs of different retail areas (meter data, customer data, quality data, etc.)<br>No processes in place to manage the release approach to system upgrades<br>Management is ad hoc and reactive when issues or problems arise in the system. No formal process for assessing enhancements for the systems<br>No documentation or testing<br>No communication - no one point of contact - people going everywhere to find out what is happening with the system<br>No clearly defined business requirements - unable to see the whole picture - deal with the big issues first<br>No formal budgetary tracking |
| Threshold Criteria: | Cross-functional team in place to handle technology management<br>Ad hoc processes in place to ensure coordination between different retail groups' data and system needs<br>Ad hoc, reactive release approach<br>Management is proactive with no plan or direction for defining enhancements - understand the need to look at potential issues before they happen but do not have a plan in place to carry this forward<br>Some existing documentation and testing<br>One point of contact but practices not adhered to by the business<br>No process or control over change requests<br>Plan exists to look at business cases but is still reactive<br>Requests are being created but do not cover all aspects<br>No prioritization of fixes based on predetermined criteria<br>Ad hoc processes to track technology budget on an annual basis |
| Above Average Criteria | Group within IT tasked with formal processes to liaise between groups and provide coordination for a cohesive approach to different data and information systems<br>Formal process and ad hoc timelines put in place to respond to system changes<br>Anticipate issues by looking at what may be the potential issues and problems before implementing new enhancements<br>Elaborate testing and understanding of what other systems are doing and determine what will happen when systems are brought together<br>Significant level of documentation<br>All business needs and requests are funneled through one point of contact - process for documenting and submitting change requests and business cases<br>Plan in place and the knowledge to know what to do when something goes wrong - initial background work completed to identify potential impacts<br>Proactive and planned approach - however still have lots of tools and do not always know how each are working and how they will work together<br>Defined process to automatically track technology budget at defined intervals |
| Leading Criteria: | Dedicated solution architect tasked with formalized proactive processes in place to continuously liaise with all differing retail areas (meter data, customer data, quality data, etc.)<br>Formal processes and timelines in place to manage release approach to system changes<br>Quarterly review of what the system is doing and anticipate necessary upgrades/fixes and enhancements<br>Proactive approach to ensure system stabilization<br>Full documentation of system history - hat has been done, the tools, etc. and formalized processes for ensuring that the documentation is maintained<br>All change requests have firm business cases linked to them to ensure system is not compromised - all look at FTE reduction and if changes will result in higher productivity while keeping systems stable - roactively identify changes<br>Point of contact has a firm plan in place and documentation on how the system issues and stabilization are done - plan is communicated and translated into the business |

TABLE 71-continued

Manage Third Party Interaction
Technology and Infrastructure Management

Figure 13:
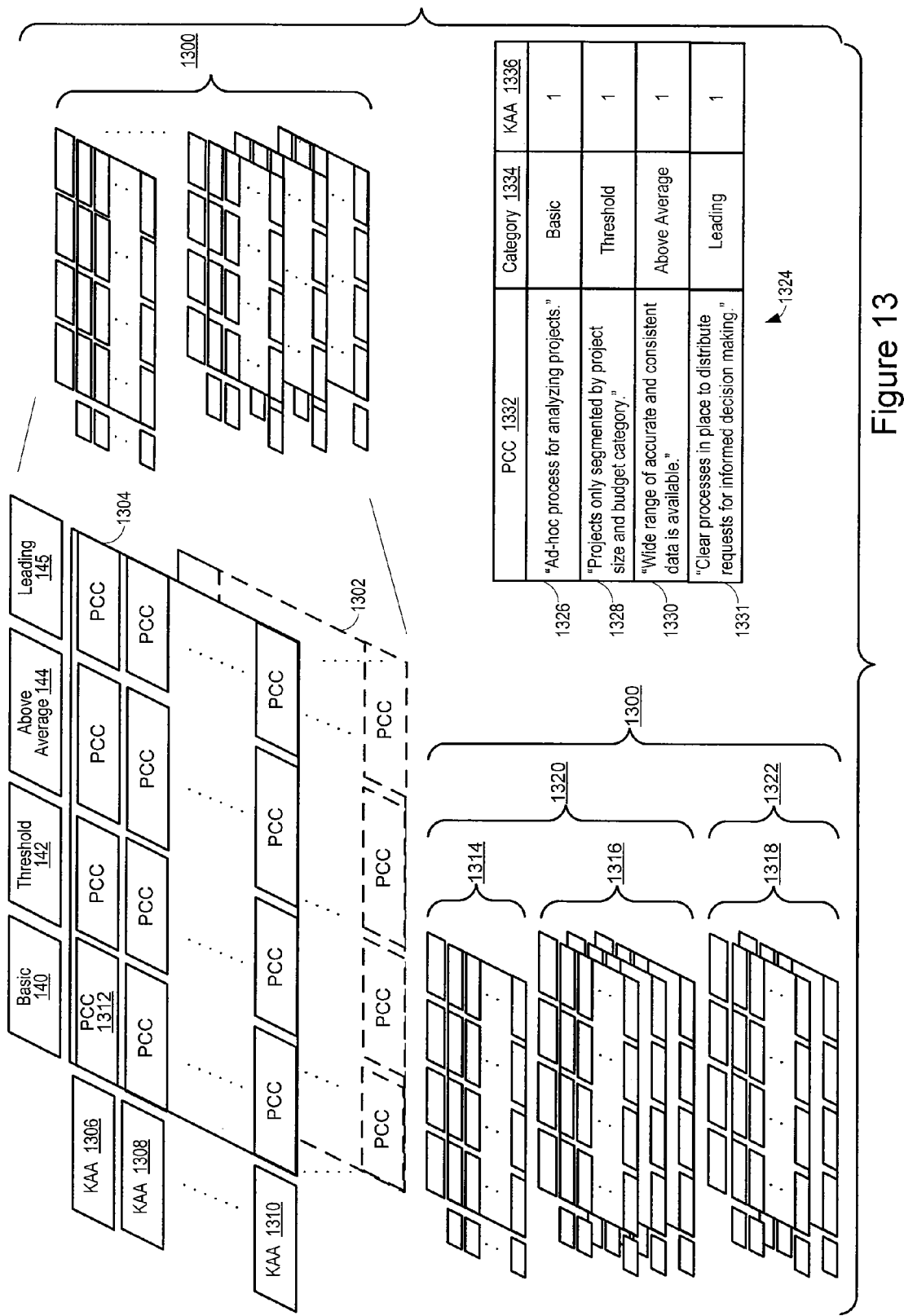
FIG. 13 shows a capability detail pool providing a multidimensional utility industry performance reference set where multiple key assessment performance reference tables are collected and stored.

Technology budget is automatically tracked on an ongoing basis and is able to produce custom reporting
Continuous improvement processes in place on an annual basis FIG. 13 shows a multidimensional utility industry performance reference set 1300 ("reference set 1300") that provides a capability detail pool from which the system described below may obtain benchmarking tables for a utility business. The reference set 1300 includes multiple key assessment performance reference tables ("reference tables"), two of which are labeled 1302 and 1304. Each reference table may provide the benchmarking criteria for a specific capability, such as those noted above with respect to FIGS. 2-13.

One dimension of each table may establish the 'Basic' performance level 140 specifying 'Basic' performance assessment criteria, the 'Threshold' performance level 142 specifying 'Threshold' performance assessment criteria, the 'Above Average' performance level 144 specifying 'Above Average' performance assessment criteria, and the 'Leading' performance level 145 specifying 'Leading' performance assessment criteria. Another dimension of each table may specify one or more key assessment areas (KAAs), several of which are labeled 1306, 1308, and 1310. As noted above, performance criteria, e.g., the PCC 1312, populates each key assessment performance reference table to provide benchmark criteria for 'Basic', 'Threshold', 'Above Average,' and 'Leading' characteristics.

The reference set 1300 represents the HPCA model 100. Consistent with the HPCA model 100, the reference set 1300 may organize multiple reference tables into a hierarchical structure defining discrete changes in granularity. In one implementation, the hierarchical structure includes reference tables, sub-platforms, platforms, and models. FIG. 13 labels three sub-platforms 1314, 1316, and 1318. The reference set 1300 may further organize the platforms into sub-platforms, two of which are labeled 1320 and 1322. Platforms aggregate into the HPCA model 100 and corresponding reference set 1300. Additional, different, or fewer levels of granularity may be defined in the HPCA model 100.

The reference set 1300 may dynamically populate the reference tables with the most up-to-date performance criteria, for example upon retrieval and presentation by a business analysis consultant. The performance criteria may be retrieved from a performance capability criteria database or other information source.

FIG. 13 also shows an example of a database implementation 1324 of a portion of a reference table. In particular, the database implementation 1324 includes records (e.g., the records 1326, 1328, 1330, 1331) that establish each PCC 1312. In the example shown, each record includes a PCC field 1332, a category specifier field 1334, and a KAA specifier field 1336. Other fields may be provided, such as a reference table assignment field or reference set assignment field. The records categorize each PCC into a specific category (e.g., Basic), into a specific KAA, and, optionally, into a specific reference table in a specific reference set for any particular HPCA model.

Figure 14:
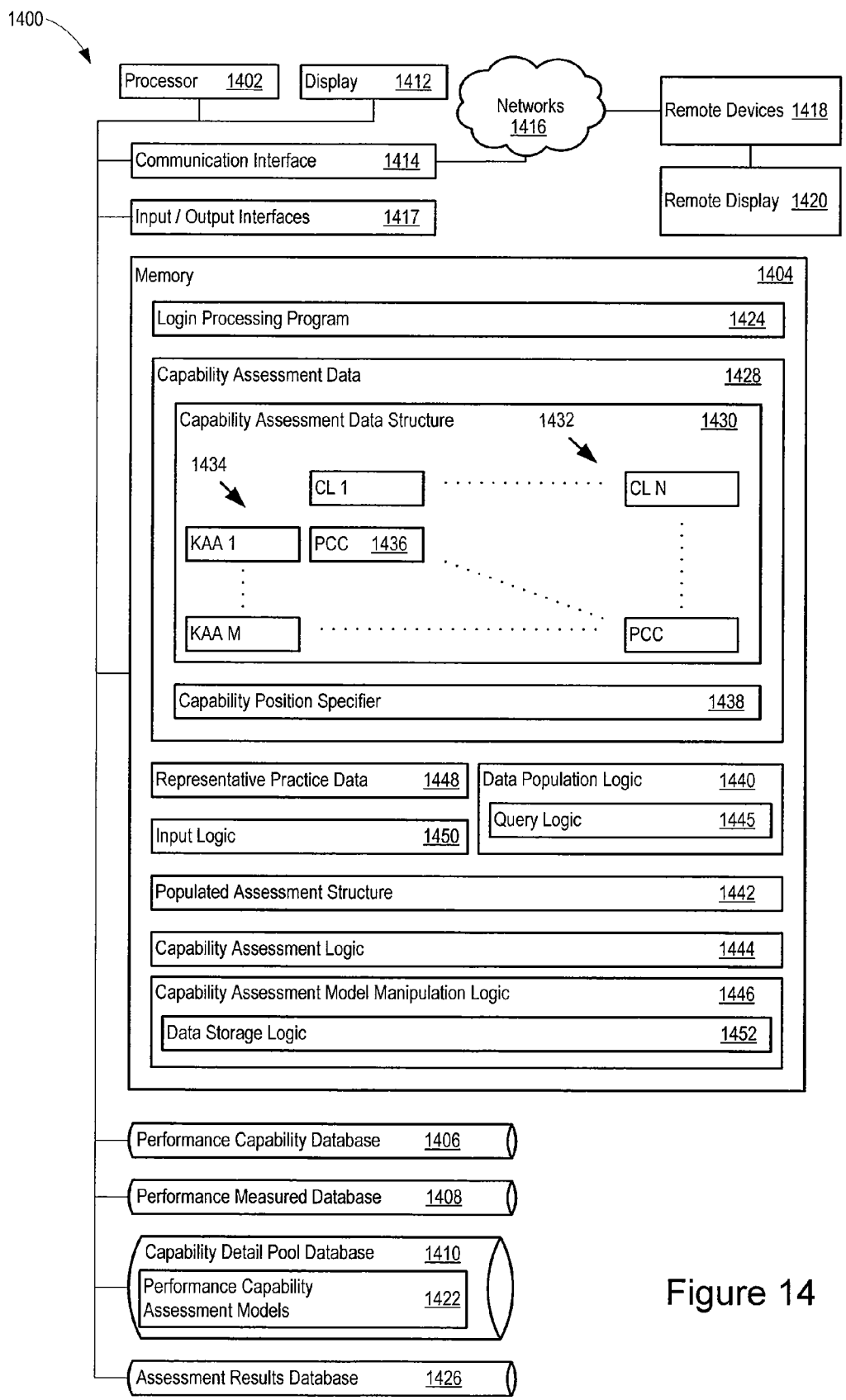
FIG. 14 shows a capability assessment system.

FIG. 14 shows a high-performance capability assessment system ("system") 1400. The system 1400 includes a processor 1402 and a memory 1404. Several databases support the operation of the system 1400, including a capability performance database 1406, a performance measured database 1408, a capability detail pool database 1410, and an assessment results database 1426. The system 1400 may include a local display 1412 and input/output interfaces 1417 (e.g., including a keyboard, mouse, microphone, speakers, or other device), and, through the communication interface 1414 and networks 1416, may communicate with remote devices 1418 and remote displays 1420. The networks 1416 may be any combination of external networks (e.g., the Internet) and internal networks (e.g., corporate LANs). The displays 1412 and 1420 may, for example, present performance capability assessment models 1422 that the system 1400 retrieves from the capability detail pool database 1410 for review, modification, and application by process engineers or other individuals. With regard to local access or access by the remote devices 1418, the system 1400 may include a login processing program 1424 to authenticate and/or authorize access to the system 1400. To that end, the login processing program 1424 may include username/password verification, private/public key encryption, or other validation and data protection capabilities.

In one implementation, the capability performance database 1406 stores performance criteria. As will be described in more detail below, the system 1400 may populate performance capability assessment models with performance capability criteria suited to any particular platform (e.g., manage retail strategy platform 102, manage interaction platform 104, etc.) and business capability at one or more capability levels across one or more key assessment areas. The performance measured database 1408 may store the determined, measured, or otherwise ascertained characteristics, criteria, and other measured data of a particular key assessment area as representative practice data 1448. The representative practice data 1448 may be obtained through interviews with business consultants and industrial engineers, through online questionnaires, through manual or automated analysis of business data (e.g., year-end operating reports), or in other manners. The capability detail pool database 1410 stores the capability detail pool 1300, which includes pre-defined performance capability assessment models 1422. The assessment results database 1426 stores determined capability levels for specific capabilities that have been analyzed.

The system 1400 facilitates the review, modification, creation, and application of performance capability assessment models. In that role, performance capability assessment model manipulation logic ("manipulation logic") 1446 within the system 1400 creates, retrieves, and stores capability assessment data 1428 in the memory 1404. The manipulation logic 1446 may establish capability assessment data 1428 in the memory 1404, including a capability assessment data structure 1430 with multiple capability levels ("CL") 1432 organized along a scale of mastery dimension, multiple key assessment areas ("KAA") 1434 organized along a key factor dimension, and performance criteria ("PCC") 1436 that populates the performance capability assessment model 1430. The manipulation logic 1446 may vary widely in implementation, and, as one example, may include data storage logic 1452 that saves data in memory and user interface logic that accepts capability level specifications, key assessment area specifications and performance capability criteria inputs to create new performance capability assessment models, modify existing performance capability assessment models, delete performance capability assessment models, or retrieve performance capability assessment models for review.

In one implementation, the manipulation logic 1446 establishes the capability assessment data structure 1430 to include a multidimensional utility industry performance reference set that includes multiple key assessment performance reference tables in which the key assessment performance reference tables include a 'Basic' capability performance level, a 'Threshold' capability performance level, an 'Above Average' capability performance level, and a 'Leading' capability performance level.

The capability assessment data 1428 may also include a capability position specifier 1438. The capability position specifier 1438 may record the capability level along the scale of mastery 146, as determined for any particular capability. Thus, the system 1400 may store the performance level in the assessment results database 1426 or elsewhere for future retrieval and review.

In one implementation, the data population logic 1440 may be a data population program executed by the processor 1402 that populates template performance capability assessment models. For example, the data population logic 1440 may include input logic 1450 that accepts input specifying a capability of interest that indicates a particular performance capability assessment model. The data population logic 1440 may include query logic 1445 that executes database queries and prompts a user for input to obtain the corresponding performance capability criteria for the capability of interest.

In another implementation, for example, the query logic 1445 may receive an input specifying a utility industry area and a utility industry key assessment area with the utility industry area for analysis. The query logic 1445 searches the multidimensional utility industry performance reference set for a matching key assessment performance reference table that matches the utility industry area and the utility industry key assessment area, and retrieves the matching key assessment performance reference table.

The data population logic 1440 may further include storage logic that adds the retrieved performance capability criteria to the template performance capability assessment model. The data population logic 1440 produces populated performance capability assessment structures 1442 that may be stored in the capability detail pool database 1410.

In addition to the analysis process described above, the system 1400 may provide an automated analysis of representative practice data 1448 that identifies relevant performance capability criteria and determines the position on the scale of mastery 146 of each key assessment area corresponding to the performance capability criteria for the representative practice data 1448. As one example, the system 1400 may implement capability assessment logic 1444 that includes comparison and/or matching logic that analyzes the representative practice data 1448 with respect to performance capability criteria to locate key assessment areas for which the system 1400 can determine capability levels to obtain a resultant performance level for each key assessment area.

Furthermore, the capability assessment logic 1444 may determine an overall position on the scale of mastery 146 as the capability position specifier 1438, for a capability under examination given the knowledge of where the key assessment areas corresponding to the capability under examination fall in each capability level. Thus, for example, the capability assessment logic 1444 may determine an overall capability level for a capability corresponding to the capability level for the majority of the key assessment areas, or it may apply a weighted analysis technique to give more emphasis to some key assessment areas than others in determining the overall position on the scale of mastery 146 for a capability. As another example, the capability assessment logic 1444 may implement an expert system (e.g., based on a neural network trained on prior determinations) that analyzes the determined characteristics with respect to the performance capability criteria and ascertains where the capability under examination falls along the scale of mastery 146 for each of the key assessment areas, or overall on the scale of mastery.

Figure 15:
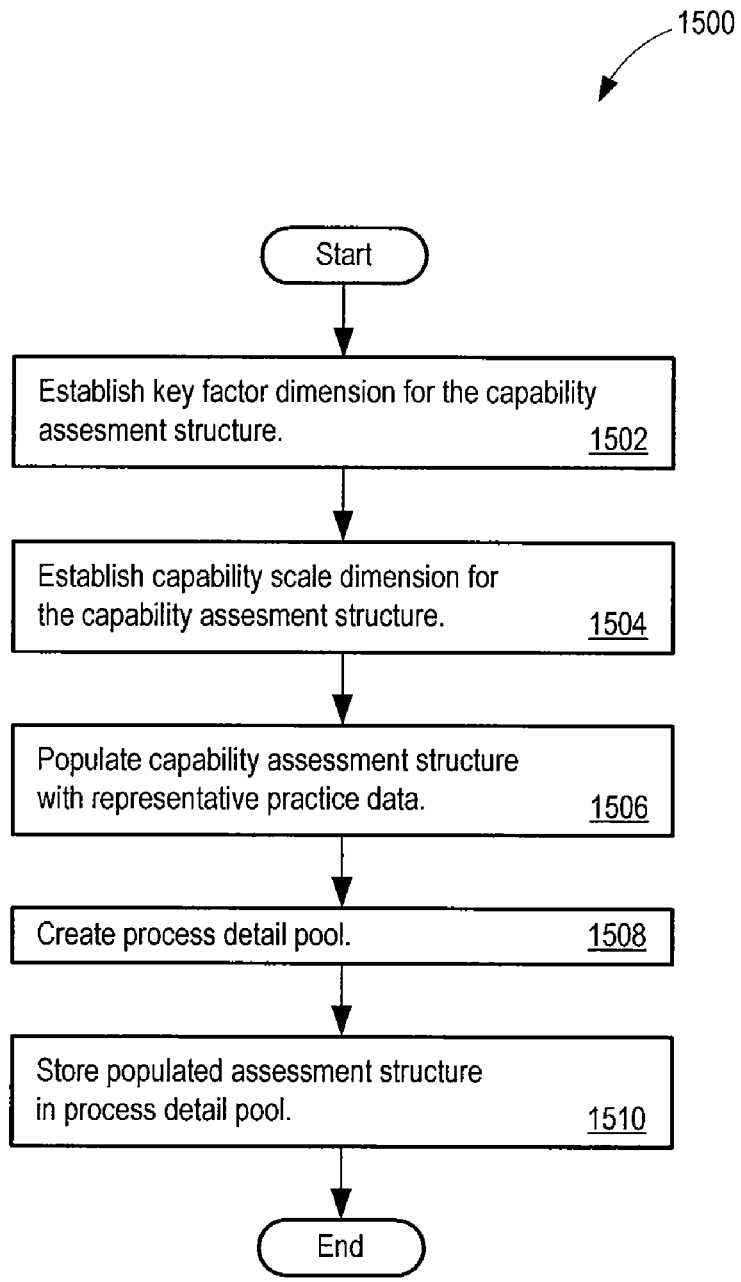
FIG. 15 shows a flow diagram for establishing high-performance capability assessment models.

FIG. 15 shows a flow diagram 1500 for creating performance capability assessment models. The performance capability assessment model creator (e.g., the manipulation logic 1446) establishes a key factor dimension for the performance capability assessment model (1502). The performance capability assessment model creator also establishes a capability scale dimension for the performance capability assessment model (1504). The capability scale dimension may define a scale of increasing organizational capability. For example, the structure creator may create the 'Basic' level 140, the 'Threshold' level 142, the 'Above Average' level 144, and the 'Leading' level 145. The performance capability assessment model creator also populates the performance capability assessment model with capability performance criteria (1506). A capability detail pool 1300 may be formed to hold multiple tailored key assessment performance reference tables (1508). The performance capability assessment model creator may store the populated assessment structure in the capability detail pool for subsequent retrieval and analysis (1510).

Figure 16:
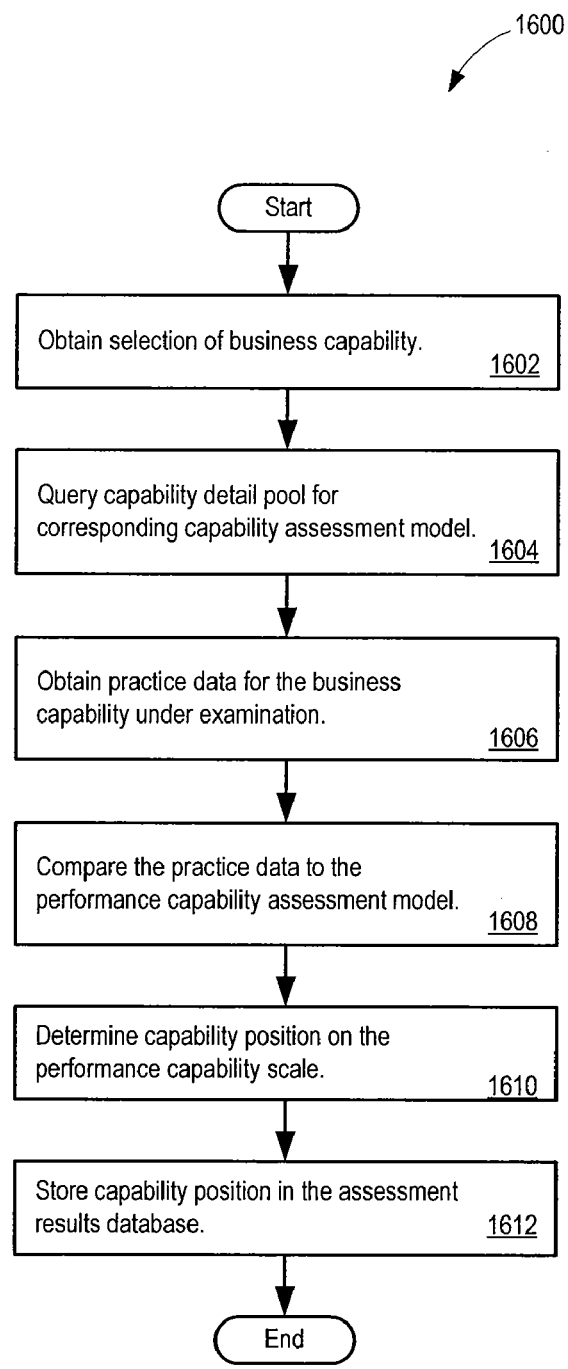
FIG. 16 shows a flow diagram for retrieving and applying high performance capability assessment models.

FIG. 16 shows a flow diagram 1600 for retrieving and applying performance capability assessment models. A selection of a capability to be analyzed is obtained (1602). In one implementation, the system 1400 receives input data that specifies a utility industry area and a utility industry key assessment area for analysis. For example, the system 1400 may accept input from a business consultant that specifies a capability for analysis. The system 1400 may query the capability detail pool 1300 for a corresponding performance capability assessment model (1604). The corresponding performance capability assessment model may be pre-defined in the capability detail pool 1300, or the data population logic 1330 (or other actor) may populate a performance capability assessment model template that the system 1400 newly creates, or that the system 1400 retrieves from a data store, such as the capability detail pool database 1410.

In another example, the system 1400 searches the multidimensional utility industry performance reference set in the capability detail pool 1300 for a matching key assessment performance reference table based on the input data that specifies a utility industry platform and a utility industry key assessment area. The system 1400 retrieves the matching key assessment performance reference table and initiates analysis of the matching key assessment performance reference table to obtain a resultant performance level for the utility industry key assessment area.

The system 1400 obtains representative practice data 1448 for the capability under examination in the specific business under review (1606). For example, a business consultant may interview the business to determine how the business currently executes the capability under review. As another example, a representative from the business may complete a questionnaire, submit business data for analysis and parameter extraction, or otherwise provide the characteristics of their current capability execution. As a further example, the system 1400 may retrieve the representative practice data 1448 from a database of previously obtained representative practice data.

The system 1400 compares the representative practice data 1448 to the performance criteria in the performance capability assessment model (1608). For example, a business consultant may use his or her expertise to arrive at a determination of level for the business and the capability under examination (1610). Alternatively or additionally, the capability assessment logic 1444 may perform an automated analysis of the assessment results data in the assessment results database 1426 and ascertain the performance level on the scale of mastery 146 (1610). The system 1400 may store the assessment results, including the determined performance level, for future reference in the assessment results database 1426 or other location (1612).

Figure 17:
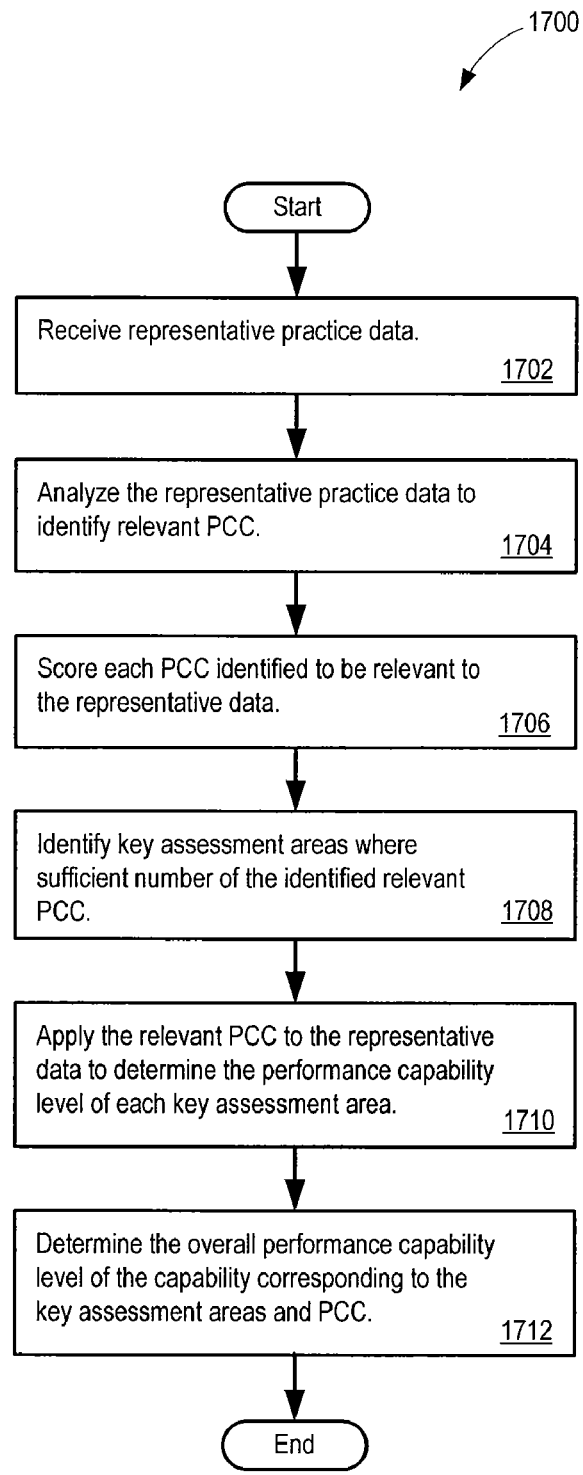
FIG. 17 shows a flow diagram for analyzing representative practice data to determine a utility industry and a utility key assessment area to which the representative practice data applies.

FIG. 17 shows a flow diagram 1700 for analyzing representative practice data 1448 to determine a utility industry and a utility key assessment area to which the representative practice data applies. The system 1400 receives representative practice data 1448 as input data (1702). The system 1400 may receive the representative practice data 1448 from a database query performed by the query logic 1445 that the query logic executes periodically, when instructed by an operator, and/or automatically against any number of available database sources that store representative practice data 1448. The capability assessment logic 1444 analyzes the representative practice data 1448 to identify performance capability criteria in the capability detail pool 1300 that the capability assessment logic 1444 determines relevant to the representative practice data 1448 (1704). For example, the capability assessment logic 1444 may compare and/or match the content of the representative practice data 1448 with the performance capability criteria using natural language processing (NLP), text string and/or substring matching, by comparing tags linked to the representative practice data 1448 and that specify that any portion of the representative practice data 1448 is applicable to a specific PCC, by querying for a manual classification of the representative practice data 1448 to a PCC, or other matching technique. The capability assessment logic 1444 may score and/or weight a performance capability criteria and compare the score and/or weight to a user specified relevance threshold to rank the relevance of the performance capability criteria to the representative practice data 1448 (1706). The user may specify particular terms and/or phrases to search and match between the performance capability criteria and the representative practice data 1448, in order to score the performance capability criteria.

The capability assessment logic 1444 may determine, based on the number of performance capability criteria that meet or exceed the relevance threshold, that the capability assessment logic 1444 has identified a sufficient number of performance capability criteria for a specific key assessment area in order to determine a performance level for the capability as a whole or any key assessment area within the capability (1708). As one example, where at least 51% of the performance capability criteria for a particular key assessment area meet or exceed the relevance threshold, the capability assessment logic 1444 applies the performance capability criteria to the representative practice data 1448. In another example, the performance capability criteria for a particular key assessment area may be ranked in importance and/or designated as mandatory in order to assess the key assessment area. In the event the capability assessment logic 1444 identifies the mandatory performance capability criteria for a key assessment area, the capability assessment logic 1444 applies the performance capability criteria to the representative practice data 1448.

The capability assessment logic 1444 may apply the performance capability criteria meeting or exceeding the relevance threshold to the representative practice data 1448 to determine whether any particular PCC is met. Accordingly, as the capability assessment logic 1444 analyzes the PCC, the system 1400 tracks the best fit of the representative practice data 1448 to the PCCs in the key assessment performance reference tables. In other words, the system 1400 determines how the representative practice data 1448 meets (or does not meet) each PCC, thereby gaining insight into whether the representative practice data 1448 is indicative of Basic, Threshold, Above Average, or Leading practices.

The system 1400 may also gauge the position on the scale of mastery 146 of each key assessment area corresponding to the performance capability criteria (1710). The capability assessment logic 1444 may further determine an overall position on the scale of mastery 146 for a capability (1712). The capability assessment logic 1444 may establish that a desired number and/or designated mandatory performance capability criteria for the key assessment areas have been identified as relevant to a capability and sufficient to determine the position on the scale of mastery 146 for the capability. For example, the capability assessment logic 1444 may determine an overall performance level for the capability based on the performance level determined for the majority of the key assessment areas. The capability assessment logic 1444 may apply a weighted analysis technique to give more emphasis to some key assessment areas than others in determining the overall position on the scale of mastery 146 for the capability. Although selected aspects, features, or components of the implementations are depicted as being stored in computer-readable memories (e.g., as computer-executable instructions or performance capability assessment models), all or part of the systems and structures may be stored on, distributed across, or read from other computer-readable media. The computer-readable media may include, for example, secondary storage devices such as hard disks, floppy disks, and CD-ROMs; a signal, such as a signal received from a network or received at an antenna; or other forms of memory, including ROM or RAM, either currently known or later developed.

Various implementations of the system 1400 may include additional or different components. A processor may be implemented as a microprocessor, a microcontroller, a DSP, an application specific integrated circuit (ASIC), discrete logic, or a combination of other types of circuits or logic. Similarly, memories may be DRAM, SRAM, Flash or any other type of memory. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be combined or split among multiple programs, or distributed across several memories and processors.

The HPCA 100 model provides unexpectedly good results for a performance capability assessment model, particularly in the utility industry. In particular, the combinations of key assessment areas and particular assessment criteria of the HPCA model, including the criteria noted in Tables 5-71 above, provide significant advantages over other assessment models. The unexpectedly good results include clearly identifying and delineating from among multiple related complex processes the specific processes to improve, and how to improve the process and identifying concrete and measurable improvement goals.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A computer implemented method for high performance capability assessment of a utility business, comprising:
    defining, by a processor coupled to a machine-readable memory, establishing a machine readable memory including a multidimensional utility industry performance reference set stored in the memory and comprising multiple key assessment performance reference tables, at least one key assessment performance reference table further defining a manage investments platform or sub-platform including:
        a 'Basic' performance level specifying 'Basic' performance assessment criteria;
        a 'Threshold' performance level specifying 'Threshold' performance assessment criteria;
        an 'Above Average' performance level specifying 'Above Average' performance assessment criteria;
        a 'Leading' performance level specifying 'Leading' performance assessment criteria;
    establishing long and medium term planning performance assessment criteria,
        wherein the 'Basic' performance assessment criteria includes a first criteria where planning is carried out with little guidance in the form of planning policies and guidelines supported by limited planning and forecasting capabilities;
        wherein the 'Threshold' performance assessment criteria includes a first criteria where planning is carried out by individual units using central guidelines and is supported by select individuals from various departments;
        wherein the 'Above Average' performance assessment criteria includes a first criteria where central function manages longer term planning, guided by a comprehensive set of planning guidelines and is supported by a highly skilled team in planning and forecasting;
        wherein the 'Leading' performance assessment criteria includes a first criteria where central function manages longer term planning, guided by a comprehensive set of planning guidelines and is supported by a highly skilled team in planning and forecasting;
    receiving, through a communication interface coupled to the processor, an input specifying a utility industry area and a utility industry key assessment area with the utility industry area for analysis;
    searching by the processor, the multidimensional utility industry performance reference set for a matching key assessment performance reference table that matches the utility industry area and the utility industry key assessment area;
    retrieving by the processor, the matching key assessment performance reference table;
    analyzing, by the processor, the matching key assessment performance reference table; and
    obtaining, by the processor, a resultant performance level for the utility industry key assessment area.

2. A computer implemented method for high performance capability assessment of a utility business, comprising:
    defining, by a processor coupled to a machine-readable memory, a multidimensional utility industry performance reference set stored in the memory and comprising multiple key assessment performance reference tables, at least one key assessment performance reference table further defining a manage investments platform or sub-platform including:
        a 'Basic' performance level specifying 'Basic' performance assessment criteria;
        a 'Threshold' performance level specifying 'Threshold' performance assessment criteria;
        an 'Above Average' performance level specifying 'Above Average' performance assessment criteria;
        a 'Leading' performance level specifying 'Leading' performance assessment criteria;
    establishing investment analysis assessment criteria,
        wherein the 'Basic' performance assessment criteria includes a first criteria where ad hoc process exists for analyzing projects;
        wherein the 'Threshold' performance assessment criteria includes a first criteria where projects are prioritized as part of planning and budgeting cycle process, but no framework or audit trail for decisions made;
        wherein the 'Above Average' performance assessment criteria includes a first criteria where phasing of projects is driven by a well-defined framework based on business drivers and cost-benefit analysis;
        wherein the 'Leading' performance assessment criteria includes a first criteria where consistent use of decision support tools, sensitivity analysis and scenario analysis for project analysis and the formulation of business cases exists;
    receiving, through a communication interface coupled to the processor, an input specifying a utility industry area and a utility industry key assessment area with the utility industry area for analysis;
    searching by the processor, the multidimensional utility industry performance reference set for a matching key assessment performance reference table that matches the utility industry area and the utility industry key assessment area;
    retrieving by the processor, the matching key assessment performance reference table;
    analyzing, by the processor, the matching key assessment performance reference table; and
    obtaining, by the processor, a resultant performance level for the utility industry key assessment area.

3. A computer implemented method for high performance capability assessment of a utility business, comprising:
    defining, by a processor coupled to a machine-readable memory, a multidimensional utility industry performance reference set stored in the memory and comprising multiple key assessment performance reference tables, at least one key assessment performance reference table further defining a manage investments platform or sub-platform including:
        a 'Basic' performance level specifying 'Basic' performance assessment criteria;
        a 'Threshold' performance level specifying 'Threshold' performance assessment criteria;
        an 'Above Average' performance level specifying 'Above Average' performance assessment criteria;
        a 'Leading' performance level specifying 'Leading' performance assessment criteria;

establishing capital and operations management budgeting assessment criteria,
  wherein the 'Basic' performance assessment criteria includes a first criteria where central finance function sets top down budget;
  wherein the 'Threshold' performance assessment criteria includes a first criteria where Budgets are checked frequently;
  wherein the 'Above Average' performance assessment criteria includes a first criteria where plans are driven mainly at local level, with limited visibility of higher level issues;
  wherein the 'Leading' performance assessment criteria includes a first criteria where central planning function is empowered to adjust budgets in order to compensate for unplanned events or changing priorities;
receiving, through a communication interface coupled to the processor, an input specifying a utility industry area and a utility industry key assessment area with the utility industry area for analysis;
searching by the processor, the multidimensional utility industry performance reference set for a matching key assessment performance reference table that matches the utility industry area and the utility industry key assessment area;
retrieving by the processor, the matching key assessment performance reference table;
analyzing, by the processor, the matching key assessment performance reference table; and
obtaining, by the processor, a resultant performance level for the utility industry key assessment area.

4. The computer implemented method of claim 1, further including establishing investment review assessment criteria,
  wherein the 'Basic' performance assessment criteria includes a first criteria where no systematic review of individual projects or programs exist;
  wherein the 'Threshold' performance assessment criteria includes a first criteria where review of major programs with large identified cost variances exist;
  wherein the 'Above Average' performance assessment criteria includes a first criteria where review of major programs and projects exist for cost variances by business unit exists;
  wherein the 'Leading' performance assessment criteria includes a first criteria where analysis of the effectiveness of all projects and programs in delivering outcomes exists.

5. The computer implemented method of claim 1, further including establishing regulatory strategy management assessment criteria,
  wherein the 'Basic' performance assessment criteria includes a first criteria where regulatory strategy is inconsistent with attempts to follow and change the regulators' agenda;
  wherein the 'Threshold' performance assessment criteria includes a first criteria where regulatory strategy is consistent but focuses on following the regulators' agenda rather than working collaboratively with other industry parties to instigate change;
  wherein the 'Above Average' performance assessment criteria includes a first criteria where regulatory strategy considers that regulations should be considered in context of commercial decisions, and where sometimes it is appropriate to challenge/negotiate terms for new mandatory changes;
  wherein the 'Leading' performance assessment criteria includes a first criteria where a holistic approach to regulatory strategy that aligns commercial decisions and industry stakeholders is supported by a multi-channel communication plan that is reviewed on an ongoing basis.

6. A non-transitory computer-readable memory or data storage means encoded with data representing a computer program for a high-performance capability assessment of a utility industry, the computer-readable memory or data storage means causing the computer to perform the acts of:
  providing a processor operatively coupled to a communication network;
  providing one or more databases operatively coupled to the processor and accessible through the communication network;
  coupling an interface to the processor for receiving input;
  establishing a machine-readable memory in said one or more databases, including a multidimensional utility industry performance reference set comprising multiple key assessment performance reference tables, at least one key assessment performance reference table defining a manage investments platform, including:
    a 'Basic' performance level specifying 'Basic' performance assessment criteria;
    a 'Threshold' performance level specifying 'Threshold' performance assessment criteria;
    an 'Above Average' performance level specifying 'Above Average' performance assessment criteria;
    a 'Leading' performance level specifying 'Leading' performance assessment criteria;
  establishing long and medium term planning performance assessment criteria,
  wherein the 'Basic' performance assessment criteria includes a first criteria where planning is carried out with little, guidance in the form of planning policies and, guidelines supported by limited planning and forecasting capabilities;
  wherein the 'Threshold' performance assessment criteria includes a first criteria where planning is carried out by individual units using central guidelines and is supported by select individuals from various departments;
  wherein the 'Above Average' performance assessment criteria includes a first criteria where central function manages longer term planning, guided by a comprehensive set of planning guidelines and is supported by a highly skilled team in planning and forecasting;
  wherein the 'Leading' performance assessment criteria includes a first criteria where central function manages longer term planning, quid comprehensive set of planning, guidelines and is supported by a highly skilled team in planning and forecasting;
  receiving an input specifying a utility industry area and a utility industry key assessment area with the utility industry area for analysis;
  searching the multidimensional utility industry performance reference set for a matching key assessment performance reference table that matches the utility industry area and the utility industry key assessment area;
  retrieving, by the processor, the matching key assessment performance reference table;
  analyzing, by the processor, initiating analysis of the matching key assessment performance reference table; and obtaining, by the processor, a resultant performance level for the utility industry key assessment area.

7. A non-transitory computer-readable memory or data storage means encoded with data representing a computer program for a high-performance capability assessment of a utility industry, the computer-readable memory or data storage means causing the computer to perform the acts of:
- providing a processor operatively coupled to a communication network;
- providing one or more databases operatively coupled to the processor and accessible through the communication network;
- coupling an interface to the processor for receiving input;
- establishing a machine-readable memory in said one or more databases, including a multidimensional utility industry performance reference set comprising multiple key assessment performance reference tables, at least one key assessment performance reference table defining a manage investments platform, including:
  - a 'Basic' performance level specifying 'Basic' performance assessment criteria;
  - a 'Threshold' performance level specifying 'Threshold' performance assessment criteria;
  - an 'Above Average' performance level specifying 'Above Average' performance assessment criteria;
  - a 'Leading' performance level specifying 'Leading' performance assessment criteria;
- establishing investment analysis assessment criteria,
  - wherein the 'Basic' performance assessment criteria includes a first criteria where ad hoc process for analyzing projects exist;
  - wherein the 'Threshold' performance assessment criteria includes a first criteria where Projects are prioritized as part of planning and budgeting cycle process, but no framework or audit trail for decisions made;
  - wherein the 'Above Average' performance assessment criteria includes a first criteria where phasing of projects driven by a well-defined framework based on business drivers and cost-benefit analysis;
  - wherein the 'Leading' performance assessment criteria includes a first criteria where consistent use of decision support tools, sensitivity analysis and scenario analysis for project analysis and the formulation of business cases exists;
- receiving an input specifying a utility industry area and a utility industry key assessment area with the utility industry area for analysis;
- searching the multidimensional utility industry performance reference set for a matching key assessment performance reference table that matches the utility industry area and the utility industry key assessment area;
- retrieving, by the processor, the matching key assessment performance reference table;
- analyzing, by the processor, the matching key assessment performance reference table; and
- obtaining, by the processor, a resultant performance level for the utility industry key assessment area.

8. A non-transitory computer-readable memory or data storage means encoded with data representing a computer program for a high-performance capability assessment of a utility industry, the computer-readable memory or data storage means causing the computer to perform the acts of:
- providing a processor operatively coupled to a communication network;
- providing one or more databases operatively coupled to the processor and accessible through the communication network;
- coupling an interface to the processor for receiving input;
- establishing a machine-readable memory in said one or more databases, including a multidimensional utility industry performance reference set comprising multiple key assessment performance reference tables, at least one key assessment performance reference table defining a manage investments platform, including:
  - a 'Basic' performance level specifying 'Basic' performance assessment criteria;
  - a 'Threshold' performance level specifying 'Threshold' performance assessment criteria;
  - an 'Above Average' performance level specifying 'Above Average' performance assessment criteria;
  - a 'Leading' performance level specifying 'Leading' performance assessment criteria;
- establishing capital and operations management budgeting assessment criteria,
  - wherein the 'Basic' performance assessment criteria includes a first criteria where Central finance function sets top down budget;
  - wherein the 'Threshold' performance assessment criteria includes a first criteria where budgets are checked frequently;
  - wherein the 'Above Average' performance assessment criteria includes a first criteria where plans are driven mainly at local level, with limited visibility of higher level issues;
  - wherein the 'Leading' performance assessment criteria includes a first criteria where Central planning function is empowered to adjust budgets in order to compensate for unplanned events or changing priorities;
- receiving an input specifying a utility industry area and a utility industry key assessment area with the utility industry area for analysis;
- searching the multidimensional utility industry performance reference set for a matching key assessment performance reference table that matches the utility industry area and the utility industry key assessment area;
- retrieving, by the processor, the matching key assessment performance reference table;
- analyzing, by the processor, the matching key assessment performance reference table; and
- obtaining, by the processor, a resultant performance level for the utility industry key assessment area.

9. The non-transitory computer-readable medium of claim 6 further comprising computer-readable content to cause a computer to perform acts of establishing investment review assessment criteria,
- wherein the 'Basic' performance assessment criteria includes a first criteria where no systematic review of individual projects or programs exist;
- wherein the 'Threshold' performance assessment criteria includes a first criteria where review of major programs with large identified cost variances exist;
- wherein the 'Above Average' performance assessment criteria includes a first criteria where review of major programs and projects for cost variances is performed by business unit;
- wherein the 'Leading' performance assessment criteria includes a first criteria where analysis of the effectiveness of all projects and programs in delivering outcomes exists.

10. The non-transitory computer-readable medium of claim 6 further comprising computer-readable content to cause a computer to perform acts of establishing regulatory strategy management assessment criteria,
- wherein the 'Basic' performance assessment criteria includes a first criteria where regulatory strategy is inconsistent with attempts to follow and change the regulators' agenda;
- wherein the 'Threshold' performance assessment criteria includes a first criteria where regulatory strategy is consistent but focuses on following the regulators' agenda rather than working collaboratively with other industry parties to instigate change;

wherein the 'Above Average' performance assessment criteria includes a first criteria where regulatory strategy considers that regulations should be considered in context of commercial decisions, and where sometimes it is appropriate to challenge/negotiate terms for new mandatory changes;

wherein the 'Leading' performance assessment criteria includes a first criteria where a holistic approach to regulatory strategy exists that aligns commercial decisions and industry stakeholders are supported by a multi-channel communication plan that is reviewed on an ongoing basis.

11. A system for high-performance capability assessment of a utility business, comprising:
   a processor operatively coupled to a communication network;
   an interface coupled to the processor configured to receive input;
   one or more databases operatively coupled to the processor and accessible through the communication network;
   a machine-readable memory operatively located in said one or more databases, said memory including a multidimensional utility industry performance reference set comprising multiple key assessment performance reference tables, at least one key assessment performance reference table defining a manage investments platform, including:
      a 'Basic' performance level specifying 'Basic' performance assessment criteria;
      a 'Threshold' performance level specifying 'Threshold' performance assessment criteria;
      an 'Above Average' performance level specifying 'Above Average' performance assessment criteria;
      a 'Leading' performance level specifying 'Leading' performance assessment criteria;
   the processor establishing Long and medium term planning criteria,
      wherein the 'Basic' performance assessment criteria includes a first criteria where planning is carried out with little, guidance in the form of planning policies and guidelines supported by limited planning and forecasting capabilities;
      wherein the 'Threshold' performance assessment criteria includes a first criteria where planning is carried out by individual units using central guidelines and is supported by select individuals from various departments;
      wherein the 'Above Average' performance assessment criteria includes a first criteria where central function manages Longer term planning guided by a comprehensive set of planning guidelines and is supported by a highly skilled team in planning and forecasting;
      wherein the 'Leading' performance assessment criteria includes a first criteria where central function manages longer term planning, guided by a comprehensive set of planning guidelines and is supported by a highly skilled team in planning and forecasting;
      the interface receiving an input specifying a utility industry area and a utility industry key assessment area with the utility industry area for analysis;
      wherein the processor searches the multidimensional utility industry performance reference set for a matching key assessment performance reference table that matches the utility industry area and the utility industry key assessment area, and retrieves the matching key assessment performance reference table;
      and wherein the processor performs analysis of the matching key assessment performance reference table; and obtains a resultant performance level for the utility industry key assessment area.

12. A system for high-performance capability assessment of a utility business, comprising:
   a processor operatively coupled to a communication network;
   an interface coupled to the processor configured to receive input;
   one or more databases operatively coupled to the processor and accessible through the communication network;
   a machine-readable memory operatively located in said one or more databases, said memory including a multidimensional utility industry performance reference set comprising multiple key assessment performance reference tables, at least one key assessment performance reference table defining a manage investments platform, including:
      a 'Basic' performance level specifying 'Basic' performance assessment criteria;
      a 'Threshold' performance level specifying 'Threshold' performance assessment criteria;
      an 'Above Average' performance level specifying 'Above Average' performance assessment criteria;
      a 'Leading' performance level specifying 'Leading' performance assessment criteria;
   wherein the processor establishes investment analysis criteria,
      wherein the 'Basic' performance assessment criteria includes a first criteria where ad hoc process for analyzing projects exists;
      wherein the 'Threshold' performance assessment criteria includes a first criteria where projects are prioritized as part of planning and budgeting cycle process, but no framework or audit trail for decisions made;
      wherein the 'Above Average' performance assessment criteria includes a first criteria where phasing of projects driven by a well-defined framework based on business drivers and cost-benefit analysis exists;
      wherein the 'Leading' performance assessment criteria includes a first criteria where consistent use of decision support tools, sensitivity analysis and scenario analysis for project analysis and the formulation of business cases exists;
   the interface receiving an input specifying a utility industry area and a utility industry key assessment area with the utility industry area for analysis;
   wherein the processor searches the multidimensional utility industry performance reference set for a matching key assessment performance reference table that matches the utility industry area and the utility industry key assessment area, and retrieves the matching key assessment performance reference table; and
   wherein the processor performs analysis of the matching key assessment performance reference table; and obtains a resultant performance level for the utility industry key assessment area.

13. A system for high-performance capability assessment of a utility business, comprising:
   a processor operatively coupled to a communication network;
   an interface coupled to the processor configured to receive input;

one or more databases operatively coupled to the processor and accessible through the communication network;

a machine-readable memory operatively located in said one or more databases, said memory including a multi-dimensional utility industry performance reference set comprising multiple key assessment performance reference tables, at least one key assessment performance reference table defining a manage investments platform, including:
- a 'Basic' performance level specifying 'Basic' performance assessment criteria;
- a 'Threshold' performance level specifying 'Threshold' performance assessment criteria;
- an 'Above Average' performance level specifying 'Above Average' performance assessment criteria;
- a 'Leading' performance level specifying 'Leading' performance assessment criteria;

wherein the processor establishes capital and operations management budgeting criteria, wherein the 'Basic' performance assessment criteria includes a first criteria where Central finance function sets top down budget;

wherein the 'Threshold' performance assessment criteria includes a first criteria where budgets are checked frequently;

wherein the 'Above Average' performance assessment criteria includes a first criteria where plans are driven mainly at local level, with limited visibility of higher level issues;

wherein the 'Leading' performance assessment criteria includes a first criteria where central planning function is empowered to adjust budgets in order to compensate for unplanned events or changing priorities;

the interface receiving an input specifying a utility industry area and a utility industry key assessment area with the utility industry area for analysis;

wherein the processor searches the multidimensional utility industry performance reference set for a matching key assessment performance reference table that matches the utility industry area and the utility industry key assessment area, and retrieves the matching key assessment performance reference table; and wherein the processor performs analysis of the matching key assessment performance reference table; and obtains a resultant performance level for the utility industry key assessment area.

14. The system of claim 11, wherein the processor establishes investment review criteria,
- wherein the 'Basic' performance assessment criteria includes a first criteria where no systematic review of individual projects or programs exist;
- wherein the 'Threshold' performance assessment criteria includes a first criteria where review of major programs with large identified cost variances exist;
- wherein the 'Above Average' performance assessment criteria includes a first criteria where review of major programs and projects for cost variances by business unit exist;
- wherein the 'Leading' performance assessment criteria includes a first criteria where analysis of the effectiveness of all projects and programs in delivering outcomes exists.

15. The system of claim 11, wherein the processor establishes regulatory strategy management criteria,
- wherein the 'Basic' performance assessment criteria includes a first criteria where regulatory strategy is inconsistent with attempts to follow and change the regulators' agenda;
- wherein the 'Threshold' performance assessment criteria includes a first criteria where regulatory strategy is consistent but focuses on following the regulators' agenda rather than working collaboratively with other industry parties to instigate change;
- wherein the 'Above Average' performance assessment criteria includes a first criteria where regulatory strategy considers that regulations should be considered in context of commercial decisions, and where sometimes it is appropriate to challenge/negotiate terms for new mandatory changes;
- wherein the 'Leading' performance assessment criteria includes a first criteria where a holistic approach to regulatory strategy that aligns commercial decisions and industry stakeholders is supported by a multi-channel communication plan that is reviewed on an ongoing basis.

* * * * *

UNITED STATES PATENT AND TRADEMARK OFFICE
CERTIFICATE OF CORRECTION

PATENT NO. : 8,311,863 B1
APPLICATION NO. : 12/710900
DATED : November 13, 2012
INVENTOR(S) : Stacy M. Kemp Page 1 of 1

It is certified that error appears in the above-identified patent and that said Letters Patent is hereby corrected as shown below:

In the Specification

In column 31, in TABLE 19, line 10 under "Threshold Criteria:", after "Employees are" replace "give" with --given--.

In column 41, in TABLE 24, line 19 under "Manage Interaction Channel Management Voice/SMS", before "outbound dialer solution." replace "a" with --an--.

In column 61, in TABLE 38, line 6 under "Basic Criteria:", before "are handled at initial" replace "inquires" with --inquiries--.

In column 63, in TABLE 38-continued, line 3 under "Threshold Criteria:", after "customer" replace "inquires" with --inquiries--.

In column 69, in TABLE 41, line 1, under "Manage Core Operations Serve Payments", replace "Payments is" with --Payment is--.

Signed and Sealed this
Ninth Day of July, 2013

Teresa Stanek Rea
*Acting Director of the United States Patent and Trademark Office*